US012486226B2

(12) United States Patent
Filer

(10) Patent No.: US 12,486,226 B2
(45) Date of Patent: Dec. 2, 2025

(54) CANNABINOID DERIVATIVES

(71) Applicant: Revvity Health Sciences, Inc., Waltham, MA (US)

(72) Inventor: Crist Filer, Somerville, MA (US)

(73) Assignee: Revvity Health Sciences, Inc., Waltham, MA (US)

( * ) Notice: Subject to any disclaimer, the term of this patent is extended or adjusted under 35 U.S.C. 154(b) by 476 days.

(21) Appl. No.: 17/155,569

(22) Filed: Jan. 22, 2021

(65) Prior Publication Data

US 2021/0230113 A1    Jul. 29, 2021

Related U.S. Application Data

(60) Provisional application No. 62/965,652, filed on Jan. 24, 2020.

(51) Int. Cl.
| | | |
|---|---|---|
| C07D 205/04 | (2006.01) | |
| C07B 59/00 | (2006.01) | |
| C07C 39/23 | (2006.01) | |

(52) U.S. Cl.
CPC .......... C07D 205/04 (2013.01); C07B 59/001 (2013.01); C07C 39/23 (2013.01); C07B 2200/05 (2013.01)

(58) Field of Classification Search
CPC . C07D 205/04; C07B 59/001; C07B 2200/05; C07C 39/23
USPC ...................................................... 424/1.81
See application file for complete search history.

(56) References Cited

U.S. PATENT DOCUMENTS

| | | | |
|---|---|---|---|
| 9,611,213 | B2 | 4/2017 | Brenneman et al. |
| 2017/0008868 | A1 | 1/2017 | Dialer et al. |

FOREIGN PATENT DOCUMENTS

| | | | | |
|---|---|---|---|---|
| WO | WO 2012/011112 | | 1/2012 | |
| WO | WO 2017/008136 | | 1/2017 | |
| WO | WO 2017/178807 | | 10/2017 | |
| WO | WO-2020104796 | A1 * | 5/2020 | ............. A61K 31/05 |
| WO | WO-2020185661 | A1 * | 9/2020 | ............. A61K 31/05 |
| WO | WO-2021046636 | A1 * | 3/2021 | ........... C07C 213/04 |

OTHER PUBLICATIONS

Ben-Shabat et al. J. Med. Chem. 2006, 49, 1113-1117. (Year: 2006).*
Pitt et al. J. Labelled Cmpd 1975, 11(4), 551-575. (Year: 1975).*
Haj et al. J. Pharmacol. Exp Ther. 2015, 355, 66-75. (Year: 2015).*
International Preliminary Report on Patentability in International Appln. PCT/US2021/014606, dated Jul. 26, 2022, 13 pages.
Ben-Shabat et al., "New cannabidiol derivatives: synthesis, binding to cannabinoid receptor, and evaluation of their antiinflammatory activity," Journal of medicinal chemistry, Feb. 9, 2006, 49(3):1113-1117.
Blake et al., "Studies with deuterated drugs. Journal of Pharmaceutical Sciences," Mar. 1, 1975, 64(3):367-391.
Filer, "Tritiated dihydro compounds employed as radioligand surrogates," Journal of Labelled Compounds and Radiopharmaceuticals, Oct. 2011, 54(12):731-742.
Filipski et al., "Intestinal targeting of drugs: rational design approaches and challenges," Current topics in medicinal chemistry, Apr. 1, 2013, 13(7):776-802.
Fukuto et al., "Determination of the mechanism of demethylenation of (methylenedioxy) phenyl compounds by cytochrome P450 using deuterium isotope effects," Journal of medicinal chemistry, Sep. 1991, 34(9):2871-2876.
Gannes et al., "Natural abundance variations in stable isotopes and their potential uses in animal physiological ecology," Comparative biochemistry and physiology Part A: Molecular & integrative physiology, Mar. 1, 1998, 119(3):725-737.
Hanu et al., "Phytocannabinoids: a unified critical inventory," Natural product reports, 2016, 33(12): 37 pages.
Kinney et al., "Discovery of KLS-13019, a cannabidiol-derived neuroprotective agent, with improved potency, safety, and permeability," ACS medicinal chemistry letters, Apr. 14, 2016, 7(4):424-428.
Kushner et al., "Pharmacological uses and perspectives of heavy water and deuterated compounds," Canadian journal of physiology and pharmacology, Feb. 1, 1999, 77(2):79-88.
Lammers et al., "Effect of intratumoral injection on the biodistribution, the therapeutic potential of HPMA copolymer-based drug delivery systems," Neoplasia, Oct. 1, 2006, 8(10):788-795.
Mascal et al., "Synthetic, non-intoxicating 8, 9-dihydrocannabidiol for the mitigation of seizures," Scientific reports, May 26, 2019, 9(1):1-6.
Mechoulam et al., "Cannabidiol: an overview of some chemical and pharmacological aspects. Part I: chemical aspects," Chemistry and physics of lipids, Dec. 31, 2002, 121(1-2): 10 pages.
Morales et al., "An overview on medicinal chemistry of synthetic and natural derivatives of cannabidiol," Frontiers in pharmacology, Jun. 28, 2017, 8(422): 18 pages.
Raffa et al., "The First Approved "Deuterated" Drug: A Short Review of the Concept," Pharmacology & Pharmacy, Oct. 23, 2018, 9(10):440-446.
Ujváry et al., "Human metabolites of cannabidiol: a review on their formation, biological activity, and relevance in therapy," Cannabis Cannabinoid Res 1: 14 pages.
Zamberletti et al., "Cannabidivarin treatment ameliorates autism-like behaviors and restores hippocampal endocannabinoid system and glia alterations induced by prenatal valproic acid exposure in rats," Frontiers in cellular neuroscience, Aug. 9, 2019, 13(367): 15 pages.

(Continued)

*Primary Examiner* — Michael G. Hartley
*Assistant Examiner* — Sean R Donohue
(74) *Attorney, Agent, or Firm* — Weston R. Gould; Dinsmore & Shohl

(57) ABSTRACT

This disclosure provides 8,9-dihydrocannabinoid derivatives, deuterated cannabinoid derivatives, and tritiated cannabinoid derivatives. The disclosure also provides compositions, methods of use, and processes of preparation of the foregoing derivatives.

9 Claims, No Drawings

(56) References Cited

OTHER PUBLICATIONS

Crombie et al., "Terpenylations using (R)-(−)-α-phellandrene. Synthesis of the (3 S, 4 R)-8, 9-dihydro-o-and-p-cannabidiols, their iso-THC's, and the natural dihydrochalcone (3 S, 4 R)-(+)-linderatin," Journal of the Chemical Society, Perkin Transactions 1, 1988(5):1251-1253.
International Search Report and Written Opinion in International Appln. PCT/US2021/014606, dated Jul. 8, 2021, 21 pages.
Morales, P., et al., An Overview on Medicinal Chemistry of Synthetic and Natural Derivatives of Cannabidiol, 8(422): 1-18, Jun. 28, 2017.

\* cited by examiner

CANNABINOID DERIVATIVES

CROSS-REFERENCE TO RELATED APPLICATION

This application claims priority to U.S. Provisional Application No. 62/965,652, filed on Jan. 24, 2020, which is incorporated by reference herein in its entirety.

TECHNICAL FIELD

This disclosure provides 8,9-dihydrocannabinoid derivatives, deuterated cannabinoid derivatives, and tritiated cannabinoid derivatives. The disclosure also provides compositions, methods of use, and processes of preparation of the foregoing derivatives.

BACKGROUND

A diverse group of isoprenylated resorcinol polyketides including cannabinoids have been isolated from *Cannabis sativa*. These compounds have been used to treat various cognitive and behavioral disorders.

SUMMARY

In some embodiments, this disclosure provides cannabinoid derivatives saturated at the 8 and 9 positions (e.g., 8,9-dihydrocannabidiol, 8,9-dihydronorcannabidiol, 8,9-dihydrocannabidivarin, and 1-(3-(((1'S,2'S)-2,6-dihydroxy-2'-isopropyl-5'-methyl-1',2',3',4'-tetrahydro-[1,1'-biphenyl]-4-yl)methyl)azetidin-1-yl)ethan-1-one). Also provided in some embodiments are deuterated and tritiated cannabinoid derivatives.

This disclosure also provides compositions as well as methods of using and making the same.

In one aspect, pharmaceutical compositions are provided that include a chemical entity described herein (e.g., a compound described generically or specifically herein or a pharmaceutically acceptable salt thereof or compositions containing the same) and one or more pharmaceutically acceptable excipients.

Embodiments can include one or more of the following.

The chemical entity can be administered in combination with one or more additional therapies with one or more agents suitable for the treatment of the condition, disease or disorder.

Examples of the indications that may be treated by the compounds disclosed herein include, but are not limited to, autistic spectrum disorder (ASD), ASD-associated disorders, cognitive dysfunction, memory impairment, seizure, cancer, inflammatory disorders, cardiovascular disorders, diabetes, and eye disease.

Many cannabinoids are obtained by means of isolation from natural plant sources, which can have a high cost and can include impurities.

The preparation and use of deuterated cannabinoids can improve bioavailability and slow metabolism in relation to counterpart non-deuterated cannabinoids.

Definitions

To facilitate understanding of the disclosure set forth herein, a number of terms are defined below. Generally, the nomenclature used herein and the laboratory procedures in organic chemistry, medicinal chemistry, and pharmacology described herein are those well-known and commonly employed in the art. Unless defined otherwise, all technical and scientific terms used herein generally have the same meaning as commonly understood by one of ordinary skill in the art to which this disclosure belongs. Each of the patents, applications, published applications, and other publications that are mentioned throughout the specification and the attached appendices are incorporated herein by reference in their entireties.

"API" refers to an active pharmaceutical ingredient.

The terms "effective amount" or "therapeutically effective amount," as used herein, refer to a sufficient amount of a chemical entity being administered which will relieve to some extent one or more of the symptoms of the disease or condition being treated. The result includes reduction and/or alleviation of the signs, symptoms, or causes of a disease, or any other desired alteration of a biological system. For example, an "effective amount" for therapeutic uses is the amount of the composition comprising a compound as disclosed herein required to provide a clinically significant decrease in disease symptoms. An appropriate "effective" amount in any individual case is determined using any suitable technique, such as a dose escalation study.

The term "excipient" or "pharmaceutically acceptable excipient" means a pharmaceutically-acceptable material, composition, or vehicle, such as a liquid or solid filler, diluent, carrier, solvent, or encapsulating material. In one embodiment, each component is "pharmaceutically acceptable" in the sense of being compatible with the other ingredients of a pharmaceutical formulation, and suitable for use in contact with the tissue or organ of humans and animals without excessive toxicity, irritation, allergic response, immunogenicity, or other problems or complications, commensurate with a reasonable benefit/risk ratio. See, e.g., *Remington: The Science and Practice of Pharmacy*, 21st ed.; Lippincott Williams & Wilkins: Philadelphia, PA, 2005; *Handbook of Pharmaceutical Excipients*, 6th ed.; Rowe et al., Eds.; The Pharmaceutical Press and the American Pharmaceutical Association: 2009; *Handbook of Pharmaceutical Additives*, 3rd ed.; Ash and Ash Eds.; Gower Publishing Company: 2007; *Pharmaceutical Preformulation and Formulation*, 2nd ed.; Gibson Ed.; CRC Press LLC: Boca Raton, FL, 2009.

The term "pharmaceutically acceptable salt" may refer to pharmaceutically acceptable addition salts prepared from pharmaceutically acceptable non-toxic acids including inorganic and organic acids. In certain instances, pharmaceutically acceptable salts are obtained by reacting a compound described herein, with acids such as hydrochloric acid, hydrobromic acid, sulfuric acid, nitric acid, phosphoric acid, methanesulfonic acid, ethanesulfonic acid, p-toluenesulfonic acid, salicylic acid and the like. The term "pharmaceutically acceptable salt" may also refer to pharmaceutically acceptable addition salts prepared by reacting a compound having an acidic group with a base to form a salt such as an ammonium salt, an alkali metal salt, such as a sodium or a potassium salt, an alkaline earth metal salt, such as a calcium or a magnesium salt, a salt of organic bases such as dicyclohexylamine, N-methyl-D-glucamine, tris(hydroxymethyl)methylamine, and salts with amino acids such as arginine, lysine, and the like, or by other methods previously determined. The pharmacologically acceptable salts not specifically limited as far as it can be used in medicaments. Examples of a salt that the compounds described herein form with a base include the following: salts thereof with inorganic bases such as sodium, potassium, magnesium, calcium, and aluminum; salts thereof with organic bases such as methylamine, ethylamine and ethanolamine; salts thereof with basic amino acids such as lysine and ornithine; and ammonium salt. The salts may be acid addition salts, which are specifically exemplified by acid addition salts with the following: mineral acids such as hydrochloric acid, hydrobromic acid, hydroiodic acid, sulfuric acid, nitric acid, and phosphoric acid: organic acids such as formic acid, acetic acid, propionic acid, oxalic acid, malonic acid, succinic acid, fumaric acid, maleic acid, lactic acid, malic acid, tartaric acid, citric acid, methanesulfonic acid, and ethanesulfonic acid; acidic amino acids such as aspartic acid and glutamic acid.

The term "pharmaceutical composition" refers to a mixture of a compound described herein with other chemical components (referred to collectively herein as "excipients"), such as carriers, stabilizers, diluents, dispersing agents, suspending agents, and/or thickening agents. The pharmaceutical composition facilitates administration of the compound to an organism. Multiple techniques of administering a compound exist in the art including, but not limited to: rectal, oral, intravenous, aerosol, parenteral, ophthalmic, pulmonary, and topical administration.

The term "subject" refers to an animal, including, but not limited to, a primate (e.g., human), monkey, cow, pig, sheep, goat, horse, dog, cat, rabbit, rat, or mouse. The terms "subject" and "patient" are used interchangeably herein in reference, for example, to a mammalian subject, such as a human.

The terms "treat," "treating," and "treatment," in the context of treating a disease or disorder, are meant to include alleviating or abrogating a disorder, disease, or condition, or one or more of the symptoms associated with the disorder, disease, or condition; or to slowing the progression, spread or worsening of a disease, disorder or condition or of one or more symptoms thereof.

The term "cannabinoid" or "cannabinoid derivative" as used herein refers to any compound that comprises the following substructure:

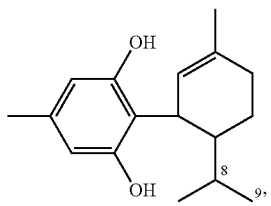 [SMILES: CC1=CC(c2c(O)cc(C)cc2O)C(C(C)C)CC1]

wherein the carbon atom closest to the 8 is herein referred to as the 8 position and the carbon atom closest to the 9 is referred to as the 9 position; and wherein a double bond is optionally present between the 8 and 9 position.

The term "rhodium catalyst" as used herein is any catalyst containing rhodium.

The term "palladium catalyst" as used herein is any catalyst containing palladium.

The term "iridium catalyst" as used herein is any catalyst containing iridium.

The term "ruthenium catalyst" as used herein is any catalyst containing ruthenium.

The term "platinum catalyst" as used herein is any catalyst containing platinum.

The term "homogeneous catalyst" as used herein is any metal-containing catalyst that is soluble in the solvent that the transformation catalyzed by the catalyst is performed in. Examples of homogenous catalysts include Wilkinson's catalyst (also referred to herein as $(Ph_3P)_3RhCl$), Crabtree's catalyst (also referred to herein as $[Ir(cod)(pyr)(PCy_3)]PF_6$, Schrock-Osborn catalyst $[Rh(cod)(PPh_3)_2]PF_6$, and [1,2-bis(diphenylphosphino)ethane]palladium.

The term "heterogeneous catalyst" as used herein is any metal-containing catalyst that is insoluble in the solvent that the transformation catalyzed by the catalyst is performed in. An example of a heterogeneous catalyst is Lindlar catalyst, which is a mixture of palladium deposited on calcium carbonate poisoned with various forms of lead and/or sulfur and optionally quinoline.

As used herein, cannabidiol refers to a compound of the following formula:

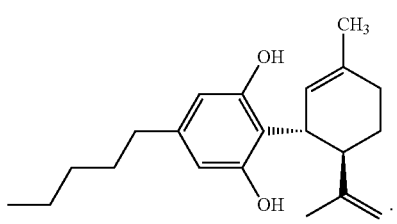 [SMILES: C=C(C)[C@@H]1CCC(C)=C[C@H]1c1c(O)cc(CCCCC)cc1O]

As used herein, 8,9-dihydrocannabidiol refers to a compound of the following formula:

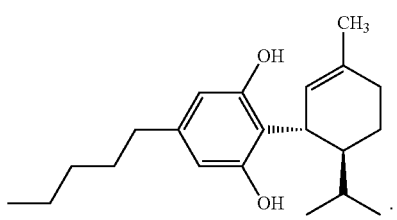 [SMILES: CCCCCc1cc(O)c([C@@H]2C=C(C)CC[C@H]2C(C)C)c(O)c1]

As used herein, norcannabidiol (also known as cannabidiol-C4) refers to a compound of the following formula:

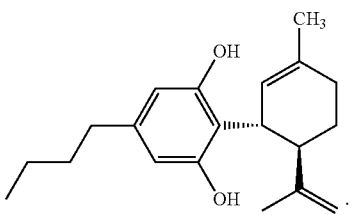 [SMILES: C=C(C)[C@@H]1CCC(C)=C[C@H]1c1c(O)cc(CCCC)cc1O]

As used herein, 8,9-dihydronorcannabidiol refers to a compound of the following formula:

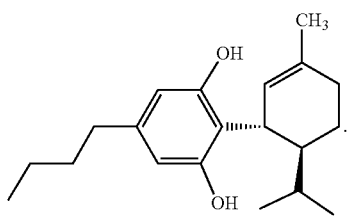 [SMILES: CCCCc1cc(O)c([C@@H]2C=C(C)CC[C@H]2C(C)C)c(O)c1]

As used herein, cannabidivarin refers to a compound of the following formula:

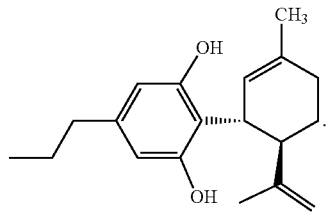 [SMILES: C=C(C)[C@@H]1CCC(C)=C[C@H]1c1c(O)cc(CCC)cc1O]

As used herein, 8,9-dihydrocannabidivarin refers to a compound of the following formula:

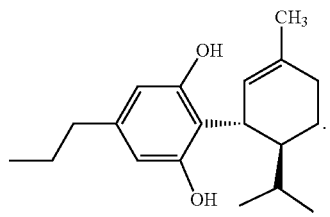 [SMILES: CCCc1cc(O)c([C@@H]2C=C(C)CC[C@H]2C(C)C)c(O)c1]

As used herein, 1-(3-(((1'R,2'R)-2,6-dihydroxy-5'-methyl-2'-(prop-1-en-2-yl)-1',2',3',4'-tetrahydro-[1,1'-biphenyl]-4-yl)methyl)azetidin-1-yl)ethan-1-one refers to a compound of the following formula:

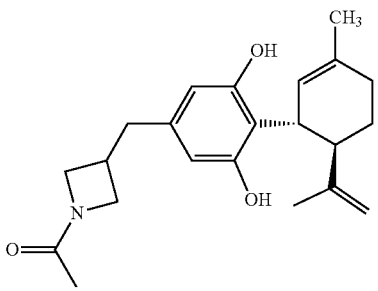 [SMILES: C=C(C)[C@@H]1CCC(C)=C[C@H]1c1c(O)cc(CC2CN(C(C)=O)C2)cc1O]

As used herein, 1-(3-(((1'S,2'S)-2,6-dihydroxy-2'-isopropyl-5'-methyl-1',2',3',4'-tetrahydro-[1,1'-biphenyl]-4-yl)methyl)azetidin-1-yl)ethan-1-one refers to a compound of the following formula:

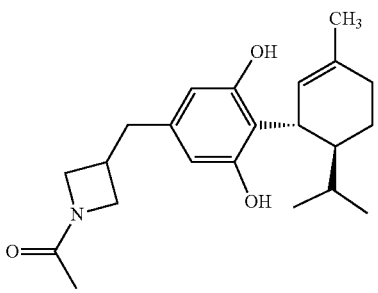 [SMILES: CC(=O)N1CC(Cc2cc(O)c([C@@H]3C=C(C)CC[C@H]3C(C)C)c(O)c2)C1]

The present disclosure also includes isotopically-labeled compounds, which are otherwise identical to 8,9-dihydrocannabidiol, 8,9-dihydronorcannabidiol, 8,9-dihydrocannabidivarin, 1-(3-(((1'S,2'S)-2,6-dihydroxy-2'-isopropyl-5'-methyl-1',2',3',4'-tetrahydro-[1,1'-biphenyl]-4-yl)methyl)azetidin-1-yl)ethan-1-one), the compound of Formula I, and the compounds of Formulae A-D, but for the fact that one or more atoms are replaced by an atom having an atomic mass or mass number different from the atomic mass or mass number usually found in nature. Examples of isotopes that can be incorporated into compounds as provided herein include isotopes of hydrogen, carbon, nitrogen, oxygen, phosphorous, fluorine, and chlorine, such as, but not limited to, $^2H$, $^3H$, $^{13}C$, $^{14}C$, $^{15}N$, $^{18}O$, $^{17}O$, $^{31}P$, $^{32}P$, $^{35}S$, $^{18}F$, and $^{36}Cl$, respectively. Compounds as described herein, and pharmaceutically acceptable salts of the compounds or of the prodrugs which contain the aforementioned isotopes and/or other isotopes of other atoms are within the scope of this disclosure. Certain isotopically-labeled compounds as described herein, for example those into which radioactive isotopes such as $^3H$ and $^{14}C$ are incorporated, are useful in drug and/or substrate tissue distribution assays. Tritiated, i.e., $^3H$, and carbon-14, i.e., $^{14}C$, isotopes are particularly preferred for their ease of preparation and detectability. Isotopically-labeled compounds as provided herein and prodrugs thereof can generally be prepared by carrying out the procedures disclosed in the Schemes and/or in the Examples and Preparations below, by substituting isotopically-labeled reagents for a non-isotopically-labeled reagent.

The term "subjecting to mass spectrometry" as used herein refers to using a mass spectrometer to ionize the analytes in a sample, and analyze the mass-to-charge ratios of the resulting analyte ions.

The term "introducing the compound in the sample" as used herein refers to adding the compound or a composition comprising the compound to the sample, or adding the sample to the compound or a composition comprising the compound.

In some embodiments, any atom not designated as deuterium in any of the embodiments, aspects, or examples set forth herein is present at its natural isotopic abundance.

The details of one or more embodiments of the invention are set forth in the accompanying drawings and the description below. Other features and advantages of the invention will be apparent from the description and drawings.

DETAILED DESCRIPTION

Compounds

In one aspect, provided herein is a compound selected from the group consisting of

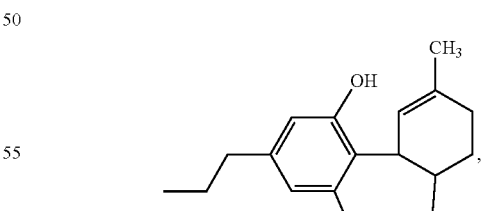

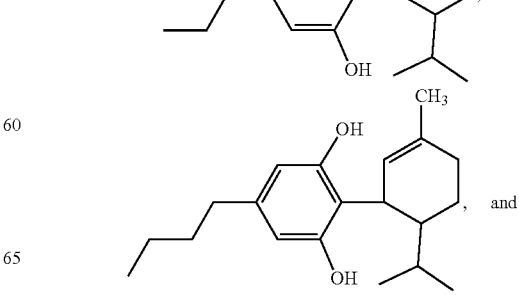

and

-continued

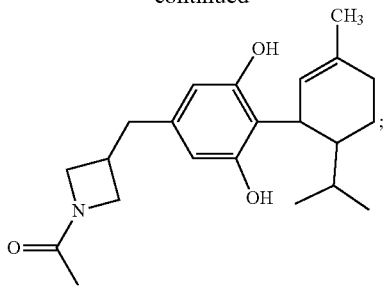

or a pharmaceutically acceptable salt or solvate thereof.
In some embodiments, the compound is

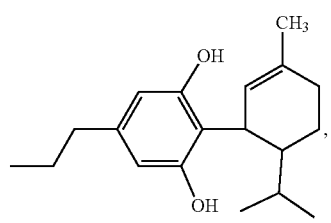 [SMILES: CCCc1cc(O)c(C2C=C(C)CCC2C(C)C)c(O)c1]

or a pharmaceutically acceptable salt or solvate thereof.
In some embodiments, the compound is

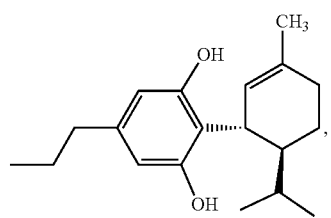 [SMILES: CCCc1cc(O)c([C@@H]2C=C(C)CC[C@H]2C(C)C)c(O)c1]

or a pharmaceutically acceptable salt or solvate thereof.
In some embodiments, the compound is

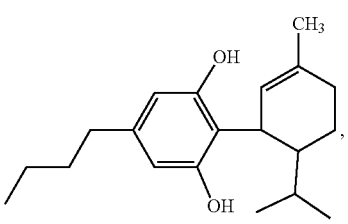 [SMILES: CCCCc1cc(O)c(C2C=C(C)CCC2C(C)C)c(O)c1]

or a pharmaceutically acceptable salt or solvate thereof.
In some embodiments, the compound is

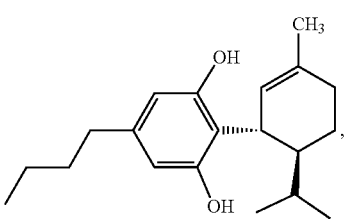 [SMILES: CCCCc1cc(O)c([C@@H]2C=C(C)CC[C@H]2C(C)C)c(O)c1]

or a pharmaceutically acceptable salt or solvate thereof.

In some embodiments, the compound is

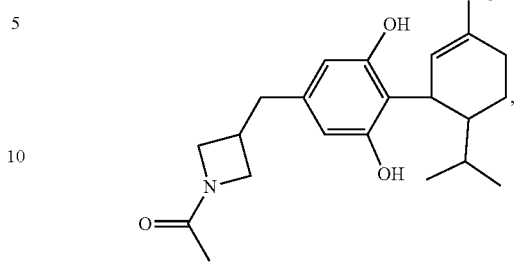

or a pharmaceutically acceptable salt or solvate thereof.
In some embodiments, the compound is

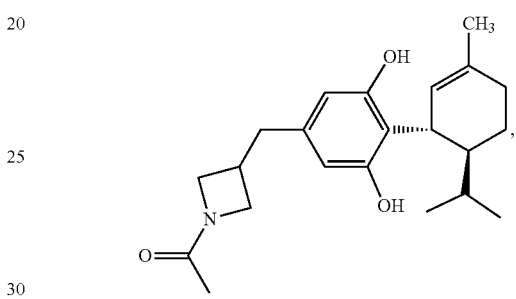

or a pharmaceutically acceptable salt or solvate thereof.

In some embodiments, the compound is a hydrate. In some embodiments, the compound is a monohydrate or dihydrate.

In some embodiments, the compound is a pharmaceutically acceptable salt. Acids commonly employed to form pharmaceutically acceptable salts include inorganic acids such as hydrogen bisulfide, hydrochloric acid, hydrobromic acid, hydroiodic acid, sulfuric acid and phosphoric acid, as well as organic acids such as para-toluenesulfonic acid, salicylic acid, tartaric acid, bitartaric acid, ascorbic acid, maleic acid, besylic acid, fumaric acid, gluconic acid, glucuronic acid, formic acid, glutamic acid, methanesulfonic acid, ethanesulfonic acid, benzenesulfonic acid, lactic acid, oxalic acid, para-bromophenylsulfonic acid, carbonic acid, succinic acid, citric acid, benzoic acid and acetic acid, as well as related inorganic and organic acids. Such pharmaceutically acceptable salts thus include sulfate, pyrosulfate, bisulfate, sulfite, bisulfite, phosphate, monohydrogenphosphate, dihydrogenphosphate, metaphosphate, pyrophosphate, chloride, bromide, iodide, acetate, propionate, decanoate, caprylate, acrylate, formate, isobutyrate, caprate, heptanoate, propiolate, oxalate, malonate, succinate, suberate, sebacate, fumarate, maleate, butyne-1,4-dioate, hexyne-1,6-dioate, benzoate, chlorobenzoate, methylbenzoate, dinitrobenzoate, hydroxybenzoate, methoxybenzoate, phthalate, terephthalate, sulfonate, xylene sulfonate, phenylacetate, phenylpropionate, phenylbutyrate, citrate, lactate, β-hydroxybutyrate, glycolate, maleate, tartrate, methanesulfonate, propanesulfonate, naphthalene-1-sulfonate, naphthalene-2-sulfonate, mandelate and other salts.

Deuterated Compounds

A potentially attractive strategy for improving a drug's metabolic properties is deuterium modification. Deuterium is a safe, stable, non-radioactive isotope of hydrogen. Compared to hydrogen, deuterium forms stronger bonds with carbon. In select cases, the increased bond strength imparted by deuterium can positively impact the ADME (absorption, distribution, metabolism and/or excretion) properties of a drug, creating the potential for improved drug efficacy, safety, and/or tolerability. At the same time, because the size and shape of deuterium are essentially identical to those of hydrogen, replacement of hydrogen by deuterium would not be expected to affect the biochemical potency and selectivity of the drug as compared to the original chemical entity that contains only hydrogen.

The effects of deuterium substitution on the rate of metabolism have been reported, for example, by Blake, M I et al, J Pharm Sci, 1975, 64:367-91; Foster, A B, Adv Drug Res 1985, 14:1-40; Kushner, D J et al, Can J Physiol Pharmacol 1999, 79-88; and Fisher, M B et al, Curr Opin Drug Discov Devel, 2006, 9:101-09. The results have been variable and unpredictable. For some compounds deuteration caused decreased metabolic clearance in vivo. For others, there was no change in metabolism. Still others demonstrated increased metabolic clearance.

The effects of deuterium modification on a drug's metabolic properties are not predictable even when deuterium atoms are incorporated at known sites of metabolism. Only by actually preparing and testing a deuterated drug can one determine if and how the rate of metabolism will differ from that of its non-deuterated counterpart. See, for example, Fukuto et al. (J. Med. Chem. 1991, 34, 2871-76). Many drugs have multiple sites where metabolism is possible. The site(s) where deuterium substitution is required and the extent of deuteration necessary to see an effect on metabolism, if any, will be different for each drug.

In some embodiments, provided herein are deuterated derivatives of cannabidiol. Also provided herein are compositions comprising such deuterated derivatives and the use of such compositions in methods of treating diseases as disclosed herein. It will be recognized that some variation of natural isotopic abundance occurs in a synthesized compound depending upon the origin of chemical materials used in the synthesis. Thus, a preparation of cannabidiol will inherently contain small amounts of deuterated isotopologues. The concentration of naturally abundant stable hydrogen and carbon isotopes, notwithstanding this variation, is small and immaterial as compared to the degree of stable isotopic substitution of compounds provided herein. See, for instance, Wada, E et al., Seikagaku, 1994, 66:15; Gannes, L Z et al., Comp Biochem Physiol Mol Integr Physiol, 1998, 119:725.

Unless otherwise stated, when a position is designated specifically as "D" or "deuterium", the position is understood to have deuterium at an abundance that is at least 3000 times greater than the natural abundance of deuterium, which is 0.015% (i.e., at least 45% incorporation of deuterium).

The term "isotopic enrichment factor" as used herein means the ratio between the isotopic abundance and the natural abundance of a specified isotope.

In other embodiments, a compound as provided herein has an isotopic enrichment factor for each designated deuterium atom of at least 3500 (52.5% deuterium incorporation at each designated deuterium atom), at least 4000 (60% deuterium incorporation), at least 4500 (67.5% deuterium incorporation), at least 5000 (75% deuterium), at least 5500 (82.5% deuterium incorporation), at least 6000 (90% deuterium incorporation), at least 6333.3 (95% deuterium incorporation), at least 6466.7 (97% deuterium incorporation), at least 6600 (99% deuterium incorporation), or at least 6633.3 (99.5% deuterium incorporation).

The term "isotopologue" refers to a species in which the chemical structure differs from a specific compound as provided herein only in the isotopic composition thereof.

When referring to a deuterated derivative, the term "compound" refers to a collection of molecules having an otherwise identical chemical structure, except that there may be isotopic variation among the constituent atoms of the molecules. Thus, it will be clear to those of skill in the art that a compound represented by a particular chemical structure containing indicated deuterium atoms, will also contain lesser amounts of isotopologues having hydrogen atoms at one or more of the designated deuterium positions in that structure. The relative amount of such isotopologues in a deuterated derivative will depend upon a number of factors including the isotopic purity of deuterated reagents used to make the compound and the efficiency of incorporation of deuterium in the various synthesis steps used to prepare the compound. However, as set forth above the relative amount of such isotopologues in toto will be less than 55% of the compound. In other embodiments, the relative amount of such isotopologues in toto will be less than 50%, less than 47.5%, less than 40%, less than 32.5%, less than 25%, less than 17.5%, less than 10%, less than 5%, less than 3%, less than 1%, or less than 0.5% of the compound.

Also provided herein are salts of the deuterated derivatives.

The deuterated derivative may contain an asymmetric carbon atom, for example, as the result of deuterium substitution or otherwise. As such, deuterated derivative can exist as either individual enantiomers, or mixtures of the two enantiomers. Accordingly, a compound as provided herein may exist as either a racemic mixture or a scalemic mixture, or as individual respective stereoisomers that are substantially free from another possible stereoisomer. The term "substantially free of other stereoisomers" as used herein means less than 25% of other stereoisomers, preferably less than 10% of other stereoisomers, more preferably less than 5% of other stereoisomers and most preferably less than 2% of other stereoisomers are present. Methods of obtaining or synthesizing an individual enantiomer for a given compound are known in the art and may be applied as practicable to final compounds or to starting material or intermediates.

Unless otherwise indicated, when a disclosed compound is named or depicted by a structure without specifying the stereochemistry and has one or more chiral centers, it is understood to represent all possible stereoisomers of the compound.

The term "stable compounds," as used herein, refers to compounds which possess stability sufficient to allow for their manufacture and which maintain the integrity of the compound for a sufficient period of time to be useful for the purposes detailed herein (e.g., formulation into therapeutic products, intermediates for use in production of therapeutic compounds, isolatable or storable intermediate compounds, treating a disease or condition responsive to therapeutic agents).

"D" and "d" both refer to deuterium.

A variable may be referred to generally (e.g., "each Y") or may be referred to specifically (e.g., $Y^1$, $Y^2$, etc.). Unless otherwise indicated, when a variable is referred to generally, it is meant to include all specific embodiments of that particular variable.

Provided herein in some embodiments is a compound of Formula (1)

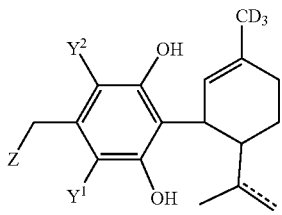

Formula (1)

or a pharmaceutically acceptable salt or solvate thereof,
wherein $Y^1$ and $Y^2$ are each independently hydrogen or deuterium, ------- is a single or a double bond, and Z is —CH$_2$CH$_3$, —CH$_2$CH$_2$CH$_3$, —CH$_2$CH$_2$CH$_2$CH$_3$ or

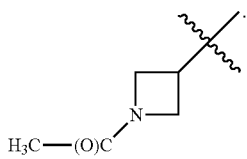

Provided herein in some embodiments is a compound of Formula I

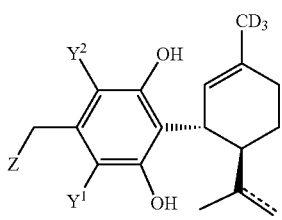

Formula I or a pharmaceutically acceptable salt or solvate thereof,
wherein $Y^1$ and $Y^2$ are each independently hydrogen or deuterium, ------- is a single or a double bond, and Z is —CH$_2$CH$_3$, —CH$_2$CH$_2$CH$_3$, —CH$_2$CH$_2$CH$_2$CH$_3$ or

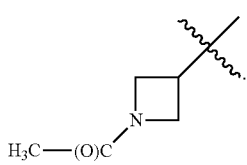

In some embodiments the compound of Formula I is selected from the group consisting of

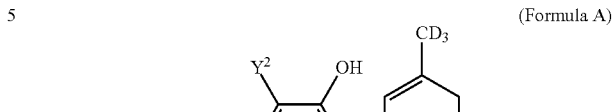
(Formula A)

(Formula B)

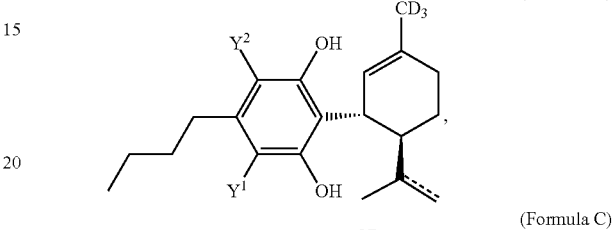
(Formula C)

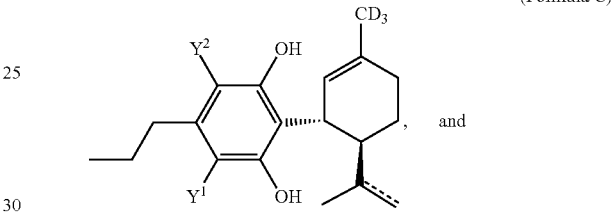
(Formula D)

or a pharmaceutically acceptable salt or solvate thereof.

In some embodiments the compound of Formula I is a compound of Formula A, or a pharmaceutically acceptable salt or solvate thereof.

In some embodiments the compound of Formula I is a compound of Formula B, or a pharmaceutically acceptable salt or solvate thereof.

In some embodiments the compound of Formula I is a compound of Formula C, or a pharmaceutically acceptable salt or solvate thereof.

In some embodiments the compound of Formula I is a compound of Formula D, or a pharmaceutically acceptable salt or solvate thereof.

In some embodiments of the compound of Formula (1), Formula I, Formula A, Formula B, Formula C, or Formula D, or a pharmaceutically acceptable salt or solvate of any of the foregoing, each of $Y^1$ and $Y^2$ is hydrogen.

In some embodiments of the compound of Formula (1), Formula I, Formula A, Formula B, Formula C, or Formula D, or a pharmaceutically acceptable salt or solvate of any of the foregoing, each of $Y^1$ and $Y^2$ is deuterium.

In some embodiments of the compound of Formula (1), Formula I, Formula A, Formula B, Formula C, or Formula D, or a pharmaceutically acceptable salt or solvate of any of the foregoing, ------ is a single bond.

In some embodiments of the compound of Formula (1), Formula I, Formula A, Formula B, Formula C, or Formula D, or a pharmaceutically acceptable salt or solvate of any of the foregoing, ===== is a double bond.

In some embodiments, provided herein is a pharmaceutical composition comprising a compound of Formula (1), Formula I, Formula A, Formula B, Formula C, or Formula D, or a pharmaceutically acceptable salt or solvate of any of the foregoing, as disclosed herein, and one or more pharmaceutically acceptable excipients.

In some embodiments, provided herein is a method of treating a condition, disease or disorder as disclosed herein in a subject in need of such treatment, comprising administering to a subject a therapeutically effective amount of a compound of Formula (1), Formula I, Formula A, Formula B, Formula C, or Formula D, or a pharmaceutically acceptable salt or solvate of any of the foregoing, or pharmaceutical composition comprising such compound or pharmaceutically acceptable salt or solvate thereof and one or more pharmaceutically acceptable excipients.

Enantiomers of the compounds of Formula (1), Formula I, Formula A, Formula B, Formula C, or Formula D, or a pharmaceutically acceptable salt or solvate of any of the foregoing, are also provided herein. Thus, provided herein in some embodiments is a compound of Formula I'

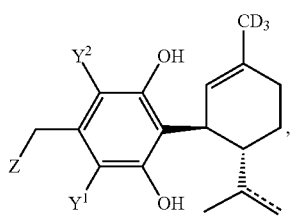

Formula I' or a pharmaceutically acceptable salt or solvate thereof, wherein $Y^1$ and $Y^2$ are each independently hydrogen or deuterium, ------ is a single or a double bond, and Z is —CH$_2$CH$_3$, —CH$_2$CH$_2$CH$_3$, —CH$_2$CH$_2$CH$_2$CH$_3$ or

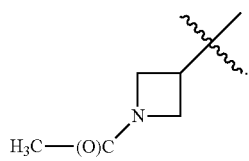

In some embodiments the compound of Formula I' is selected from the group consisting of

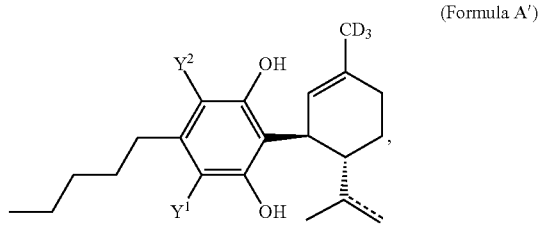

(Formula A')

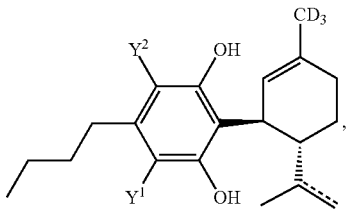

(Formula B')

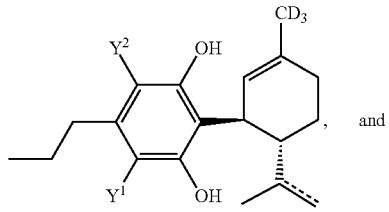

(Formula C')

, and

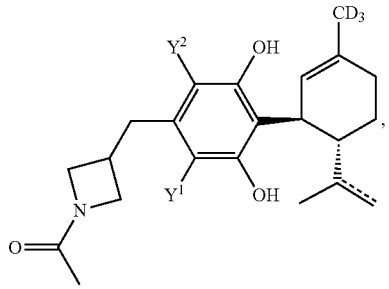

(Formula D')

or a pharmaceutically acceptable salt or solvate thereof.

In some embodiments, provided herein is a pharmaceutical composition comprising a compound of Formula I', Formula A', Formula B', Formula C', or Formula D', or a pharmaceutically acceptable salt or solvate of any of the foregoing, as disclosed herein, and one or more pharmaceutically acceptable excipients.

In some embodiments, provided herein is a method of treating a condition, disease or disorder as disclosed herein in a subject in need of such treatment, comprising administering to a subject a therapeutically effective amount of a compound of Formula I', Formula A', Formula B', Formula C', or Formula D', or a pharmaceutically acceptable salt or solvate of any of the foregoing, or pharmaceutical composition comprising such compound or pharmaceutically acceptable salt or solvate thereof and one or more pharmaceutically acceptable excipients.

The deuterated derivatives disclosed herein may be prepared in a manner analogous to that described for the non-deuterated compounds herein, or as shown in the schemes and examples herein, for example in Example 5 herein.

Additional methods of synthesizing the deuterated derivatives herein and their synthetic precursors, including those within routes not explicitly shown in schemes herein, are within the means of chemists of ordinary skill in the art. Synthetic chemistry transformations and protecting group methodologies (protection and deprotection) useful in synthesizing the applicable compounds are known in the art and include, for example, those described in Larock R, Comprehensive Organic Transformations, VCH Publishers (1989); Greene, T W et al., Protective Groups in Organic Synthesis, 3.sup.rd Ed., John Wiley and Sons (1999); Fieser, L et al., Fieser and Fieser's Reagents for Organic Synthesis, John Wiley and Sons (1994); and Paquette, L, ed., Encyclopedia of Reagents for Organic Synthesis, John Wiley and Sons (1995) and subsequent editions thereof.

The specific approaches and compounds shown above are not intended to be limiting. The chemical structures in the schemes herein depict variables that are hereby defined commensurately with chemical group definitions (moieties, atoms, etc.) of the corresponding position in the compound formulae herein, whether identified by the same variable name (e.g., Y1, etc.) or not. The suitability of a chemical group in a compound structure for use in the synthesis of another compound is within the knowledge of one of ordinary skill in the art.

Combinations of substituents and variables envisioned by this disclosure are only those that result in the formation of stable compounds.

The metabolic stability of a compound, such as a deuterated compound, may be determined by measuring the half-life of the compound in vitro or in an in vivo model. Example of in vitro systems suitable for determining metabolic stability include human liver microsomes, rat liver microsomes, mouse liver microsomes, and Supersomes™.

Tritiated Compounds

Provided herein in some embodiments is a compound of Formula (2)

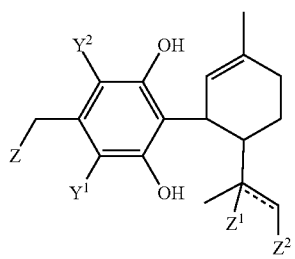

Formula (2)

or a pharmaceutically acceptable salt or solvate thereof, wherein $Y^1$ and $Y^2$ are each independently hydrogen or tritium, ˭˭˭˭˭˭˭ is a single or a double bond, provided that if ˭˭˭˭˭˭˭ is a double bond, then $Z^1$ and $Z^2$ are absent, and provided that if ˭˭˭˭˭˭˭ is a single bond, then $Z^1$ and $Z^2$ are each independently hydrogen or tritium, provided that the compound comprises tritium, and Z is —CH$_2$CH$_3$, —CH$_2$CH$_2$CH$_3$, —CH$_2$CH$_2$CH$_2$CH$_3$ or

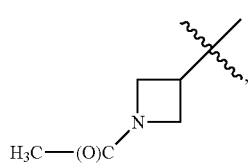

Provided herein in some embodiments is a compound of Formula II

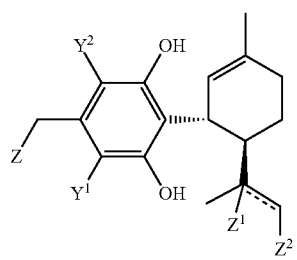

Formula II or a pharmaceutically acceptable salt or solvate thereof, wherein $Y^1$ and $Y^2$ are each independently hydrogen or tritium, ˭˭˭˭˭˭˭ is a single or a double bond, provided that if ˭˭˭˭˭˭˭ is a double bond, then $Z^1$ and $Z^2$ are absent, and provided that if ˭˭˭˭˭˭˭ is a single bond, then $Z^1$ and $Z^2$ are each independently hydrogen or tritium, provided that the compound comprises tritium, and Z is —CH$_2$CH$_3$, —CH$_2$CH$_2$CH$_3$, —CH$_2$CH$_2$CH$_2$CH$_3$ or

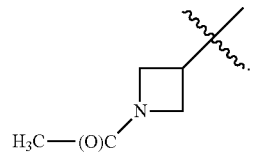

In some embodiments the compound of Formula II is selected from the group consisting of

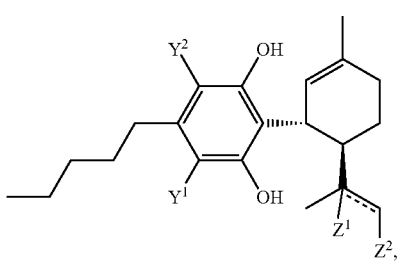

(Formula E)

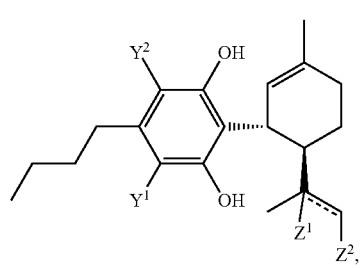

(Formula F)

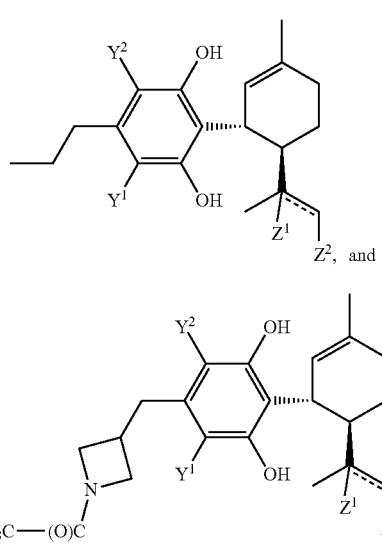

(Formula G)

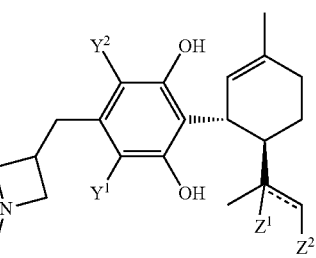

(Formula H)

or a pharmaceutically acceptable salt or solvate thereof.

In some embodiments the compound of Formula II is a compound of Formula E, or a pharmaceutically acceptable salt or solvate thereof.

In some embodiments the compound of Formula II is a compound of Formula F, or a pharmaceutically acceptable salt or solvate thereof.

In some embodiments the compound of Formula II is a compound of Formula G, or a pharmaceutically acceptable salt or solvate thereof.

In some embodiments the compound of Formula II is a compound of Formula H, or a pharmaceutically acceptable salt or solvate thereof.

In some embodiments of the compound of Formula (2), Formula II, Formula E, Formula F, Formula G, or Formula H, or a pharmaceutically acceptable salt or solvate of any of the foregoing, each of $Y^1$ and $Y^2$ is hydrogen.

In some embodiments of the compound of Formula (2), Formula II, Formula E, Formula F, Formula G, or Formula H, or a pharmaceutically acceptable salt or solvate of any of the foregoing, each of $Y^1$ and $Y^2$ is tritium.

In some embodiments of the compound of Formula (2), Formula II, Formula E, Formula F, Formula G, or Formula H, or a pharmaceutically acceptable salt or solvate of any of the foregoing, ====== is a single bond.

In some embodiments of the compound of Formula (2), Formula II, Formula E, Formula F, Formula G, or Formula H, or a pharmaceutically acceptable salt or solvate of any of the foregoing, ====== is a double bond.

In some embodiments of the compound of Formula (2), Formula II, Formula E, Formula F, Formula G, or Formula H, or a pharmaceutically acceptable salt or solvate of any of the foregoing, ====== is a single bond and each of $Z^1$ and $Z^2$ is hydrogen.

In some embodiments of the compound of Formula (2), Formula II, Formula E, Formula F, Formula G, or Formula H, or a pharmaceutically acceptable salt or solvate of any of the foregoing, ====== is a single bond, each of $Z^1$ and $Z^2$ is hydrogen, and each of $Y^1$ and $Y^2$ is tritium.

In some embodiments of the compound of Formula (2), Formula II, Formula E, Formula F, Formula G, or Formula H, or a pharmaceutically acceptable salt or solvate of any of the foregoing, ====== is a single bond and each of $Z^1$ and $Z^2$ is tritium.

In some embodiments of the compound of Formula (2), Formula II, Formula E, Formula F, Formula G, or Formula H, or a pharmaceutically acceptable salt or solvate of any of the foregoing, ====== is a single bond, each of $Z^1$ and $Z^2$ is tritium, and each of $Y^1$ and $Y^2$ is hydrogen.

In some embodiments of the compound of Formula (2), Formula II, Formula E, Formula F, Formula G, or Formula H, or a pharmaceutically acceptable salt or solvate of any of the foregoing, ====== is a single bond, each of $Z^1$ and $Z^2$ is tritium, and each of $Y^1$ and $Y^2$ is tritium.

In some embodiments of the compound of Formula (2), Formula II, Formula E, Formula F, Formula G, or Formula H, or a pharmaceutically acceptable salt or solvate of any of the foregoing, ====== is a double bond and each of $Y^1$ and $Y^2$ is tritium.

The tritiated derivatives disclosed herein may be prepared in a manner analogous to that described for the non-deuterated compounds herein, or as shown in the schemes and examples herein, for example in Example 6 herein.

In another aspect, provided herein is a method for quantifying one or more analytes in a sample, comprising: introducing any compound described herein (e.g., any cannabinoid derivative, any deuterated cannabinoid derivative, or any tritiated cannabinoid derivative) in the sample; and subjecting the sample to mass spectrometry. For example, in some embodiments, the compound described herein is used as an internal standard. In some embodiments, the compound described herein is used as an external standard.

In some embodiments, the compound is any deuterated or tritiated compound described herein, and one of the one or more analytes is any cannabinoid derivative described herein.

Processes of Preparation

In some embodiments, a cannabinoid can be prepared by hydrogenation of a cannabinoid having a double bond between the 8 and 9 positions. It is understood that the use of homogeneous catalysis results in a higher selectivity for hydrogenation of the double bond between the less sterically hindered 8 and 9 positions in relation to the double bond in the cyclohexene moiety.

In one aspect, provided herein is a process for preparing 8,9-dihydrocannabidivarin, or a pharmaceutically acceptable salt or solvate thereof, the method comprising hydrogenating cannabidivarin in the presence of a homogeneous catalyst to form 8,9-dihydrocannabidivarin. In some embodiments the homogeneous catalyst is a rhodium catalyst, a palladium catalyst, an iridium catalyst, a ruthenium catalyst, or a platinum catalyst.

In certain embodiments, the homogeneous catalyst is a rhodium catalyst. In some of these embodiments, the homogeneous catalyst is Wilkinson's catalyst or Schrock-Osborn catalyst. For example, the homogeneous catalyst is Wilkinson's catalyst.

In certain embodiments, the homogeneous catalyst is a palladium catalyst. For example, the homogeneous catalyst is [1,2-bis(diphenylphosphino)ethane]palladium.

In certain embodiments, the homogeneous catalyst is a iridium catalyst. For example, the homogenous catalyst is Crabtree's catalyst.

In certain embodiments, the homogeneous catalyst is a ruthenium catalyst.

In certain embodiments, the homogeneous catalyst is a platinum catalyst.

In one aspect, provided herein is a process for preparing 8,9-dihydrocannabidivarin, or a pharmaceutically acceptable salt or solvate thereof, the method comprising hydrogenating cannabidivarin in the presence of a heterogeneous catalyst to form 8,9-dihydrocannabidivarin.

In some embodiments the heterogeneous catalyst is Lindlar catalyst.

In one aspect, provided herein is a process for preparing 8,9-dihydronorcannabidiol, or a pharmaceutically acceptable salt or solvate thereof, the method comprising hydrogenating norcannabidiol in the presence of a homogeneous catalyst to form 8,9-dihydronorcannabidiol. In some embodiments the homogeneous catalyst is a rhodium catalyst, a palladium catalyst, an iridium catalyst, a ruthenium catalyst, or a platinum catalyst.

In certain embodiments, the homogeneous catalyst is a rhodium catalyst. In some of these embodiments, the homogeneous catalyst is Wilkinson's catalyst or Schrock-Osborn catalyst. For example, the homogeneous catalyst is Wilkinson's catalyst.

In certain embodiments, the homogeneous catalyst is a palladium catalyst. For example, the homogeneous catalyst is [1,2-bis(diphenylphosphino)ethane]palladium.

In certain embodiments, the homogeneous catalyst is a iridium catalyst. For example, the homogenous catalyst is Crabtree's catalyst.

In certain embodiments, the homogeneous catalyst is a ruthenium catalyst.

In certain embodiments, the homogeneous catalyst is a platinum catalyst.

In one aspect, provided herein is a process for preparing 8,9-dihydronorcannabidiol, or a pharmaceutically acceptable salt or solvate thereof, the method comprising hydrogenating norcannabidiol in the presence of a heterogeneous catalyst to form 8,9-dihydronorcannabidiol.

In some embodiments the heterogeneous catalyst is Lindlar catalyst.

In another aspect, provided herein is a process for preparing 8,9-dihydrocannabidiol, or a pharmaceutically acceptable salt or solvate thereof, the method comprising hydrogenating cannabidiol in the presence of a homogeneous catalyst to form 8,9-dihydrocannabidiol. In some embodiments the homogeneous catalyst is a rhodium catalyst, a palladium catalyst, an iridium catalyst, a ruthenium catalyst, or a platinum catalyst.

In certain embodiments, the homogeneous catalyst is a rhodium catalyst. In some of these embodiments, the homogeneous catalyst is Wilkinson's catalyst or Schrock-Osborn catalyst. For example, the homogeneous catalyst is Wilkinson's catalyst.

In certain embodiments, the homogeneous catalyst is a palladium catalyst. For example, the homogeneous catalyst is [1,2-bis(diphenylphosphino)ethane]palladium.

In certain embodiments, the homogeneous catalyst is a iridium catalyst. For example, the homogenous catalyst is Crabtree's catalyst.

In certain embodiments, the homogeneous catalyst is a ruthenium catalyst.

In certain embodiments, the homogeneous catalyst is a platinum catalyst.

In another aspect, provided herein is a process for preparing 8,9-dihydrocannabidiol, or a pharmaceutically acceptable salt or solvate thereof, the method comprising hydrogenating cannabidiol in the presence of Lindlar catalyst to form 8,9-dihydrocannabidiol.

In one aspect, provided herein is a process for preparing 1-(3-(((1'S,2'S)-2,6-dihydroxy-2'-isopropyl-5'-methyl-1',2', 3',4'-tetrahydro-[1,1'-biphenyl]-4-yl)methyl)azetidin-1-yl) ethan-1-one, or a pharmaceutically acceptable salt or solvate thereof, the method comprising hydrogenating 1-(3-(((1'R, 2'R)-2,6-dihydroxy-5'-methyl-2'-(prop-1-en-2-yl)-1',2',3',4'-tetrahydro-[1,1'-biphenyl]-4-yl)methyl)azetidin-1-yl)ethan-1-one in the presence of a homogeneous catalyst to form 1-(3-(((1'S,2'S)-2,6-dihydroxy-2'-isopropyl-5'-methyl-1',2', 3',4'-tetrahydro-[1,1'-biphenyl]-4-yl)methyl)azetidin-1-yl) ethan-1-one. In some embodiments the homogeneous catalyst is a rhodium catalyst, a palladium catalyst, an iridium catalyst, a ruthenium catalyst, or a platinum catalyst.

In certain embodiments, the homogeneous catalyst is a rhodium catalyst. In some of these embodiments, the homogeneous catalyst is Wilkinson's catalyst or Schrock-Osborn catalyst. For example, the homogeneous catalyst is Wilkinson's catalyst.

In certain embodiments, the homogeneous catalyst is a palladium catalyst. For example, the homogeneous catalyst is [1,2-bis(diphenylphosphino)ethane]palladium.

In certain embodiments, the homogeneous catalyst is a iridium catalyst. For example, the homogenous catalyst is Crabtree's catalyst.

In certain embodiments, the homogeneous catalyst is a ruthenium catalyst.

In certain embodiments, the homogeneous catalyst is a platinum catalyst.

In one aspect, provided herein is a process for preparing 1-(3-(((1'S,2'S)-2,6-dihydroxy-2'-isopropyl-5'-methyl-1',2', 3',4'-tetrahydro-[1,1'-biphenyl]-4-yl)methyl)azetidin-1-yl) ethan-1-one, or a pharmaceutically acceptable salt or solvate thereof, the method comprising hydrogenating 1-(3-(((1'R, 2'R)-2,6-dihydroxy-5'-methyl-2'-(prop-1-en-2-yl)-1',2',3',4'-tetrahydro-[1,1'-biphenyl]-4-yl)methyl)azetidin-1-yl)ethan-1-one in the presence of a heterogeneous catalyst to form 1-(3-(((1'S,2'S)-2,6-dihydroxy-2'-isopropyl-5'-methyl-1',2', 3',4'-tetrahydro-[1,1'-biphenyl]-4-yl)methyl)azetidin-1-yl) ethan-1-one.

In some embodiments the heterogeneous catalyst is Lindlar catalyst.

In some embodiments, 8,9-dihydrocannabidivarin, 8,9-dihydronorcannabidiol, 8,9-dihydrocannabidiol, and 1-(3-(((1'S,2'S)-2,6-dihydroxy-2'-isopropyl-5'-methyl-1',2',3',4'-tetrahydro-[1,1'-biphenyl]-4-yl)methyl)azetidin-1-yl)ethan-1-one can be prepared by reacting alpha-phellandrene with an appropriate resorcinol. The advantage of this process is that alpha-phellandrene and resorcinols are not controlled substances and are therefore easier to obtain. Chiral products can be obtained by using chiral alpha-phellandrene.

In another aspect, provided herein is a process for preparing 8,9-dihydrocannabidivarin, or a pharmaceutically acceptable salt or solvate thereof, comprising reacting alpha-phellandrene with 5-propylbenzene-1,3-diol:

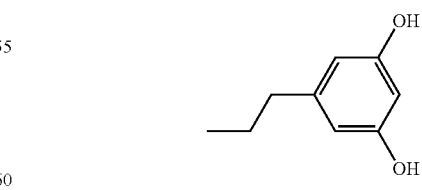

in the presence of an acid, to form 8,9-dihydrocannabidivarin.

In another aspect, provided herein is a process for preparing 8,9-dihydronorcannabidiol, or a pharmaceutically acceptable salt or solvate thereof, comprising reacting alpha-phellandrene with 5-butylbenzene-1,3-diol:

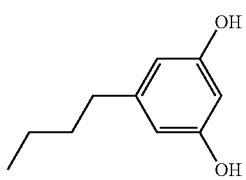

in the presence of an acid, to form 8,9-dihydronorcannabidiol.

In another aspect, provided herein is a process for preparing 8,9-dihydrocannabidiol, or a pharmaceutically acceptable salt or solvate thereof, comprising reacting alpha-phellandrene with 5-pentylbenzene-1,3-diol:

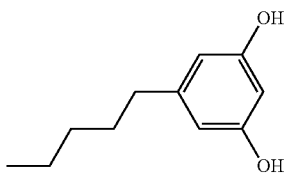

in the presence of an acid, to form 8,9-dihydrocannabidiol.

In another aspect, provided herein is a process for preparing 1-(3-(((1'S,2'S)-2,6-dihydroxy-2'-isopropyl-5'-methyl-1',2',3',4'-tetrahydro-[1,1'-biphenyl]-4-yl)methyl)azetidin-1-yl)ethan-1-one, or a pharmaceutically acceptable salt or solvate thereof, comprising reacting alpha-phellandrene with 1-(3-(3,5-dihydroxybenzyl)azetidin-1-yl)ethanone

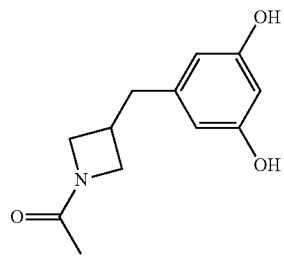 [SMILES: CC(=O)N1CC(Cc2cc(O)cc(O)c2)C1]

in the presence of an acid, to form 1-(3-(((1'S,2'S)-2,6-dihydroxy-2'-isopropyl-5'-methyl-1',2',3',4'-tetrahydro-[1,1'-biphenyl]-4-yl)methyl)azetidin-1-yl)ethan-1-one.

In some embodiments, reacting alpha-phellandrene with 5-propylbenzene-1,3-diol, 5-butylbenzene-1,3-diol, 5-pentylbenzene-1,3-diol, or 1-(3-(3,5-dihydroxybenzyl)azetidin-1-yl)ethanone is performed at a temperature from about 5° C. to about 400° C. (e.g., from about 5° C. to about 250° C.). For example, from about 5° C. to about 50° C., from about 50° C. to about 100° C., from about 100° C. to about 150° C., from about 150° C. to about 200° C., from about 200° C. to about 250° C., from about 250° C. to about 300° C., from about 300° C. to about 350° C., or from about 350° C. to about 400° C. In some other embodiments, reacting alpha-phellandrene with 5-propylbenzene-1,3-diol, 5-butylbenzene-1,3-diol, or 5-pentylbenzene-1,3-diol, or 1-(3-(3,5-dihydroxybenzyl)azetidin-1-yl)ethanone is performed at a temperature from about 20° C. to about 50° C. For example at about 25° C.

In some embodiments, reacting alpha-phellandrene with 5-propylbenzene-1,3-diol, 5-butylbenzene-1,3-diol, or 5-pentylbenzene-1,3-diol, or 1-(3-(3,5-dihydroxybenzyl)azetidin-1-yl)ethanone is performed for about 1 to about 24 hours. For example, for about 1 hour, for about 2 hours, for about 3 hours, for about 4 hours, for about 5 hours, for about 6 hours, for about 7 hours, for about 8 hours, for about 9 hours, for about 10 hours, for about 11 hours, for about 12 hours, for about 13 hours, for about 14 hours, for about 15 hours, for about 16 hours, for about 17 hours, for about 18 hours, for about 19 hours, for about 20 hours, for about 21 hours, for about 22 hours, for about 23 hours, or for about 24 hours.

In some embodiments, the acid is a protic or a Lewis acid. In some of these embodiments, the acid is a protic acid. For example, the acid is selected from the group consisting of: para-toluenesulfonic acid, trifluoroacetic acid, methanesulfonic acid, trifluoromethanesulfonic acid, and hydrochloric acid. In some other of these embodiments, the acid is a Lewis acid. For example, the acid is selected from the group consisting of: boron trichloride, boron trifluoride, and aluminum trichloride.

It is understood that the combination of variables in the formulae herein is such that the compounds are stable.

Pharmaceutical Compositions and Administration

General

In another aspect, provided herein is a pharmaceutical composition comprising any compound described herein, or a pharmaceutically acceptable salt or solvate thereof, and a pharmaceutically acceptable excipient.

In some embodiments, the chemical entities can be administered in combination with one or more conventional pharmaceutical excipients. Pharmaceutically acceptable excipients include, but are not limited to, ion exchangers, alumina, aluminum stearate, lecithin, self-emulsifying drug delivery systems (SEDDS) such as d-α-tocopherol polyethylene glycol 1000 succinate, surfactants used in pharmaceutical dosage forms such as Tweens, poloxamers or other similar polymeric delivery matrices, serum proteins, such as human serum albumin, buffer substances such as phosphates, tris, glycine, sorbic acid, potassium sorbate, partial glyceride mixtures of saturated vegetable fatty acids, water, salts or electrolytes, such as protamine sulfate, disodium hydrogen phosphate, potassium hydrogen phosphate, sodium-chloride, zinc salts, colloidal silica, magnesium trisilicate, polyvinyl pyrrolidone, cellulose-based substances, polyethylene glycol, sodium carboxymethyl cellulose, polyacrylates, waxes, polyethylene-polyoxypropylene-block polymers, and wool fat. Cyclodextrins such as α-, β, and γ-cyclodextrin, or chemically modified derivatives such as hydroxyalkylcyclodextrins, including 2- and 3-hydroxypropyl-β-cyclodextrins, or other solubilized derivatives can also be used to enhance delivery of compounds described herein. Dosage forms or compositions containing a chemical entity as described herein in the range of 0.005% to 100% with the balance made up from non-toxic excipient may be prepared. The contemplated compositions may contain 0.001%-100% of a chemical entity provided herein, in one embodiment 0.1-95%, in another embodiment 75-85%, in a further embodiment 20-80%. Actual methods of preparing such dosage forms are known, or will be apparent, to those skilled in this art; for example, see *Remington: The Science and Practice of Pharmacy*, 22$^{nd}$ Edition (Pharmaceutical Press, London, U K. 2012).

Routes of Administration and Composition Components

In some embodiments, the chemical entities described herein or a pharmaceutical composition thereof can be administered to subject in need thereof by any accepted route of administration. Acceptable routes of administration include, but are not limited to, buccal, cutaneous, endocervical, endosinusial, endotracheal, enteral, epidural, interstitial, intra-abdominal, intra-arterial, intrabronchial, intrabursal, intracerebral, intracisternal, intracoronary, intradermal, intraductal, intraduodenal, intradural, intraepidermal, intraesophageal, intragastric, intragingival, intraileal, intralymphatic, intramedullary, intrameningeal, intramuscular, intraovarian, intraperitoneal, intraprostatic, intrapulmonary, intrasinal, intraspinal, intrasynovial, intratesticular, intrathecal, intratubular, intratumoral, intrauterine, intravascular, intravenous, nasal, nasogastric, oral, parenteral, percutaneous, peridural, rectal, respiratory (inhalation), subcutaneous, sublingual, submucosal, topical, transdermal, transmucosal, transtracheal, ureteral, urethral and vaginal. In certain embodiments, a preferred route of administration is parenteral (e.g., intratumoral).

In some embodiments, the chemical entities can be administered orally, by inhalation, by suppository, or topically.

Compositions can be formulated for parenteral administration, e.g., formulated for injection via the intravenous, intramuscular, sub-cutaneous, or even intraperitoneal routes. Typically, such compositions can be prepared as injectables, either as liquid solutions or suspensions; solid forms suitable for use to prepare solutions or suspensions upon the addition of a liquid prior to injection can also be prepared; and the preparations can also be emulsified. The preparation of such formulations will be known to those of skill in the art in light of the present disclosure.

The pharmaceutical forms suitable for injectable use include sterile aqueous solutions or dispersions; formulations including sesame oil, peanut oil, or aqueous propylene glycol; and sterile powders for the extemporaneous preparation of sterile injectable solutions or dispersions. In all cases the form must be sterile and must be fluid to the extent that it may be easily injected. It also should be stable under the conditions of manufacture and storage and must be preserved against the contaminating action of microorganisms, such as bacteria and fungi.

The carrier also can be a solvent or dispersion medium containing, for example, water, ethanol, polyol (for example, glycerol, propylene glycol, and liquid polyethylene glycol, and the like), suitable mixtures thereof, and vegetable oils. The proper fluidity can be maintained, for example, by the use of a coating, such as lecithin, by the maintenance of the required particle size in the case of dispersion, and by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride. Prolonged absorption of the injectable compositions can be brought about by the use in the compositions of agents delaying absorption, for example, aluminum monostearate and gelatin.

Sterile injectable solutions are prepared by incorporating the active compounds in the required amount in the appropriate solvent with various of the other ingredients enumerated above, as required, followed by filtered sterilization. Generally, dispersions are prepared by incorporating the various sterilized active ingredients into a sterile vehicle which contains the basic dispersion medium and the required other ingredients from those enumerated above. In the case of sterile powders for the preparation of sterile injectable solutions, the preferred methods of preparation are vacuum-drying and freeze-drying techniques, which yield a powder of the active ingredient, plus any additional desired ingredient from a previously sterile-filtered solution thereof.

Intratumoral injections are discussed, e.g., in Lammers, et al., *"Effect of Intratumoral Injection on the Biodistribution and the Therapeutic Potential of HPMA Copolymer-Based Drug Delivery Systems" Neoplasia*. 2006, 10, 788-795.

In certain embodiments, the chemical entities described herein or a pharmaceutical composition thereof are suitable for local, topical administration to the digestive or GI tract, e.g., rectal administration. Rectal compositions include, without limitation, enemas, rectal gels, rectal foams, rectal aerosols, suppositories, jelly suppositories, and enemas (e.g., retention enemas).

Pharmacologically acceptable excipients usable in the rectal composition as a gel, cream, enema, or rectal suppository, include, without limitation, any one or more of cocoa butter glycerides, synthetic polymers such as polyvinylpyrrolidone, PEG (like PEG ointments), glycerine, glycerinated gelatin, hydrogenated vegetable oils, poloxamers, mixtures of polyethylene glycols of various molecular weights and fatty acid esters of polyethylene glycol Vaseline, anhydrous lanolin, shark liver oil, sodium saccharinate, menthol, sweet almond oil, sorbitol, sodium benzoate, anoxid SBN, vanilla essential oil, aerosol, parabens in phenoxyethanol, sodium methyl p-oxybenzoate, sodium propyl p-oxybenzoate, diethylamine, carbomers, carbopol, methyloxybenzoate, macrogol cetostearyl ether, cocoyl caprylocaprate, isopropyl alcohol, propylene glycol, liquid paraffin, xanthan gum, carboxy-metabisulfite, sodium edetate, sodium benzoate, potassium metabisulfite, grapefruit seed extract, methyl sulfonyl methane (MSM), lactic acid, glycine, vitamins, such as vitamin A and E and potassium acetate.

In certain embodiments, suppositories can be prepared by mixing the chemical entities described herein with suitable non-irritating excipients or carriers such as cocoa butter, polyethylene glycol or a suppository wax which are solid at ambient temperature but liquid at body temperature and therefore melt in the rectum and release the active compound. In other embodiments, compositions for rectal administration are in the form of an enema.

In other embodiments, the compounds described herein or a pharmaceutical composition thereof are suitable for local delivery to the digestive or GI tract by way of oral administration (e.g., solid or liquid dosage forms.).

Solid dosage forms for oral administration include capsules, tablets, pills, powders, and granules. In such solid dosage forms, the chemical entity is mixed with one or more pharmaceutically acceptable excipients, such as sodium citrate or dicalcium phosphate and/or: a) fillers or extenders such as starches, lactose, sucrose, glucose, mannitol, and silicic acid, b) binders such as, for example, carboxymethylcellulose, alginates, gelatin, polyvinylpyrrolidinone, sucrose, and acacia, c) humectants such as glycerol, d) disintegrating agents such as agar-agar, calcium carbonate, potato or tapioca starch, alginic acid, certain silicates, and sodium carbonate, e) solution retarding agents such as paraffin, f) absorption accelerators such as quaternary ammonium compounds, g) wetting agents such as, for example, cetyl alcohol and glycerol monostearate, h) absorbents such as kaolin and bentonite clay, and i) lubricants such as talc, calcium stearate, magnesium stearate, solid polyethylene glycols, sodium lauryl sulfate, and mixtures thereof. In the case of capsules, tablets and pills, the dosage form may also comprise buffering agents. Solid compositions of a similar type may also be employed as fillers in soft and hard-filled gelatin capsules using such excipients as lactose or milk sugar as well as high molecular weight polyethylene glycols and the like.

In one embodiment, the compositions will take the form of a unit dosage form such as a pill or tablet and thus the composition may contain, along with a chemical entity provided herein, a diluent such as lactose, sucrose, dicalcium phosphate, or the like; a lubricant such as magnesium stearate or the like; and a binder such as starch, gum acacia, polyvinylpyrrolidine, gelatin, cellulose, cellulose derivatives or the like. In another solid dosage form, a powder, marume, solution or suspension (e.g., in propylene carbonate, vegetable oils, PEG's, poloxamer 124 or triglycerides) is encapsulated in a capsule (gelatin or cellulose base capsule). Unit dosage forms in which one or more chemical entities provided herein or additional active agents are physically separated are also contemplated; e.g., capsules with granules (or tablets in a capsule) of each drug; two-layer tablets; two-compartment gel caps, etc. Enteric coated or delayed release oral dosage forms are also contemplated.

Other physiologically acceptable compounds include wetting agents, emulsifying agents, dispersing agents or preservatives that are particularly useful for preventing the growth or action of microorganisms. Various preservatives are well known and include, for example, phenol and ascorbic acid.

In certain embodiments the excipients are sterile and generally free of undesirable matter. These compositions can be sterilized by conventional, well-known sterilization techniques. For various oral dosage form excipients such as tablets and capsules sterility is not required. The USP/NF standard is usually sufficient.

In certain embodiments, solid oral dosage forms can further include one or more components that chemically and/or structurally predispose the composition for delivery of the chemical entity to the stomach or the lower GI; e.g., the ascending colon and/or transverse colon and/or distal colon and/or small bowel. Exemplary formulation techniques are described in, e.g., Filipski, K. J., et al., *Current Topics in Medicinal Chemistry*, 2013, 13, 776-802, which is incorporated herein by reference in its entirety.

Examples include upper-GI targeting techniques, e.g., Accordion Pill (Intec Pharma), floating capsules, and materials capable of adhering to mucosal walls.

Other examples include lower-GI targeting techniques. For targeting various regions in the intestinal tract, several enteric/pH-responsive coatings and excipients are available. These materials are typically polymers that are designed to dissolve or erode at specific pH ranges, selected based upon the GI region of desired drug release. These materials also function to protect acid labile drugs from gastric fluid or limit exposure in cases where the active ingredient may be irritating to the upper GI (e.g., hydroxypropyl methylcellulose phthalate series, Coateric (polyvinyl acetate phthalate), cellulose acetate phthalate, hydroxypropyl methylcellulose acetate succinate, Eudragit series (methacrylic acid-methyl methacrylate copolymers), and Marcoat). Other techniques include dosage forms that respond to local flora in the GI tract, Pressure-controlled colon delivery capsule, and Pulsincap.

Ocular compositions can include, without limitation, one or more of any of the following: viscogens (e.g., Carboxymethylcellulose, Glycerin, Polyvinylpyrrolidone, Polyethylene glycol); Stabilizers (e.g., Pluronic (triblock copolymers), Cyclodextrins); Preservatives (e.g., Benzalkonium chloride, ETDA, SofZia (boric acid, propylene glycol, sorbitol, and zinc chloride; Alcon Laboratories, Inc.), Purite (stabilized oxychloro complex; Allergan, Inc.)).

Topical compositions can include ointments and creams. Ointments are semisolid preparations that are typically based on petrolatum or other petroleum derivatives. Creams containing the selected active agent are typically viscous liquid or semisolid emulsions, often either oil-in-water or water-in-oil. Cream bases are typically water-washable, and contain an oil phase, an emulsifier and an aqueous phase. The oil phase, also sometimes called the "internal" phase, is generally comprised of petrolatum and a fatty alcohol such as cetyl or stearyl alcohol; the aqueous phase usually, although not necessarily, exceeds the oil phase in volume, and generally contains a humectant. The emulsifier in a cream formulation is generally a nonionic, anionic, cationic or amphoteric surfactant. As with other carriers or vehicles, an ointment base should be inert, stable, nonirritating and non-sensitizing.

In any of the foregoing embodiments, pharmaceutical compositions described herein can include one or more one or more of the following: lipids, interbilayer crosslinked multilamellar vesicles, biodegradeable poly(D,L-lactic-co-glycolic acid) [PLGA]-based or poly anhydride-based nanoparticles or microparticles, and nanoporous particle-supported lipid bilayers.

Dosages

The dosages may be varied depending on the requirement of the patient, the severity of the condition being treating and the particular compound being employed. Determination of the proper dosage for a particular situation can be determined by one skilled in the medical arts. The total daily dosage may be divided and administered in portions throughout the day or by means providing continuous delivery.

In some embodiments, the compounds described herein are administered at a dosage of from about 0.001 mg/Kg to about 500 mg/Kg (e.g., from about 0.001 mg/Kg to about 200 mg/Kg; from about 0.01 mg/Kg to about 200 mg/Kg; from about 0.01 mg/Kg to about 150 mg/Kg; from about 0.01 mg/Kg to about 100 mg/Kg; from about 0.01 mg/Kg to about 50 mg/Kg; from about 0.01 mg/Kg to about 10 mg/Kg; from about 0.01 mg/Kg to about 5 mg/Kg; from about 0.01 mg/Kg to about 1 mg/Kg; from about 0.01 mg/Kg to about 0.5 mg/Kg; from about 0.01 mg/Kg to about 0.1 mg/Kg; from about 0.1 mg/Kg to about 200 mg/Kg; from about 0.1 mg/Kg to about 150 mg/Kg; from about 0.1 mg/Kg to about 100 mg/Kg; from about 0.1 mg/Kg to about 50 mg/Kg; from about 0.1 mg/Kg to about 10 mg/Kg; from about 0.1 mg/Kg to about 5 mg/Kg; from about 0.1 mg/Kg to about 1 mg/Kg; from about 0.1 mg/Kg to about 0.5 mg/Kg).

In some embodiments, enema formulations include from about 0.5 mg to about 2500 mg (e.g., from about 0.5 mg to about 2000 mg, from about 0.5 mg to about 1000 mg, from about 0.5 mg to about 750 mg, from about 0.5 mg to about 600 mg, from about 0.5 mg to about 500 mg, from about 0.5 mg to about 400 mg, from about 0.5 mg to about 300 mg, from about 0.5 mg to about 200 mg; e.g., from about 5 mg to about 2500 mg, from about 5 mg to about 2000 mg, from about 5 mg to about 1000 mg; from about 5 mg to about 750 mg; from about 5 mg to about 600 mg; from about 5 mg to about 500 mg; from about 5 mg to about 400 mg; from about 5 mg to about 300 mg; from about 5 mg to about 200 mg; e.g., from about 50 mg to about 2000 mg, from about 50 mg to about 1000 mg, from about 50 mg to about 750 mg, from about 50 mg to about 600 mg, from about 50 mg to about 500 mg, from about 50 mg to about 400 mg, from about 50 mg to about 300 mg, from about 50 mg to about 200 mg; e.g., from about 100 mg to about 2500 mg, from about 100 mg to about 2000 mg, from about 100 mg to about 1000 mg, from about 100 mg to about 750 mg, from about 100 mg to about 700 mg, from about 100 mg to about 600 mg, from about 100 mg to about 500 mg, from about 100 mg to about 400 mg, from about 100 mg to about 300 mg, from about 100 mg to about 200 mg; e.g., from about 150 mg to about 2500 mg, from about 150 mg to about 2000 mg, from about 150 mg to about 1000 mg, from about 150 mg to about 750 mg, from about 150 mg to about 700 mg, from about 150 mg to about 600 mg, from about 150 mg to about 500 mg, from about 150 mg to about 400 mg, from about 150 mg to about 300 mg, from about 150 mg to about 200 mg; e.g., from about 150 mg to about 500 mg; e.g., from about 300 mg to about 2500 mg, from about 300 mg to about 2000 mg, from about 300 mg to about 1000 mg, from about 300 mg to about 750 mg, from about 300 mg to about 700 mg, from about 300 mg to about 600 mg; e.g., from about 400 mg to about 2500 mg, from about 400 mg to about 2000 mg, from about 400 mg to about 1000 mg, from about 400 mg to about 750 mg, from about 400 mg to about 700 mg, from about 400 mg to about 600 mg from about 400 mg to about 500 mg; e.g., 150 mg or 450 mg) of the chemical entity in from about 1 mL to about 3000 mL (e.g., from about 1 mL to about 2000 mL, from about 1 mL to about 1000 mL, from about 1 mL to about 500 mL, from about 1 mL to about 250 mL, from about 1 mL to about 100 mL, from about 10 mL to about 1000 mL, from about 10 mL to about 500 mL, from about 10 mL to about 250 mL, from about 10 mL to about 100 mL, from about 30 mL to about 90 mL, from about 40 mL to about 80 mL; from about 50 mL to about 70 mL; e.g., about 1 mL, about 5 mL, about 10 mL, about 15 mL, about 20 mL, about 25 mL, about 30 mL, about 35 mL, about 40 mL, about 45 mL, about 50 mL, about 55 mL, about 60 mL, about 65 mL, about 70 mL, about 75 mL, about 100 mL, about 250 mL, or about 500 mL, or about 1000 mL, or about 2000 mL, or about 3000 mL; e.g., 60 mL) of liquid carrier.

In certain embodiments, enema formulations include from about 50 mg to about 250 mg (e.g., from about 100 mg to about 200; e.g., about 150 mg) of the chemical entity in from about 10 mL to about 100 mL (e.g., from about 20 mL to about 100 mL, from about 30 mL to about 90 mL, from about 40 mL to about 80 mL; from about 50 mL to about 70 mL) of liquid carrier. In certain embodiments, enema formulations include about 150 mg of the chemical entity in about 60 mL of the liquid carrier. In certain of these embodiments, the chemical entity is a compound of Formula AA, or a pharmaceutically acceptable salt and/or hydrate and/or cocrystal thereof. For example, enema formulations can include about 150 mg of a compound of Formula AA in about 60 mL of the liquid carrier.

In certain embodiments, enema formulations include from about 350 mg to about 550 mg (e.g., from about 400 mg to about 500; e.g., about 450 mg) of the chemical entity in from about 10 mL to about 100 mL (e.g., from about 20 mL to about 100 mL, from about 30 mL to about 90 mL, from about 40 mL to about 80 mL; from about 50 mL to about 70 mL) of liquid carrier. In certain embodiments, enema formulations include about 450 mg of the chemical entity in about 60 mL of the liquid carrier. In certain of these embodiments, the chemical entity is a compound of Formula AA, or a pharmaceutically acceptable salt and/or hydrate and/or cocrystal thereof. For example, enema formulations can include about 450 mg of a compound of Formula AA in about 60 mL of the liquid carrier.

In some embodiments, enema formulations include from about from about 0.01 mg/mL to about 50 mg/mL (e.g., from about 0.01 mg/mL to about 25 mg/mL; from about 0.01 mg/mL to about 10 mg/mL; from about 0.01 mg/mL to about 5 mg/mL; from about 0.1 mg/mL to about 50 mg/mL; from about 0.01 mg/mL to about 25 mg/mL; from about 0.1 mg/mL to about 10 mg/mL; from about 0.1 mg/mL to about 5 mg/mL; from about 1 mg/mL to about 10 mg/mL; from about 1 mg/mL to about 5 mg/mL; from about 5 mg/mL to about 10 mg/mL; e.g., about 2.5 mg/mL or about 7.5 mg/mL) of the chemical entity in liquid carrier. In certain of these embodiments, the chemical entity is a compound of Formula AA, or a pharmaceutically acceptable salt and/or hydrate and/or cocrystal thereof. For example, enema formulations can include about 2.5 mg/mL or about 7.5 mg/mL of a compound of Formula AA in liquid carrier.

Regimens

The foregoing dosages can be administered on a daily basis (e.g., as a single dose or as two or more divided doses) or non-daily basis (e.g., every other day, every two days, every three days, once weekly, twice weeks, once every two weeks, once a month).

In some embodiments, the period of administration of a compound described herein is for 1 day, 2 days, 3 days, 4 days, 5 days, 6 days, 7 days, 8 days, 9 days, 10 days, 11 days, 12 days, 13 days, 14 days, 3 weeks, 4 weeks, 5 weeks, 6 weeks, 7 weeks, 8 weeks, 9 weeks, 10 weeks, 11 weeks, 12 weeks, 4 months, 5 months, 6 months, 7 months, 8 months, 9 months, 10 months, 11 months, 12 months, or more. In a further embodiment, a period of during which administration is stopped is for 1 day, 2 days, 3 days, 4 days, 5 days, 6 days, 7 days, 8 days, 9 days, 10 days, 11 days, 12 days, 13 days, 14 days, 3 weeks, 4 weeks, 5 weeks, 6 weeks, 7 weeks, 8 weeks, 9 weeks, 10 weeks, 11 weeks, 12 weeks, 4 months, 5 months, 6 months, 7 months, 8 months, 9 months, 10 months, 11 months, 12 months, or more. In an embodiment, a therapeutic compound is administered to an individual for a period of time followed by a separate period of time. In another embodiment, a therapeutic compound is administered for a first period and a second period following the first period, with administration stopped during the second period, followed by a third period where administration of the therapeutic compound is started and then a fourth period following the third period where administration is stopped. In an aspect of this embodiment, the period of administration of a therapeutic compound followed by a period where administration is stopped is repeated for a determined or undetermined period of time. In a further embodiment, a period of administration is for 1 day, 2 days, 3 days, 4 days, 5 days, 6 days, 7 days, 8 days, 9 days, 10 days, 11 days, 12 days, 13 days, 14 days, 3 weeks, 4 weeks, 5 weeks, 6 weeks, 7 weeks, 8 weeks, 9 weeks, 10 weeks, 11 weeks, 12 weeks, 4 months, 5 months, 6 months, 7 months, 8 months, 9 months, 10 months, 11 months, 12 months, or more. In a further embodiment, a period of during which administration is stopped is for 1 day, 2 days, 3 days, 4 days, 5 days, 6 days, 7 days, 8 days, 9 days, 10 days, 11 days, 12 days, 13 days, 14 days, 3 weeks, 4 weeks, 5 weeks, 6 weeks, 7 weeks, 8 weeks, 9 weeks, 10 weeks, 11 weeks, 12 weeks, 4 months, 5 months, 6 months, 7 months, 8 months, 9 months, 10 months, 11 months, 12 months, or more.

Methods of Treatment

In some embodiments, methods for treating a subject having a condition, disease, or disorder comprise administering to a subject in need of treatment a therapeutically effective amount of a chemical entity described herein (e.g., a compound described generically or specifically herein or a pharmaceutically acceptable salt thereof or compositions containing the same), a pharmaceutically acceptable salt or solvate thereof, or a pharmaceutical composition comprising the chemical entity.

Indications

In some embodiments, the condition, disease, or disorder is autistic spectrum disorder (ASD) or an ASD-associated disorder. In certain embodiments, the disorder is autistic spectrum disorder (ASD). In certain embodiments, the disorder is an ASD-associated disorder. In certain of these embodiments, the ASD-associated disorder is selected from the group consisting of Tuberous Sclerosis Complex, Fragile X syndrome, Cornelia de Lange syndrome, Down syndrome, Angelman syndrome, Coffin-Lowry syndrome, Cohen Laurence-Moon-Biedel syndrome, Marinesco-Sjogren syndrome, Moebius syndrome, Phelan-McDermid syndrome, CDKL5, Dup15q, Potocki-Lupski syndrome, Smith Lemli Optiz syndrome, Timothy syndrome, Prader-Willi syndrome, Rett syndrome, and Williams syndrome. For example, the ASD-associated disorder is selected from the group consisting of Fragile X syndrome (FXS), Rett syndrome (RS), and Angelman syndrome (AS).

In some embodiments of the treatment of ASD or an ASD-associated disorder, various behaviors can be measured to gauge improvement in behavior of the subject. These behaviors are delineated below.

In some embodiments (when the disorder is autistic spectrum disorder (ASD) or an ASD-associated disorder) the treating comprises improving one or more of (i) qualitative impairment in social interaction; (ii) qualitative impairment in communication; and (iii) restricted repetitive and stereotyped patterns of behavior, interest, and activities.

In some embodiments, improving (i) qualitative impairment in social interaction includes improving one or more of: (a) impairment (e.g., marked impairment) in the use of multiple nonverbal behaviors; (b) failure to develop peer relationships appropriate to developmental level; (c) a lack of spontaneous seeking to share enjoyment, interests, or achievements with other people; and (d) lack of social or emotional reciprocity.

In some embodiments, improving (ii) qualitative impairment in communication includes improving one or more of: (a) delay in, or lack of (e.g., total lack of), the development of spoken language; (b) in individuals with adequate speech, impairment (e.g., marked impairment) in the ability to initiate or sustain a conversation with others; (c) stereotyped and repetitive use of language or idiosyncratic language; and (d) lack of varied, spontaneous make-believe play or social imitative play appropriate to developmental level.

In some embodiments, improving (iii) restricted repetitive and stereotyped patterns of behavior, interest, and activities includes improving one or more of: (a) encompassing preoccupation with one or more stereotyped and restricted patterns of interest that is abnormal either in intensity or focus; (b) apparently inflexible adherence to specific, non-functional routines or rituals; (c) stereotyped and repetitive motor mannerisms; and (d) persistent preoccupation with parts of objects.

In any of the foregoing embodiments where the disorder is autistic spectrum disorder (ASD) or an ASD-associated disorder, the treating comprises improving one or more of: (a) persistent deficits in social communication and social interaction across contexts, not accounted for by general developmental delays, and (b) restricted, repetitive patterns of behavior, interests, or activities.

In some of these embodiments, improving (a) persistent deficits in social communication and social interaction across contexts, not accounted for by general developmental delays includes improving one or more of: (i) deficits in social-emotional reciprocity; (ii) deficits in nonverbal communicative behaviors used for social interaction; and (iii) deficits in developing and maintaining relationships.

In some of these embodiments, improving (b) restricted, repetitive patterns of behavior, interests, or activities includes improving one or more of: (i) stereotyped or repetitive speech, motor movements, or use of objects; or excessive adherence to routines, (ii) ritualized patterns of verbal or nonverbal behavior, or excessive resistance to change; (iii) highly restricted, fixated interests that are abnormal in intensity or focus; and (iv) hyper-or hypo-reactivity to sensory input or unusual interest in sensory aspects of environment.

The foregoing behavioral improvements can be measured on rats using the following tests.

Locomotor activity and repetitive behaviours: Locomotor activity can be recorded in an activity cage for 20 minutes with the aid of Anymaze program (Ugo Basile, Italy). In this period, repetitive behaviours (self-grooming and digging) can be measured by an observer blind to the treatment group.

Sociability and preference for social novelty: These behaviours can be investigated in 3-chamber apparatus which allows for the measurement of social approach and social preference. In brief, animals can be placed into a novel arena (80 cm 31.5 cm) composed of three communicating chambers separated by Perspex walls with central openings allowing access to all chambers for 5 min.

Distance moved (m) and time spent (s) in the various compartments can be assessed during this time to evaluate general locomotor activity and ensure that animals do not have a preference for a particular side of the arena.

Following this acclimatisation period, animals can be briefly confined to the central chamber while an unfamiliar rat confined in a small wire cage is placed in one of the outer chambers. An identical empty wire cage can be placed in the other chamber. The unfamiliar rat can then be randomly assigned to either the right or left chamber of the arena. The test animal can then be then allowed to explore the arena/chambers for a further 5 min. Time spent engaging in investigatory behaviour with the rat can be evaluated with the aid of Anymaze program (Ugo Basile, Italy) in order to examine social approach.

To investigate the preference for social novelty, a novel unfamiliar rat can then be placed in the empty cage and the test animal allowed to explore the arena/chambers for a further 5 min. Time spent engaging in investigatory behaviour with the novel unfamiliar rat can be evaluated with the aid of Anymaze program (Ugo Basile, Italy) in order to examine preference for social novelty.

In some embodiments, the condition, disease, or disorder is schizophrenia. In some embodiments (when the disorder is schizophrenia), the treating comprises treatment of negative symptoms. In some embodiments (when the disorder is schizophrenia), the treating comprises treatment of social withdrawal.

In some embodiments, the condition, disease, or disorder is cognitive dysfunction. In certain embodiments, the cognitive dysfunction is selected from the group consisting of: Alzheimer's Disease, Parkinson's disease, Huntington's disease, Tourette syndrome, general dementia, anxiety, post-traumatic stress disorder, depression, obsessive compulsive disorder, and Creutzfeldt-Jakob disease.

In some embodiments, the condition, disease, or disorder is memory impairment. In certain embodiments, the memory impairment is short-term memory impairment. In certain other embodiments, the memory impairment is long-term memory impairment.

In some embodiments, the condition, disease, or disorder is seizure.

In some embodiments, the condition, disease, or disorder is a cardiovascular disorder.

In some embodiments, the condition, disease, or disorder is diabetes.

In some embodiments, the condition, disease, or disorder is addiction.

In some embodiments, the condition, disease, or disorder is a sleep disorder. In certain embodiments, the sleep disorder is selected from the group consisting of: sleep apnea and insomnia.

In some embodiments, the condition, disease, or disorder is an eating disorder. In certain embodiments, the eating disorder is selected from the group consisting of: anorexia nervosa and bulimia.

In some embodiments, the condition, disease, or disorder is chronic fatigue syndrome.

In some embodiments, the condition, disease or disorder is selected from: inappropriate host responses to infectious diseases where active infection exists at any body site, such as septic shock, disseminated intravascular coagulation, and/or adult respiratory distress syndrome; acute or chronic inflammation due to antigen, antibody and/or complement deposition; inflammatory disorders including arthritis (e.g., rheumatoid arthritis, osteoarthritis, or IBD-associated arthritis), cholangitis, colitis, encephalitis, endocarditis, glomerulonephritis, hepatitis, myocarditis, pancreatitis, pericarditis, reperfusion injury, vasculitis, septic shock, chronic obstructive pulmonary disease (COPD), inflammatory bowel disease (IBD), erythema nodosum, gout, lupus, hypertension, and periodontal disease; immune-based diseases such as acute and delayed hypersensitivity, graft rejection, and graft-versus-host disease; auto-immune diseases including Type 1 diabetes mellitus and multiple sclerosis. For example, the condition, disease or disorder may be an inflammatory disorder such as rheumatoid arthritis, osteoarthritis, septic shock, COPD and periodontal disease.

In some embodiments, the condition, disease or disorder is an autoimmune diseases. Non-limiting examples include rheumatoid arthritis, systemic lupus erythematosus, multiple sclerosis, inflammatory bowel diseases (IBDs) comprising Crohn disease (CD) and ulcerative colitis (UC), which are chronic inflammatory conditions with polygenic susceptibility. In certain embodiments, the condition is an inflammatory bowel disease. In certain embodiments, the condition is Crohn's disease, autoimmune colitis, iatrogenic autoimmune colitis, ulcerative colitis, colitis induced by one or more chemotherapeutic agents, colitis induced by treatment with adoptive cell therapy, colitis associated by one or more alloimmune diseases (such as graft-vs-host disease, e.g., acute graft vs. host disease and chronic graft vs. host disease), radiation enteritis, collagenous colitis, lymphocytic colitis, microscopic colitis, and radiation enteritis. In certain of these embodiments, the condition is alloimmune disease (such as graft-vs-host disease, e.g., acute graft vs. host disease and chronic graft vs. host disease), celiac disease, irritable bowel syndrome, rheumatoid arthritis, lupus, scleroderma, psoriasis, cutaneous T-cell lymphoma, uveitis, and mucositis (e.g., oral mucositis, esophageal mucositis or intestinal mucositis).

In some embodiments, the condition, disease or disorder is selected from major adverse cardiovascular disorders and events such as cardiovascular death, non-fatal myocardial infarction and non-fatal stroke in patients with a prior hear attack and inflammatory atherosclerosis (see for example, NCT01327846).

In certain embodiments, the inflammatory disorder is selected from the group consisting of: rheumatoid arthritis, osteoarthritis, septic shock, chronic obstructive pulmonary disease (COPD), inflammatory bowel disease (IBD), IBD-associated arthritis, erythema nodosum, gout, lupus, hypertension, and periodontal disease.

In some embodiments, the condition, disease or disorder is selected from metabolic disorders such as diabetes (e.g., type 2 diabetes), atherosclerosis, obesity and gout, as well as diseases of the central nervous system, such as Alzheimer's disease and multiple sclerosis and Amyotrophic Lateral Sclerosis and Parkinson disease, lung disease, such as asthma and COPD and pulmonary idiopathic fibrosis, liver disease, such as NASH syndrome, viral hepatitis and cirrhosis, pancreatic disease, such as acute and chronic pancreatitis, kidney disease, such as acute and chronic kidney injury, intestinal disease such as Crohn's disease and Ulcerative Colitis, skin disease such as psoriasis, musculoskeletal disease such as scleroderma, vessel disorders, such as giant cell arteritis, disorders of the bones, such as osteoarthritis, osteoporosis and osteopetrosis disorders eye disease, such as glaucoma and macular degeneration, diseased caused by viral infection such as HIV and AIDS, autoimmune disease such as Rheumatoid Arthritis, Systemic Lupus Erythematosus, Autoimmune Thyroiditis, Addison's disease, pernicious anemia, cancer and aging.

In some embodiments, the condition, disease or disorder is a cardiovascular disorder. In some embodiments, the condition, disease or disorder is myocardial infraction. In some embodiments, the condition, disease or disorder is stroke.

In some embodiments, the condition, disease, or disorder is eye disease.

In some embodiments, the condition, disease, or disorder is obesity.

In some embodiments, the condition, disease or disorder is Type 2 Diabetes.

In some embodiments, the condition, disease or disorder is NASH.

In some embodiments, the condition, disease or disorder is Alzheimer's disease.

In some embodiments, the condition, disease or disorder is gout.

In some embodiments, the condition, disease or disorder is SLE.

In some embodiments, the condition, disease or disorder is rheumatoid arthritis.

In some embodiments, the condition, disease or disorder is IBD.

In some embodiments, the condition, disease or disorder is multiple sclerosis.

In some embodiments, the condition, disease or disorder is COPD.

In some embodiments, the condition, disease or disorder is asthma.

In some embodiments, the condition, disease or disorder is scleroderma.

In some embodiments, the condition, disease or disorder is pulmonary fibrosis.

In some embodiments, the condition, disease or disorder is age related macular degeneration (AMD).

In some embodiments, the condition, disease or disorder is cystic fibrosis.

In some embodiments, the condition, disease or disorder is Muckle Wells syndrome.

In some embodiments, the condition, disease or disorder is familial cold autoinflammatory syndrome (FCAS).

In some embodiments, the condition, disease or disorder is chronic neurologic cutaneous and articular syndrome.

In some embodiments, the condition, disease, or disorder is cancer. In some embodiments, the condition, disease or disorder is selected from: myelodysplastic syndromes (MDS); non-small cell lung cancer; acute lymphoblastic leukemia (ALL) (e.g, ALL in patients resistant to glucocorticoids treatment); Langerhan's cell histiocytosis (LCH); multiple myeloma; promyelocytic leukemia; acute myeloid leukemia (AML) chronic myeloid leukemia (CML); gastric cancer; and lung cancer metastasis.

In some embodiments, the condition, disease or disorder is selected from: myelodysplastic syndromes (MDS); non-small cell lung cancer; acute lymphoblastic leukemia (ALL) (e.g., ALL in patients resistant to glucocorticoids treatment); Langerhan's cell histiocytosis (LCH); multiple myeloma; promyelocytic leukemia; gastric cancer; and lung cancer metastasis.

In some embodiments, the indication is MDS.

In some embodiments, the indication is ALL in patients resistant to glucocorticoids treatment.

In some embodiments, the indication is LCH.

In some embodiments, the indication is multiple myeloma.

In some embodiments, the indication is promyelocytic leukemia.

In some embodiments, the indication is gastric cancer.

In some embodiments, the indication is lung cancer metastasis.

Combination Therapy

This disclosure contemplates both monotherapy regimens as well as combination therapy regimens.

In some embodiments, the methods described herein can further include administering one or more additional therapies (e.g., one or more additional therapeutic agents and/or one or more therapeutic regimens) in combination with administration of the compounds described herein.

In certain embodiments, the second therapeutic agent or regimen is administered to the subject prior to contacting with or administering the chemical entity (e.g., about one hour prior, or about 6 hours prior, or about 12 hours prior, or about 24 hours prior, or about 48 hours prior, or about 1 week prior, or about 1 month prior).

In other embodiments, the second therapeutic agent or regimen is administered to the subject at about the same time as contacting with or administering the chemical entity. By way of example, the second therapeutic agent or regimen and the chemical entity are provided to the subject simultaneously in the same dosage form. As another example, the second therapeutic agent or regimen and the chemical entity are provided to the subject concurrently in separate dosage forms.

In still other embodiments, the second therapeutic agent or regimen is administered to the subject after contacting with or administering the chemical entity (e.g., about one hour after, or about 6 hours after, or about 12 hours after, or about 24 hours after, or about 48 hours after, or about 1 week after, or about 1 month after).

In some embodiments, the second therapeutic agent is selected from the group consisting of: an anti-epileptic drug (AED), an anti-psychotic drug, melatonin, a selective serotonin reuptake inhibitor (SSRI), and methylphenidate.

Compound Preparation

As can be appreciated by the skilled artisan, methods of synthesizing the compounds of the formulae herein will be evident to those of ordinary skill in the art. Synthetic chemistry transformations and protecting group methodologies (protection and deprotection) useful in synthesizing the compounds described herein are known in the art and include, for example, those such as described in R. Larock, Comprehensive Organic Transformations, VCH Publishers (1989); T. W. Greene and RGM. Wuts, Protective Groups in Organic Synthesis, 2d. Ed., John Wiley and Sons (1991); L. Fieser and M. Fieser, Fieser and Fieser's Reagents for Organic Synthesis, John Wiley and Sons (1994); and L. Paquette, ed., Encyclopedia of Reagents for Organic Synthesis, John Wiley and Sons (1995), and subsequent editions thereof.

PREPARATIVE EXAMPLES

General

Evaporations can be carried out on a Buchi® rotary evaporator (model RE 111) at bath temperatures less than 40° C. Glass pipettes can be used for all liquid transfers. Analytical and preparative thin layer chromatography (TLC) can be performed on Analtech® silica gel coated glass plates. Analytical and preparative high performance liquid chromatography (HPLC) can be done on a PerkinElmer® Series 200 instrument with peak detection obtained by UV. Mass spectrometry can be accomplished on a Thermo Finnigan™ LCQ Deca LCMSMS. NMR spectra can be obtained on a Bruker® 300 MHz NMR spectrometer and chemical shift values are expressed in parts per million (ppm) downfield from internal tetramethylsilane. All chemicals used can be reagent grade.

Example 1. Preparation of 8,9-Dihydrocannabidiol

Method 1: Hydrogenation Using Wilkinson's Catalyst

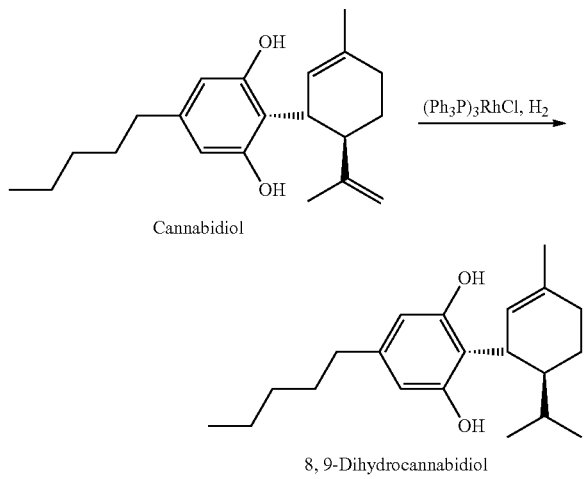

A solution of 157 mg (0.5 mmol) of cannabidiol with 20 mg of tris(triphenylphosphine)rhodium(I) chloride (Wilkinson's catalyst, Sigma-Aldrich 205036) in 25 ml of benzene can be stirred and hydrogenated at atmospheric pressure and ambient temperature for 4 h. After this time, the reaction can be stopped and the solvent evaporated under high vacuum. The crude product residue can be purified by preparative TLC on two 1000 µm silica gel plates developed with hexane:ethyl acetate (10:2). After plate development and brief air drying, the appropriate bands can be visualized (UV), scraped from each plate, combined and eluted with ethanol. The ethanol layer can be evaporated and dried under high vacuum to afford 148 mg (94% yield) of 8,9-dihydrocannabidiol as a light yellow oil. The 8,9-dihydrocannabidiol can be homogeneous on silica gel TLC (hexane:ethyl acetate (10:2)) by UV visualization and 98% pure by HPLC (reverse phase eluted with acetonitrile:water (60:40)). The 8,9-dihydrocannabidiol can also provide a proton NMR (CDCl$_3$) as well as an ESI mass spectrum in agreement with the expected structure.

Method 2: Hydrogenation Using Lindlar Catalyst

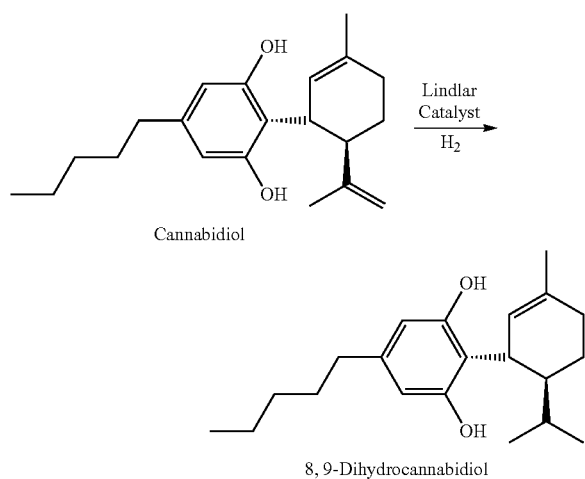

A solution of 100 mg (0.32 mmol) of cannabidiol with 20 mg of Lindlar catalyst (Sigma-Aldrich 62145) in 25 ml of ethyl acetate can be stirred and hydrogenated at atmospheric pressure and ambient temperature for 4 h. After this time, the reaction can be stopped and the solvent can be first filtered free of catalyst then evaporated under high vacuum. The crude product residue can be purified by preparative TLC on two 1000 μm silica gel plates developed with hexane:ethyl acetate (10:2). After plate development and brief air drying, the appropriate bands can be visualized (UV), scraped from each plate, combined and eluted with ethanol. The ethanol layer can be evaporated and dried under high vacuum to afford 93 mg (92% yield) of 8,9-dihydrocannabidiol as a light yellow oil. The 8,9-dihydrocannabidiol product can be homogeneous on silica gel TLC (hexane:ethyl acetate (10:2)) by UV visualization and 98% pure by HPLC (reverse phase eluted with acetonitrile:water (60:40)). The 8,9-dihydrocannabidiol product can also provide a proton NMR (CDCl$_3$) as well as an ESI mass spectrum in agreement with the expected structure.

Method 3: From Alpha-Phellandrene

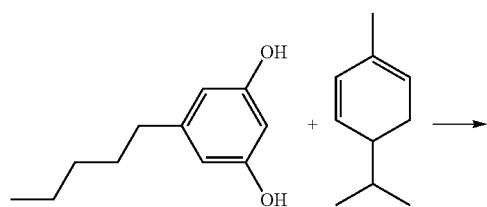

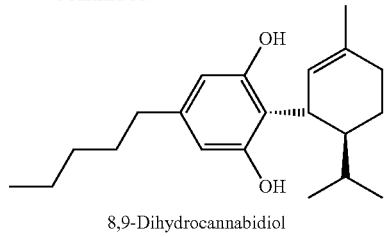

Evaporations were carried out on a Buchi® rotary evaporator (model RE 111) at bath temperatures less than 40° C. Glass pipettes were used for all liquid transfers. Analytical and preparative thin layer chromatography (TLC) were performed on Analtech® silica gel coated glass plates. Analytical and preparative high-performance liquid chromatography (HPLC) were done on a PerkinElmer® Series 200 instrument with peak detection obtained by UV. Mass spectrometry was accomplished on a Thermo Finnigan™ LCQ Deca LCMSMS. NMR spectra were obtained on a Bruker® 300 MHz NMR spectrometer and chemical shift values are expressed in parts per million (ppm) downfield from internal tetramethylsilane. All chemicals used were reagent grade.

alpha-Phellandrene (64 mg, 0.47 mmol, Food Grade >85%, Sigma-Aldrich W285611) was added to a 50 mL round bottom flask fitted with a teflon coated spin bar followed by the addition of olivetol (77 mg, 0.43 mmol, Sigma-Aldrich 152633) as a solid. Then, 3 mL of anhydrous toluene (Sigma-Aldrich 244511) was added to the flask and it was stirred at ambient temperature for about 15 min until a clear solution was obtained. Then, 14 mg (0.074 mol) of p-toluenesulfonic acid monohydrate (Sigma-Aldrich 402885) was added to the solution and it appeared to only partially dissolve. This mixture was then stirred at ambient temperature under nitrogen for 1 h. After this time, the reaction was vigorously stirred for 1 h with 10 ml of an aqueous saturated sodium bicarbonate solution. The toluene layer was carefully drawn off with a pipette and the aqueous layer was washed with another two×10 mL of toluene. The combined toluene layers were evaporated by rotary evaporation to give 147 mg of a residue. The crude product residue was purified by preparative TLC on two 1000 μm silica gel plates (Analtech 32013, 20×20 cm) developed with hexane: diethyl ether (20:1.5). After plate development and brief air drying, the appropriate bands were visualized (UV, Rf=0.51), scraped from each plate, combined and eluted with ethanol. The ethanol layer was evaporated and dried under high vacuum to afford 70 mg (52% yield) of 8,9-dihydrocannabidiol as a light-yellow oil. The product was homogeneous on silica gel TLC (hexane:diethyl ether (20: 1.5)) by UV and Iodine visualization (Rf=0.51) as well as HPLC (reverse phase eluted with acetonitrile:water (60:40)). The product also provided a proton NMR (CDCl$_3$) as well as an ESI mass spectrum in agreement with the expected structure. Proton NMR (CDCl$_3$): 6.4-6.0 (3H, br s), 5.52 (1H, br s), 3.81 (1H, br d) 2.46 (2H, t), 2.3-1.2 (15H), 0.89 ppm (9H). ESI MS: [M+H]317.33 m/z

Example 2: Preparation of 8,9-Dihydronorcannabidiol

Method 1: From Alpha-Phellandrene

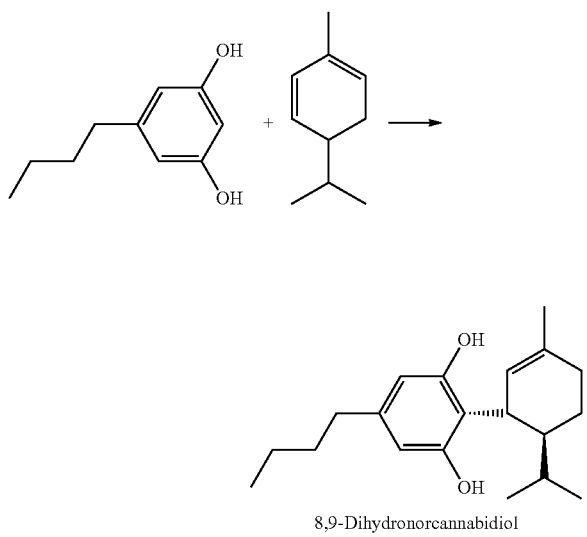

8,9-Dihydronorcannabidiol 8, 9-Dihydronorcannabidiol: A solution of 133 mg (0.8 mmol) of 5-butylbenzene-1, 3-diol (Toronto Research Chemicals B850055) with 136 mg (1 mmol) of alpha-phellandrene (Sigma-Aldrich W285611) and 57 mg (0.3 mol) of p-toluenesulfonic acid monohydrate (Sigma-Aldrich T35920) in 5 ml of toluene can be stirred at ambient temperature under nitrogen for 2 h. After this time, the reaction can be washed with three 10 ml portions of saturated sodium bicarbonate. The toluene layer can be dried over sodium sulfate, filtered and evaporated. The crude product residue can be purified by preparative TLC on two 1000 μm silica gel plates developed with hexane:ethyl acetate (10:2). After plate development and brief air drying, the appropriate bands can be visualized (UV), scraped from each plate, combined and eluted with ethanol. The ethanol layer can be evaporated and dried under high vacuum to afford 161 mg (67% yield) of racemic-8,9-dihydronorcannabidiol as a light yellow oil. The 8,9-dihydronorcannabidiol product can be homogeneous on silica gel TLC (hexane:ethyl acetate (10:2)) by UV visualization and 98% pure by HPLC (reverse phase eluted with acetonitrile:water (60:40)). The 8,9-dihydronorcannabidiol product can also provide a proton NMR (CDCl$_3$) as well as an ESI mass spectrum in agreement with the expected structure.

Method 2: Hydrogenation Using Homogeneous Catalysis

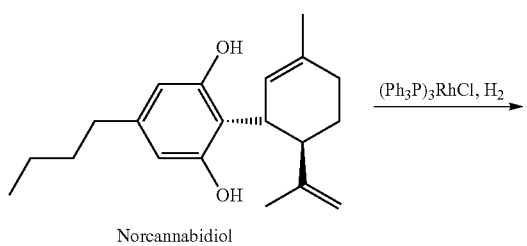

Norcannabidiol

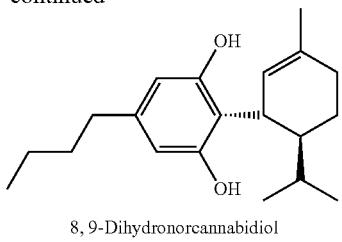

8, 9-Dihydronorcannabidiol 8, 9-Dihydronorcannabidiol: A solution of 151 mg (0.5 mmol) of norcannabidiol with 20 mg of tris(triphenylphosphine)rhodium(I) chloride (Wilkinson's catalyst, Sigma-Aldrich 205036) in 25 ml of benzene can be stirred and hydrogenated at atmospheric pressure and ambient temperature for 4 h. After this time, the reaction can be stopped and the solvent can be evaporated under high vacuum. The crude product residue can be purified by preparative TLC on two 1000 μm silica gel plates developed with hexane:ethyl acetate (10:2). After plate development and brief air drying, the appropriate bands can be visualized (UV), scraped from each plate, combined and eluted with ethanol. The ethanol layer can be evaporated and dried under high vacuum to afford 141 mg (92% yield) of 8,9-dihydronorcannabidiol as a light yellow oil. The 8,9-dihydronorcannabidiol product can be homogeneous on silica gel TLC (hexane:ethyl acetate (10:2)) by UV visualization and 98% pure by HPLC (reverse phase eluted with acetonitrile:water (60:40)). The 8,9-dihydronorcannabidiol product can also provide a proton NMR (CDCl$_3$) as well as an ESI mass spectrum in agreement with the expected structure.

Example 3. Preparation of 8,9-dihydrocannabidivarin

Method 1: From Alpha-Phellandrene

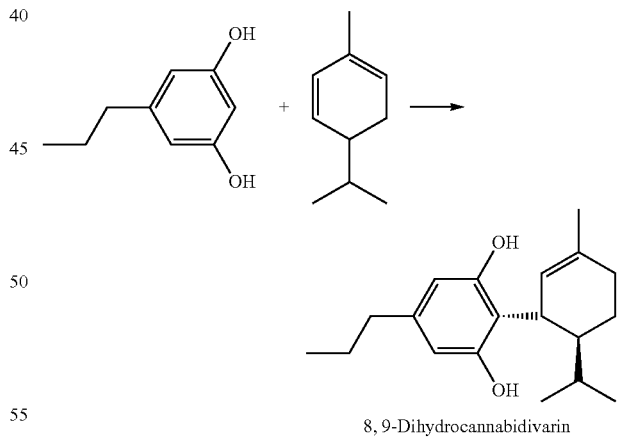

8, 9-Dihydrocannabidivarin

Evaporations were carried out on a Buchi® rotary evaporator (model RE 111) at bath temperatures less than 40° C. Glass pipettes were used for all liquid transfers. Analytical and preparative thin layer chromatography (TLC) were performed on Analtech® silica gel coated glass plates. Analytical and preparative high-performance liquid chromatography (HPLC) were done on a PerkinElmer® Series 200 instrument with peak detection obtained by UV. Mass spectrometry was accomplished on a Thermo Finnigan™ LCQ Deca LCMSMS. NMR spectra were obtained on a Bruker®

300 MHz NMR spectrometer and chemical shift values are expressed in parts per million (ppm) downfield from internal tetramethylsilane. All chemicals used were reagent grade.

alpha-Phellandrene (62 mg, 0.46 mmol, Food Grade >85%, Sigma-Aldrich W285611) was added to a 50 mL round bottom flask fitted with a teflon coated spin bar followed by the addition of 5-propylbenzene-1, 3-diol (65 mg, 0.43 mmol, Click-1 Chemistry 3C00959) as a solid. Then, 5.5 mL of anhydrous toluene (Sigma-Aldrich 244511) was added to the flask and it was stirred at ambient temperature for about 15 min until a clear solution was obtained. Then, 14 mg (0.074 mol) of p-toluenesulfonic acid monohydrate (Sigma-Aldrich 402885) was added to the solution and it appeared to only partially dissolve. This mixture was then stirred at ambient temperature under nitrogen for 1.5 h. After this time, the reaction was vigorously stirred for 1 h with 10 mL of an aqueous saturated sodium bicarbonate solution. The toluene layer was carefully drawn off with a pipette and the aqueous layer was washed with another two×10 mL of toluene. The combined toluene layers were evaporated by rotary evaporation to give 121 mg of a residue. The crude product residue was purified by preparative TLC on two 1000 μm silica gel plates (Analtech 32013, 20×20 cm) developed with hexane:diethyl ether (11:2). After plate development and brief air drying, the appropriate bands were visualized (UV, Rf=0.61), scraped from each plate, combined and eluted with ethanol. The ethanol layer was evaporated and dried under high vacuum to afford 66 mg (53% yield) of 8, 9-dihydrocannabidivarin as a light-yellow oil. The product was homogeneous on silica gel TLC (hexane:diethyl ether (11:2)) by UV and Iodine visualization (Rf=0.61) as well as HPLC (reverse phase eluted with acetonitrile:water (60:40)). The product also provided a proton NMR (CDCl$_3$) as well as an ESI mass spectrum in agreement with the expected structure. Proton NMR (CDCl$_3$): 6.4-6.0 (3H, br s), 5.52 (1H, br s), 3.81 (1H, br d) 2.44 (2H, t), 2.3-1.2 (13H), 0.89 ppm (9H). MS: [M–H] 287.28 m/z. $^{13}$C NMR (CDCl$_3$): 156.06 (broad), 154.29 (broad), 142.68, 140.05, 124.80, 114.00, 109.80 (broad), 107.87 (broad), 43.64, 37.61, 35.48, 30.66, 27.81, 24.06, 23.64, 22.09, 21.73, 16.37, 13.92

Method 2: Hydrogenation Using Homogeneous Catalysis

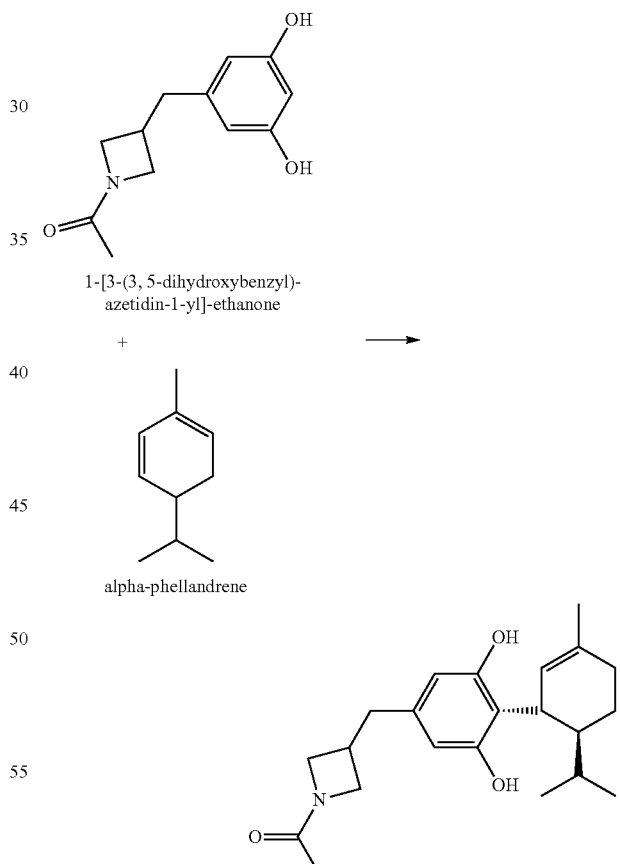

8, 9-Dihydrocannabidivarin: A solution of 143 mg (0.5 mmol) of cannabidivarin with 20 mg of tris(triphenylphosphine)rhodium(I) chloride (Wilkinson's catalyst, Sigma-Aldrich 205036) in 25 ml of benzene can be stirred and hydrogenated at atmospheric pressure and ambient temperature for 4 h. After this time, the reaction can be stopped and the solvent was evaporated under high vacuum. The crude product residue can be purified by preparative TLC on two 1000 μm silica gel plates developed with hexane:ethyl acetate (10:2). After plate development and brief air drying, the appropriate bands can be visualized (UV), scraped from each plate, combined and eluted with ethanol. The ethanol layer can be evaporated and dried under high vacuum to afford 139 mg (96% yield) of 8,9-dihydrocannabidivarin as a light yellow oil. The 8,9-dihydrocannabidivarin product can be homogeneous on silica gel TLC (hexane:ethyl acetate (10:2)) by UV visualization and 98% pure by HPLC (reverse phase eluted with acetonitrile:water (60:40)). The 8,9-dihydrocannabidivarin product can also provide a proton NMR (CDCl$_3$) as well as an ESI mass spectrum in agreement with the expected structure.

Example 4. Preparation of 1-(3-(((1'S,2'S)-2,6-dihydroxy-2'-isopropyl-5'-methyl-1',2',3',4'-tetrahydro-[1,1'-biphenyl]-4-yl)methyl)azetidin-1-yl)ethan-1-one Method 1: From Alpha-Phellandrene

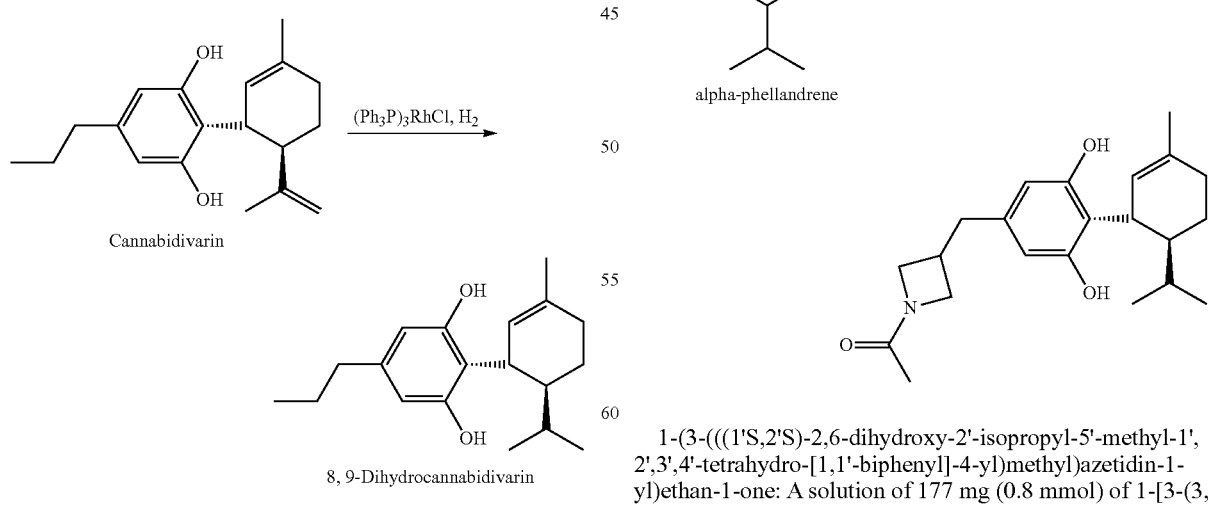

1-(3-(((1'S,2'S)-2,6-dihydroxy-2'-isopropyl-5'-methyl-1',2',3',4'-tetrahydro-[1,1'-biphenyl]-4-yl)methyl)azetidin-1-yl)ethan-1-one: A solution of 177 mg (0.8 mmol) of 1-[3-(3,5-dihydroxybenzyl)-azetidin-1-yl]-ethanone with 136 mg (1 mmol) of alpha-phellandrene (Sigma-Aldrich catalog number W285611) and 57 mg (0.3 mol) of p-toluenesulfonic acid monohydrate (Sigma-Aldrich catalog number T35920) in 5 ml of toluene can be stirred at ambient temperature under nitrogen for 2 h. After this time, the reaction can be washed with three 10 ml portions of saturated sodium bicarbonate. The toluene layer can be dried over sodium sulfate, filtered and evaporated. The crude product residue can be purified by preparative TLC on two 1000 μm silica gel plates developed with hexane:ethyl acetate (10:2). After plate development and brief air drying, the appropriate bands can be visualized (UV), scraped from each plate, combined and eluted with ethanol. The ethanol layer can be evaporated and dried under high vacuum to afford 189 mg (66% yield) of 1-(3-(((1'S,2'S)-2,6-dihydroxy-2'-isopropyl-5'-methyl-1',2',3',4'-tetrahydro-[1,1'-biphenyl]-4-yl)methyl)azetidin-1-yl)ethan-1-one as a light yellow oil. The product can be homogeneous on silica gel TLC (hexane:ethyl acetate (10:2)) by UV visualization and 98% pure by HPLC (reverse phase eluted with acetonitrile:water (60:40)). It can also provide a proton NMR (CDCl$_3$) as well as an ESI mass spectrum in agreement with the expected structure.

Method 2: Hydrogenation Using Homogeneous Catalysis

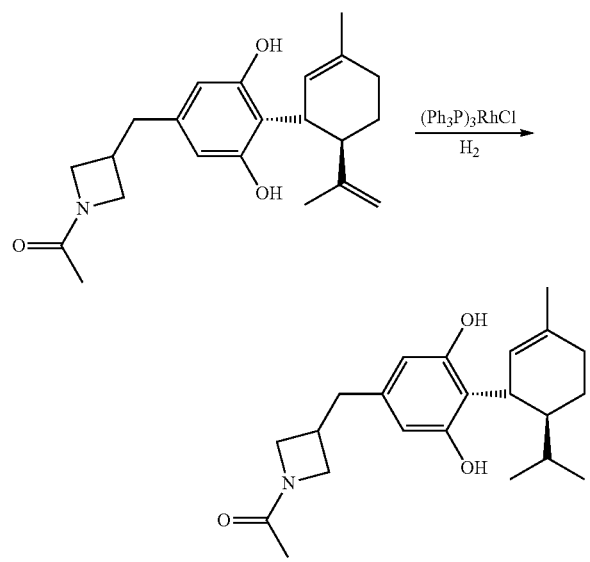

1-(3-(((1'S,2'S)-2,6-dihydroxy-2'-isopropyl-5'-methyl-1',2',3',4'-tetrahydro-[1,1'-biphenyl]-4-yl)methyl)azetidin-1-yl)ethan-1-one: A solution of 178 mg (0.5 mmol) of 1-(3-(((1'R,2'R)-2,6-dihydroxy-5'-methyl-2'-(prop-1-en-2-yl)-1',2',3',4'-tetrahydro-[1,1'-biphenyl]-4-yl)methyl)azetidin-1-yl)ethan-1-one with 20 mg of tris(triphenylphosphine)rhodium(I) chloride (Wilkinson's catalyst, Sigma-Aldrich catalog number 205036) in 25 ml of benzene can be stirred and hydrogenated at atmospheric pressure and ambient temperature for 4 h. After this time, the reaction can be stopped and the solvent can be evaporated under high vacuum. The crude product residue can be purified by preparative TLC on two 1000 μm silica gel plates developed with hexane:ethyl acetate (10:2). After plate development and brief air drying, the appropriate bands can be visualized (UV), scraped from each plate, combined and eluted with ethanol. The ethanol layer can be evaporated and dried under high vacuum to afford 166 mg (93% yield) of 1-(3-(((1'S,2'S)-2,6-dihydroxy-2'-isopropyl-5'-methyl-1',2',3',4'-tetrahydro-[1,1'-biphenyl]-4-yl)methyl)azetidin-1-yl)ethan-1-one as a light yellow oil. The product can be homogeneous on silica gel TLC (hexane:ethyl acetate (10:2)) by UV visualization and 98% pure by HPLC (reverse phase eluted with acetonitrile:water (60:40)). It can also provide a proton NMR (CDCl$_3$) as well as an ESI mass spectrum in agreement with the expected structure.

Example 5. Preparation of

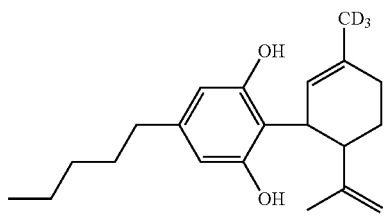 [SMILES: [2H]C([2H])([2H])C1=CC(c2c(O)cc(CCCCC)cc2O)C(C(=C)C)CC1]

[1-Perdeuteromethyl]-4-isopropenyl-2-cyclohexen-1-ol: To a flame dried 50 ml round bottom flask can be added 369 mg (1.5 mmol) of anhydrous cerium(III) chloride (TCI America C2058) followed by 10 ml of dry THF. The reaction can be cooled to −78° C. and then 38 mg (1.5 mmol) of perdeutero methyllithium (prepared from CD$_3$I, Cambridge Isotope Laboratories, DLM-362) using a literature method (Organic Syntheses Collective Volume 5 (1973) 860) in 5 ml of dry THF can be added dropwise by syringe with stirring under nitrogen. The reaction can be then stirred at −78° C. for 1 h. After this time, 138 mg (1 mmol) of 4-isopropenyl-2-cyclohexene-1-one (Aurora Fine Chemicals) in 5 ml of dry THF can ber added dropwise by syringe and the reaction was stirred at −78° C. for 3 h under nitrogen. The reaction can be then quenched with 20 ml of saturated ammonium chloride solution. It can be further diluted with another 10 ml of water and extracted with three 10 ml portions of diethyl ether. The combined diethyl ether layers can be dried over sodium sulfate, filtered and carefully evaporated (caution—volatile product) to give 121 mg (77% yield) of [1-perdeuteromethyl]-4-isopropenyl-2-cyclohexen-1-ol as an oil. [1-Perdeuteromethyl]-4-isopropenyl-2-cyclohexen-1-ol can be 98% pure by HPLC (normal phase eluted with chloroform:methanol (95:5)). It can also be co-chromatographed with authentic 1-methyl-4-isopropenyl-2-cyclohexen-1-ol (Advanced Organic Synthesis) in this system and provide a proton NMR (CDCl$_3$) as well as an ESI mass spectrum in agreement with the expected structure

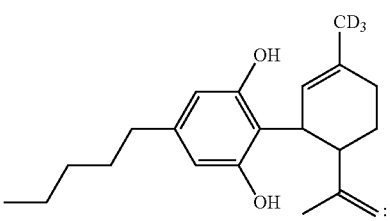 [SMILES: [2H]C([2H])([2H])C1=CC(c2c(O)cc(CCCCC)cc2O)C(C(=C)C)CC1]

A solution of 100 mg (0.64 mmol) of [1-perdeuteromethyl]-4-isopropenyl-2-cyclohexen-1-ol with 103 mg (0.57 mmol) of olivetol (Sigma-Aldrich 152633) and 32 mg (0.17 mol) of p-toluenesulfonic acid monohydrate (Sigma-Aldrich T35920) in 2 ml of toluene can be stirred at ambient temperature for 1 h. After this time, the reaction can be washed with three 10 ml portions of saturated sodium bicarbonate. The toluene layer can be dried over sodium sulfate, filtered and evaporated. The residue can be purified by preparative TLC on two 1000 µm silica gel plates developed with hexane:ethyl acetate (10:2). Authentic standard cannabidiol can be also applied in a separate side lane on each TLC plate to facilitate product identification by UV. After plate development and brief air drying, the appropriate bands can be visualized, scraped from each plate, combined and eluted with ethanol. The ethanol layer can be evaporated and dried under high vacuum to afford 47 mg (26% yield) of the product,

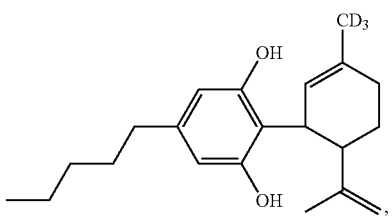

as a light yellow oil. The product can be homogeneous on silica gel TLC (hexane:ethyl acetate (10:2)) by UV visualization and 98% pure by HPLC (reverse phase eluted with acetonitrile:water (60:40)). It can also be co-chromatographed with authentic cannabidiol in these systems and provide a proton NMR (CDCl$_3$) as well as an ESI mass spectrum in agreement with the expected structure.

The chiral compound 7-CD$_3$-cannabidiol (3 in the scheme below) may be prepared in a manner analogous to racemic

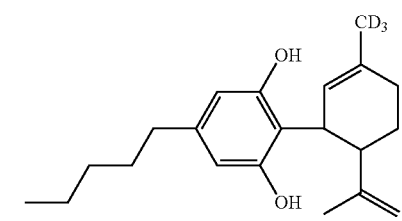 [SMILES: [2H]C([2H])([2H])C1=CC(c2c(O)cc(CCCCC)cc2O)C(C(=C)C)CC1]

in Example 6.

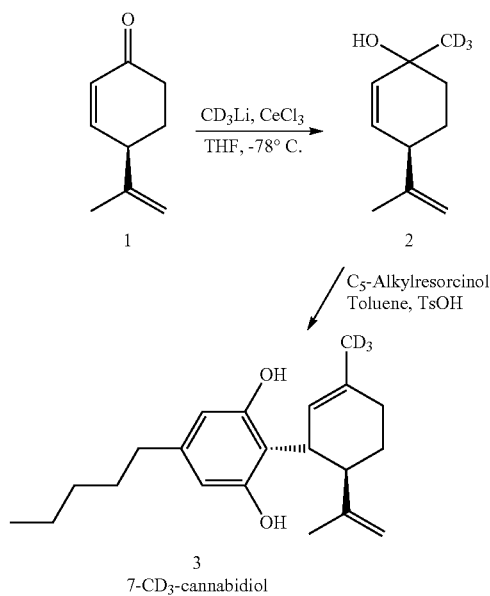

In Examples 7-9 below, "T"=tritium.

Example 6. Preparation of

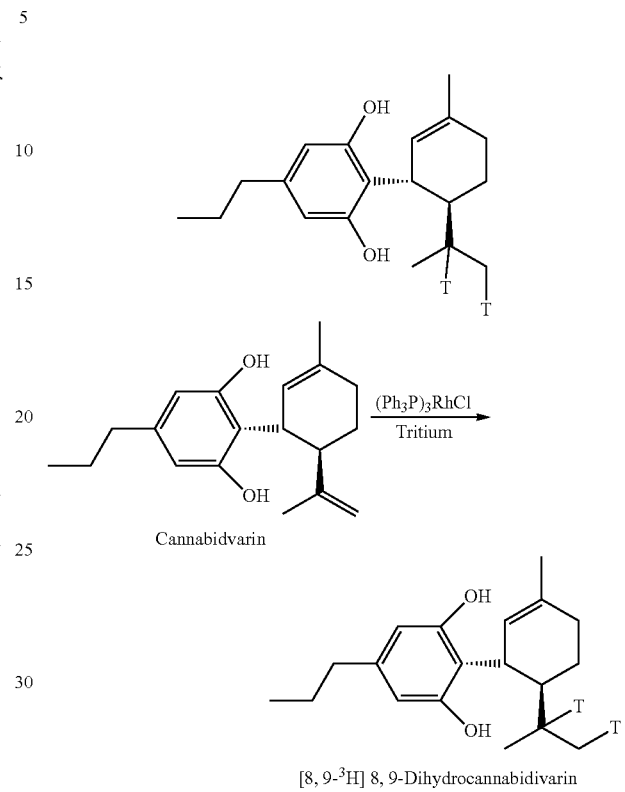

[8,9-$^3$H] 8,9-Dihydrocannabidivarin

The compound

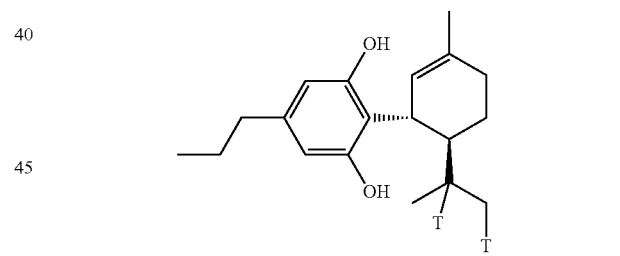

([8,9-$^3$H]8,9-dihydrocannabidivarin) may be prepared by catalytic tritiation of the terminal double bond of cannabidivarin, as shown in the above scheme.

Example 7. Preparation of

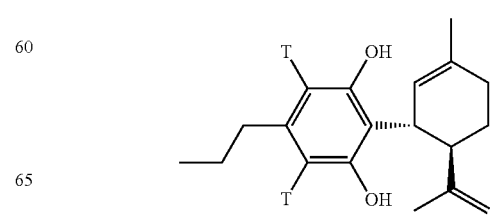

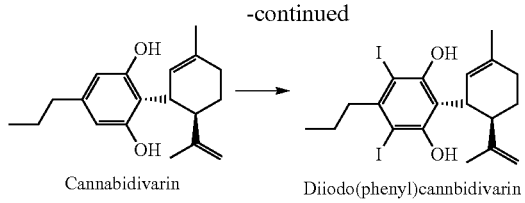

Cannabidivarin      Diiodo(phenyl)cannbidivarin

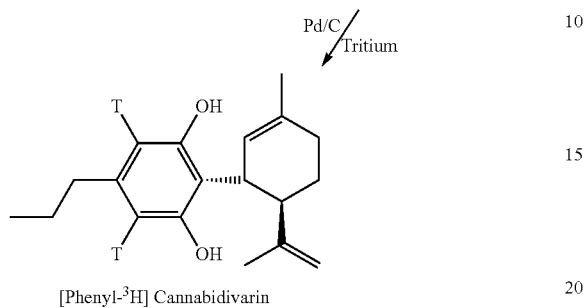

[Phenyl-³H] Cannabidivarin

Diiodo(phenyl)cannabidivarin. To a solution of 100 mg (0.35 mmol) of cannabidivarin in 20 mL of acetonitrile can be added 225 mg (1 mmol) of N-iodosuccinimide (Sigma-Aldrich 220051) and 50 mg of p-toluenesulfonic acid monohydrate (Sigma-Aldrich T35920). The reaction can be then stirred at ambient temperature under nitrogen overnight. After this time, the acetonitrile can be removed by vacuum distillation and the residue can be dissolved in 25 mL of ethyl acetate. The ethyl acetate can be washed with three 10 mL portions of saturated sodium bicarbonate and dried over sodium sulfate. The ethyl acetate layer can be evaporated and the residue can be purified by preparative TLC on two 1000 micron silica gel plates developed with hexane:ethyl acetate (15:2). After plate development and brief air drying, the appropriate bands can be visualized, scraped from each plate, combined and eluted with ethanol. The ethanol layer can be evaporated and dried under high vacuum to afford 124 mg (0.23 mmol, 66% yield) of diiodo(phenyl)cannabidivarin which was homogeneous on silica gel TLC (hexane:ethyl acetate (15:2)) by UV visualization and HPLC (reverse phase eluted with acetonitrile:water (60:40)). The product can also provide a proton NMR (CDCl₃) as well as an ESI mass spectrum which is in agreement with the proposed structure. In particular, the proton NMR showed the absence of any aromatic protons.

[Phenyl-³H] Cannabidivarin. A solution of 25 mg (0.046 mmol) of diiodo(phenyl)-cannabidivarin in 10 mL of ethanol can be catalytically reduced with 60 Ci of tritium using 20 mg of 10% palladium on carbon with rapid stirring at ambient temperature for 4 h. After this time, the catalyst can be filtered and labile tritium can be removed by several sequential vacuum evaporations of methanol, yielding crude product. All of this material can be purified by preparative TLC on two 1000 micron silica gel plates developed with hexane:ethyl acetate (10:2). Authentic cannabidivarin can be also applied in a separate side lane on each TLC plate to facilitate product identification by UV. After plate development and brief air drying, the appropriate bands can be visualized, scraped from each plate, combined and eluted with ethanol to afford 903 mCi (a 38% radiochemical yield based on diiodo(phenyl)cannabidivarin) of [phenyl-³H] cannabidivarin which can be 98% radiochemically pure on silica gel TLC (hexane:ethyl acetate (10:2)) and HPLC (reverse phase eluted with acetonitrile:water (60:40)). The product [phenyl-³H] cannabidivarin can also be co-chromatographed with authentic cannabidivarin in these systems and its specific activity can be measured to be 52 Ci/mmol by mass spectrometry. The distinctive UV (ethanol) spectrum of [phenyl-³H] cannabidivarin can be identical to that of authentic cannabidivarin as well. A proton decoupled tritium NMR (CDCl₃) of [phenyl-³H] cannabidivarin indicated that the tritium incorporation can be predominantly on the resorcinol aromatic ring.

Example 8. Preparation of

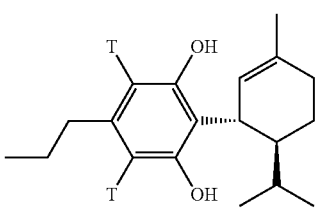

The compound

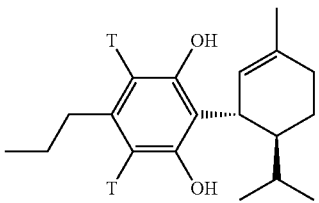

([Phenyl-³H] 8,9-dihydrocannabidivarin) may be prepared from 8,9-dihydrocannabidivarin in a manner analogous to that disclosed in Example 8:

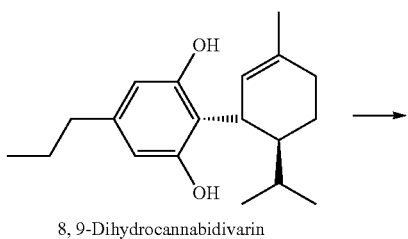

8, 9-Dihydrocannabidivarin

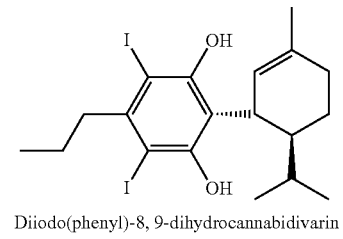

Diiodo(phenyl)-8, 9-dihydrocannabidivarin

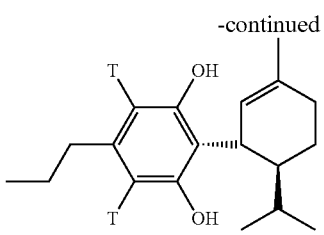

[Phenyl-³H] 8, 9-Dihydrocannabidivarin

Diiodo(phenyl)-8, 9-Dihydrocannabidivarin. To a solution of 100 mg (0.35 mmol) of 8, 9-dihydrocannabidivarin in 20 mL of acetonitrile can be added 225 mg (1 mmol) of N-iodosuccinimide (Sigma-Aldrich 220051) and 50 mg of p-toluenesulfonic acid monohydrate (Sigma-Aldrich T35920). The reaction can be then stirred at ambient temperature under nitrogen overnight. After this time, the acetonitrile can be removed by vacuum distillation and the residue was dissolved in 25 mL of ethyl acetate. The ethyl acetate can be washed with three 10 mL portions of saturated sodium bicarbonate and dried over sodium sulfate. The ethyl acetate layer can be evaporated and the residue can be purified by preparative TLC on two 1000 micron silica gel plates developed with hexane:ethyl acetate (15:2). After plate development and brief air drying, the appropriate bands can be visualized, scraped from each plate, combined and eluted with ethanol. The ethanol layer can be evaporated and dried under high vacuum to afford 140 mg (0.26 mmol, 74% yield) of diiodo(phenyl)-8, 9-dihydrocannabidivarin which can be homogeneous on silica gel TLC (hexane:ethyl acetate (15:2)) by UV visualization and HPLC (reverse phase eluted with acetonitrile:water (60:40)). The product can also provide a proton NMR (CDCl₃) as well as an ESI mass spectrum which can be in agreement with the proposed structure. In particular, the proton NMR may show the absence of any aromatic protons.

[Phenyl-³H] 8, 9-Dihydrocannabidivarin. A solution of 25 mg (0.046 mmol) of diiodo(phenyl)-8, 9-dihydrocannabidivarin in 10 mL of ethanol can be catalytically reduced with 60 Ci of tritium using 20 mg of 10% palladium on carbon with rapid stirring at ambient temperature for 4 h. After this time, the catalyst can be filtered and labile tritium can be removed by several sequential vacuum evaporations of methanol, yielding crude product. All of this material can be purified by preparative TLC on two 1000 micron silica gel plates developed with hexane:ethyl acetate (10:2). Authentic 8, 9-dihydrocannabidivarin can be also applied in a separate side lane on each TLC plate to facilitate product identification by UV. After plate development and brief air drying, the appropriate bands can be visualized, scraped from each plate, combined and eluted with ethanol to afford 1030 mCi (a 47% radiochemical yield based on diiodo(phenyl)-8, 9-dihydrocannabidivarin) of [phenyl-³H] 8, 9-dihydrocannabidivarin which can be 98% radiochemically pure on silica gel TLC (hexane:ethyl acetate (10:2)) and HPLC (reverse phase eluted with acetonitrile:water (60:40)). The product [phenyl-³H]8, 9-dihydrocannabidivarin can alsobe co-chromatographed with authentic 8, 9-dihydrocannabidivarin in these systems and its specific activity can be measured to be 48 Ci/mmol by mass spectrometry. The distinctive UV (ethanol) spectrum of [phenyl-³H]8, 9-dihydrocannabidivarin can be identical to that of authentic 8, 9-dihydro-cannabidivarin as well. A proton decoupled tritium NMR (CDCl₃) of [phenyl-³H]8, 9-dihydrocannabidivarin may indicate that the tritium incorporation was predominantly on the resorcinol aromatic ring.

EMBODIMENTS

Some further and/or alternative description of these embodiments as well variations thereof are presented in the following embodiments:

Embodiment 1. A compound selected from the group consisting of

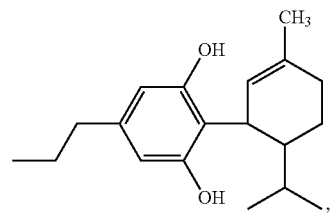

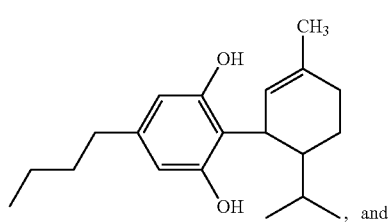
, and

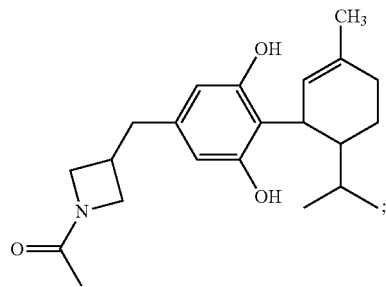
;

or a pharmaceutically acceptable salt or solvate thereof.

Embodiment 2. The compound of Embodiment 1, wherein the compound is

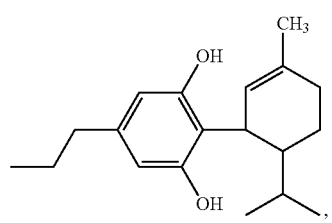 [SMILES: CCCc1cc(O)c(C2C=C(C)CCC2C(C)C)c(O)c1]
, or a pharmaceutically acceptable salt or solvate thereof.

Embodiment 3. The compound of any one of Embodiments 1-2, wherein the compound is

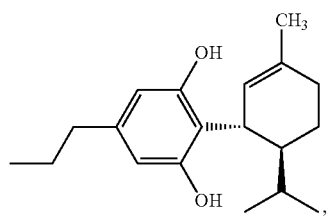 [SMILES: CCCc1cc(O)c([C@@H]2C=C(C)CC[C@H]2C(C)C)c(O)c1]

or a pharmaceutically acceptable salt or solvate thereof.

Embodiment 4. The compound of Embodiment 1, wherein the compound is

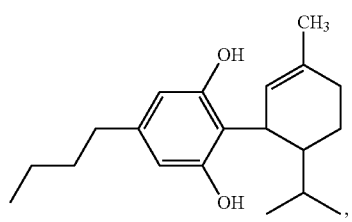 [SMILES: CCCCc1cc(O)c(C2C=C(C)CCC2C(C)C)c(O)c1]

or a pharmaceutically acceptable salt or solvate thereof.

Emodiment 5. The compound of any one of Emodiments 1 and 4, wherein the compound is

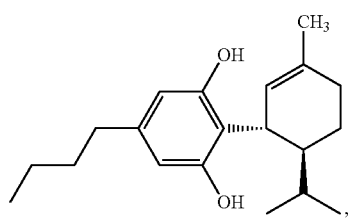 [SMILES: CCCCc1cc(O)c([C@@H]2C=C(C)CC[C@H]2C(C)C)c(O)c1]

or a pharmaceutically acceptable salt or solvate thereof.

Embodiment 6. The compound of Embodiment 1, wherein the compound is

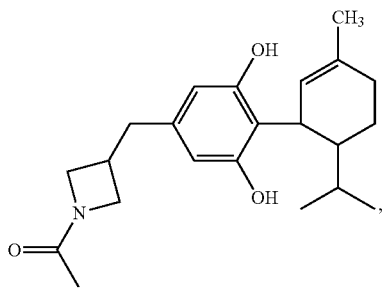 [SMILES: CC(=O)N1CC(Cc2cc(O)c(C3C=C(C)CCC3C(C)C)c(O)c2)C1]

or a pharmaceutically acceptable salt or solvate thereof.

Embodiment 7. The compound of any one of Embodiments 1 and 6, wherein the compound is

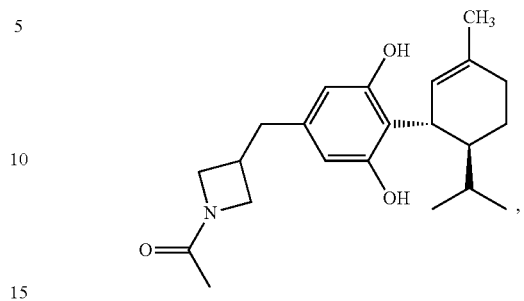

or a pharmaceutically acceptable salt or solvate thereof.

Embodiment 8. The compound of any one of Embodiments 1-7, wherein the compound is a hydrate.

Embodiment 9. The compound of any one of Embodiments 1-7, wherein the compound is a pharmaceutically acceptable salt.

Embodiment 10. A pharmaceutical composition comprising a compound of any one of Embodiments 1-7, or a pharmaceutically acceptable salt or solvate thereof, and a pharmaceutically acceptable excipient.

Embodiment 11. A method of treating autistic spectrum disorder (ASD) or an ASD-associated disorder in a subject in need of treatment thereof, the method comprising administering to the subject a therapeutically effective amount of a compound of any one of Embodiments 1-9, or a pharmaceutically acceptable salt or solvate thereof, or a pharmaceutical composition of Embodiment 10.

Embodiment 12. The method of Embodiment 11, wherein the disorder is autistic spectrum disorder (ASD).

Embodiment 13. The method of Embodiment 11, wherein the disorder is an ASD-associated disorder.

Embodiment 14. The method of any one of Embodiments 11 and 13, wherein the ASD-associated disorder is selected from the group consisting of Tuberous Sclerosis Complex, Fragile X syndrome, Cornelia de Lange syndrome, Down syndrome, Angelman syndrome, Coffin-Lowry syndrome, Cohen Laurence-Moon-Biedel syndrome, Marinesco-Sjogren syndrome, Moebius syndrome, Phelan-McDermid syndrome, CDKL5, Dup15q, Potocki-Lupski syndrome, Smith Lemli Optiz syndrome, Timothy syndrome, Prader-Willi syndrome, Rett syndrome, and Williams syndrome.

Embodiment 15. The method of any one of Embodiments 11 and 13-14, wherein the ASD-associated disorder is selected from the group consisting of Fragile X syndrome (FXS), Rett syndrome (RS), and Angelman syndrome (AS).

Embodiment 16. The method of any one of Embodiments 11-14, wherein the treating comprises improving one or more of (i) qualitative impairment in social interaction; (ii) qualitative impairment in communication; and (iii) restricted repetitive and stereotyped patterns of behavior, interest, and activities.

Embodiment 17. The method of Embodiment 16, wherein improving (i) qualitative impairment in social interaction includes improving one or more of: (a) impairment in the use of multiple nonverbal behaviors; (b) failure to develop peer relationships appropriate to developmental level; (c) a lack of spontaneous seeking to share enjoyment, interests, or achievements with other people; and (d) lack of social or emotional reciprocity.

Embodiment 18. The method of Embodiment 16, wherein improving (ii) qualitative impairment in communication includes improving one or more of: (a) delay in, or lack of, the development of spoken language; (b) in individuals with adequate speech, impairment in the ability to initiate or sustain a conversation with others; (c) stereotyped and repetitive use of language or idiosyncratic language; and (d) lack of varied, spontaneous make-believe play or social imitative play appropriate to developmental level.

Embodiment 19. The method of Embodiment 16, wherein improving (iii) restricted repetitive and stereotyped patterns of behavior, interest, and activities includes improving one or more of: (a) encompassing preoccupation with one or more stereotyped and restricted patterns of interest that is abnormal either in intensity or focus; (b) apparently inflexible adherence to specific, non-functional routines or rituals; (c) stereotyped and repetitive motor mannerisms; and (d) persistent preoccupation with parts of objects.

Embodiment 20. The method of any one of Embodiments 11-14, wherein the treating comprises improving one or more of: (a) persistent deficits in social communication and social interaction across contexts, not accounted for by general developmental delays, and (b) restricted, repetitive patterns of behavior, interests, or activities.

Embodiment 21. The method of Embodiment 20, wherein improving (a) persistent deficits in social communication and social interaction across contexts, not accounted for by general developmental delays includes improving one or more of: (i) deficits in social-emotional reciprocity; (ii) deficits in nonverbal communicative behaviors used for social interaction; and (iii) deficits in developing and maintaining relationships.

Embodiment 22. The method of Embodiment 20, wherein improving (b) restricted, repetitive patterns of behavior, interests, or activities includes improving one or more of: (i) stereotyped or repetitive speech, motor movements, or use of objects; or excessive adherence to routines, (ii) ritualized patterns of verbal or nonverbal behavior, or excessive resistance to change; (iii) highly restricted, fixated interests that are abnormal in intensity or focus; and (iv) hyper-or hypo-reactivity to sensory input or unusual interest in sensory aspects of environment.

Embodiment 23. A method of treating schizophrenia in a subject in need of treatment thereof, the method comprising administering to the subject a therapeutically effective amount of a compound of any one of Embodiments 1-9, or a pharmaceutically acceptable salt or solvate thereof, or a pharmaceutical composition of Embodiment 10.

Embodiment 24. The method of Embodiment 23, wherein the treating comprises treating negative symptoms.

Embodiment 25. The method of Embodiment 23, wherein the treating comprises treating social withdrawal.

Embodiment 26. A method of treating cognitive dysfunction in a subject in need of treatment thereof, the method comprising administering to the subject a therapeutically effective amount of a compound of any one of Embodiments 1-9, or a pharmaceutically acceptable salt or solvate thereof, or a pharmaceutical composition of Embodiment 10.

Embodiment 27. The method of Embodiment 26, wherein the cognitive dysfunction is selected from the group consisting of: Alzheimer's Disease, Parkinson's disease, Huntington's disease, Tourette syndrome, general dementia, anxiety, post-traumatic stress disorder, depression, obsessive compulsive disorder, and Creutzfeldt-Jakob disease.

Embodiment 28. A method of treating memory impairment in a subject in need of treatment thereof, the method comprising administering to the subject a therapeutically effective amount of a compound of any one of Embodiments 1-9, or a pharmaceutically acceptable salt or solvate thereof, or a pharmaceutical composition of Embodiment 10.

Embodiment 29. The method of Embodiment 28, wherein the memory impairment is short-term memory impairment.

Embodiment 30. The method of Embodiment 28, wherein the memory impairment is long-term memory impairment.

Embodiment 31. A method of treating seizures in a subject in need of treatment thereof, the method comprising administering to the subject a therapeutically effective amount of a compound of any one of Embodiments 1-9, or a pharmaceutically acceptable salt or solvate thereof, or a pharmaceutical composition of Embodiment 10.

Embodiment 32. A method of treating cancer in a subject in need of treatment thereof, the method comprising administering to the subject a therapeutically effective amount of a compound of any one of Embodiments 1-9, or a pharmaceutically acceptable salt or solvate thereof, or a pharmaceutical composition of Embodiment 10.

Embodiment 33. The method of Embodiment 32, wherein the cancer is selected from the group consisting of: myelodysplastic syndromes (MDS); non-small cell lung cancer; acute lymphoblastic leukemia (ALL); Langerhan's cell histiocytosis (LCH); multiple myeloma; promyelocytic leukemia; acute myeloid leukemia (AML); chronic myeloid leukemia (CML); gastric cancer; and lung cancer.

Embodiment 34. The method of Embodiment 33, wherein the cancer is ALL and the subject is resistant to treatment with glucocorticoids.

Embodiment 35. A method of treating an inflammatory disorder in a subject in need of treatment thereof, the method comprising administering to the subject a therapeutically effective amount of a compound of any one of Embodiments 1-9, or a pharmaceutically acceptable salt or solvate thereof, or a pharmaceutical composition of Embodiment 10.

Embodiment 36. The method of Embodiment 35, wherein the inflammatory disorder is selected from the group consisting of: rheumatoid arthritis, osteoarthritis, septic shock, chronic obstructive pulmonary disease (COPD), inflammatory bowel disease (IBD), IBD-associated arthritis, erythema nodosum, gout, lupus, hypertension, and periodontal disease.

Embodiment 37. A method of treating a cardiovascular disorder in a subject in need of treatment thereof, the method comprising administering to the subject a therapeutically effective amount of a compound of any one of Embodiments 1-9, or a pharmaceutically acceptable salt or solvate thereof, or a pharmaceutical composition of Embodiment 10.

Embodiment 38. A method of treating diabetes in a subject in need of treatment thereof, the method comprising administering to the subject a therapeutically effective amount of a compound of any one of Embodiments 1-9, or a pharmaceutically acceptable salt or solvate thereof, or a pharmaceutical composition of Embodiment 10.

Embodiment 39. A method of treating an eye disease in a subject in need of treatment thereof, the method comprising administering to the subject a therapeutically effective amount of a compound of any one of Embodiments 1-9, or a pharmaceutically acceptable salt or solvate thereof, or a pharmaceutical composition of Embodiment 10.

Embodiment 40. The method of Embodiment 39, wherein the eye disease is glaucoma or macular degeneration.

Embodiment 41. A method of treating addiction in a subject in need of treatment thereof, the method comprising administering to the subject a therapeutically effective amount of a compound of any one of Embodiments 1-9, or a pharmaceutically acceptable salt or solvate thereof, or a pharmaceutical composition of Embodiment 10.

Embodiment 42. A method of treating a sleep disorder in a subject in need of treatment thereof, the method comprising administering to the subject a therapeutically effective amount of a compound of any one of Embodiments 1-9, or a pharmaceutically acceptable salt or solvate thereof, or a pharmaceutical composition of Embodiment 10.

Embodiment 43. The method of Embodiment 42, wherein the sleep disorder is selected from the group consisting of: sleep apnea and insomnia.

Embodiment 44. A method of treating an eating disorder in a subject in need of treatment thereof, the method comprising administering to the subject a therapeutically effective amount of a compound of any one of Embodiments 1-9, or a pharmaceutically acceptable salt or solvate thereof, or a pharmaceutical composition of Embodiment 10.

Embodiment 45. The method of Embodiment 44, wherein the eating disorder is selected from the group consisting of: anorexia nervosa and bulimia.

Embodiment 46. A method of treating chronic fatigue syndrome in a subject in need of treatment thereof, the method comprising administering to the subject a therapeutically effective amount of a compound of any one of Embodiments 1-9, or a pharmaceutically acceptable salt or solvate thereof, or a pharmaceutical composition of Embodiment 10.

Embodiment 47. A method of treating autistic spectrum disorder (ASD) or an ASD-associated disorder in a subject in need of treatment thereof, the method comprising administering to the subject a therapeutically effective amount of 8,9-dihydrocannabidiol, or a pharmaceutical composition comprising 8,9-dihydrocannabidiol and a pharmaceutically acceptable excipient.

Embodiment 48. The method of Embodiment 47, wherein the disorder is autistic spectrum disorder (ASD).

Embodiment 49. The method of Embodiment 47, wherein the disorder is an ASD-associated disorder.

Embodiment 50. The method of any one of Embodiments 47 and 49, wherein the ASD-associated disorder is selected from the group consisting of Tuberous Sclerosis Complex, Fragile X syndrome, Cornelia de Lange syndrome, Down syndrome, Angelman syndrome, Coffin-Lowry syndrome, Cohen Laurence-Moon-Biedel syndrome, Marinesco-Sjogren syndrome, Moebius syndrome, Phelan-McDermid syndrome, CDKL5, Dup15q, Potocki-Lupski syndrome, Smith Lemli Optiz syndrome, Timothy syndrome, Prader-Willi syndrome, Rett syndrome, and Williams syndrome.

Embodiment 51. The method of any one of Embodiments 47 and 49-50, wherein the ASD-associated disorder is selected from the group consisting of Fragile X syndrome (FXS), Rett syndrome (RS), and Angelman syndrome (AS).

Embodiment 52. The method of any one of Embodiments 47-51, wherein the treating comprises improving one or more of (i) qualitative impairment in social interaction; (ii) qualitative impairment in communication; and (iii) restricted repetitive and stereotyped patterns of behavior, interest, and activities.

Embodiment 53. The method of Embodiment 52, wherein improving (i) qualitative impairment in social interaction includes improving one or more of: (a) impairment in the use of multiple nonverbal behaviors; (b) failure to develop peer relationships appropriate to developmental level; (c) a lack of spontaneous seeking to share enjoyment, interests, or achievements with other people; and (d) lack of social or emotional reciprocity.

Embodiment 54. The method of Embodiment 52, wherein improving (ii) qualitative impairment in communication includes improving one or more of: (a) delay in, or lack of, the development of spoken language; (b) in individuals with adequate speech, impairment in the ability to initiate or sustain a conversation with others; (c) stereotyped and repetitive use of language or idiosyncratic language; and (d) lack of varied, spontaneous make-believe play or social imitative play appropriate to developmental level.

Embodiment 55. The method of Embodiment 52, wherein improving (iii) restricted repetitive and stereotyped patterns of behavior, interest, and activities includes improving one or more of: (a) encompassing preoccupation with one or more stereotyped and restricted patterns of interest that is abnormal either in intensity or focus; (b) apparently inflexible adherence to specific, non-functional routines or rituals; (c) stereotyped and repetitive motor mannerisms; and (d) persistent preoccupation with parts of objects.

Embodiment 56. The method of any one of Embodiments 47-51, wherein the treating comprises improving one or more of: (a) persistent deficits in social communication and social interaction across contexts, not accounted for by general developmental delays, and (b) restricted, repetitive patterns of behavior, interests, or activities.

Embodiment 57. The method of Embodiment 56, wherein improving (a) persistent deficits in social communication and social interaction across contexts, not accounted for by general developmental delays includes improving one or more of: (i) deficits in social-emotional reciprocity; (ii) deficits in nonverbal communicative behaviors used for social interaction; and (iii) deficits in developing and maintaining relationships.

Embodiment 58. The method of Embodiment 56, wherein improving (b) restricted, repetitive patterns of behavior, interests, or activities includes improving one or more of: (i) stereotyped or repetitive speech, motor movements, or use of objects; or excessive adherence to routines, (ii) ritualized patterns of verbal or nonverbal behavior, or excessive resistance to change; (iii) highly restricted, fixated interests that are abnormal in intensity or focus; and (iv) hyper-or hypo-reactivity to sensory input or unusual interest in sensory aspects of environment.

Embodiment 59. A method of treating schizophrenia in a subject in need of treatment thereof, the method comprising administering to the subject a therapeutically effective amount of 8,9-dihydrocannabidiol, or a pharmaceutical composition comprising 8,9-dihydrocannabidiol and a pharmaceutically acceptable excipient.

Embodiment 60. The method of Embodiment 59, wherein the treating comprises treating negative symptoms.

Embodiment 61. The method of Embodiment 59, wherein the treating comprises treating social withdrawal.

Embodiment 62. A method of treating cognitive dysfunction in a subject in need of treatment thereof, the method comprising administering to the subject a therapeutically effective amount of 8,9-dihydrocannabidiol, or a pharmaceutical composition comprising 8,9-dihydrocannabidiol and a pharmaceutically acceptable excipient.

Embodiment 63. The method of Embodiment 62, wherein the cognitive dysfunction is selected from the group consisting of: Alzheimer's Disease, Parkinson's disease, Huntington's disease, Tourette syndrome, general dementia, anxiety, post-traumatic stress disorder, depression, obsessive compulsive disorder, and Creutzfeldt-Jakob disease.

Embodiment 64. A method of treating memory impairment in a subject in need of treatment thereof, the method comprising administering to the subject a therapeutically effective amount of 8,9-dihydrocannabidiol, or a pharmaceutical composition comprising 8,9-dihydrocannabidiol and a pharmaceutically acceptable excipient.

Embodiment 65. The method of Embodiment 64, wherein the memory impairment is short-term memory impairment.

Embodiment 66. The method of Embodiment 64, wherein the memory impairment is long-term memory impairment.

Embodiment 67. A method of treating cancer in a subject in need of treatment thereof, the method comprising administering to the subject a therapeutically effective amount of 8,9-dihydrocannabidiol, or a pharmaceutical composition comprising 8,9-dihydrocannabidiol and a pharmaceutically acceptable excipient.

Embodiment 68. The method of Embodiment 67, wherein the cancer is selected from the group consisting of: myelodysplastic syndromes (MDS); non-small cell lung cancer; acute lymphoblastic leukemia (ALL); Langerhan's cell histiocytosis (LCH); multiple myeloma; promyelocytic leukemia; acute myeloid leukemia (AML); chronic myeloid leukemia (CML); gastric cancer; and lung cancer.

Embodiment 69. The method of Embodiment 68, wherein the cancer is ALL and the subject is resistant to treatment with glucocorticoids.

Embodiment 70. A method of treating a cardiovascular disorder in a subject in need of treatment thereof, the method comprising administering to the subject a therapeutically effective amount of 8,9-dihydrocannabidiol, or a pharmaceutical composition comprising 8,9-dihydrocannabidiol and a pharmaceutically acceptable excipient.

Embodiment 71. A method of treating diabetes in a subject in need of treatment thereof, the method comprising administering to the subject a therapeutically effective amount of 8,9-dihydrocannabidiol, or a pharmaceutical composition comprising 8,9-dihydrocannabidiol and a pharmaceutically acceptable excipient.

Embodiment 72. A method of treating an eye disease in a subject in need of treatment thereof, the method comprising administering to the subject a therapeutically effective amount of 8,9-dihydrocannabidiol, or a pharmaceutical composition comprising 8,9-dihydrocannabidiol and a pharmaceutically acceptable excipient.

Embodiment 73. The method of Embodiment 72, wherein the eye disease is glaucoma or macular degeneration.

Embodiment 74. A method of treating addiction in a subject in need of treatment thereof, the method comprising administering to the subject a therapeutically effective amount of 8,9-dihydrocannabidiol, or a pharmaceutical composition comprising 8,9-dihydrocannabidiol and a pharmaceutically acceptable excipient.

Embodiment 75. A method of treating a sleep disorder in a subject in need of treatment thereof, the method comprising administering to the subject a therapeutically effective amount of 8,9-dihydrocannabidiol, or a pharmaceutical composition comprising 8,9-dihydrocannabidiol and a pharmaceutically acceptable excipient.

Embodiment 76. The method of Embodiment 75, wherein the sleep disorder is selected from the group consisting of: sleep apnea and insomnia.

Embodiment 77. A method of treating an eating disorder in a subject in need of treatment thereof, the method comprising administering to the subject a therapeutically effective amount of 8,9-dihydrocannabidiol, or a pharmaceutical composition comprising 8,9-dihydrocannabidiol and a pharmaceutically acceptable excipient.

Embodiment 78. The method of Embodiment 77, wherein the eating disorder is selected from the group consisting of: anorexia nervosa and bulimia.

Embodiment 79. A method of treating chronic fatigue syndrome in a subject in need of treatment thereof, the method comprising administering to the subject a therapeutically effective amount of 8,9-dihydrocannabidiol, or a pharmaceutical composition comprising 8,9-dihydrocannabidiol and a pharmaceutically acceptable excipient.

Embodiment 80. The method of any one of Embodiments 47-79, wherein the method further comprises administering a second therapeutic agent to the subject.

Embodiment 81. The method of Embodiment 80, wherein the second therapeutic agent is selected from the group consisting of: an anti-epileptic drug (AED), an anti-psychotic drug, melatonin, a selective serotonin reuptake inhibitor (SSRI), and methylphenidate.

Embodiment 82. The method of any one of Embodiments 47-81, wherein the compound is substantially pure.

Embodiment 83. The method of any one of Embodiments 47-82, wherein the compound is administered orally, by inhalation, by suppository, or topically.

Embodiment 84. A process for preparing

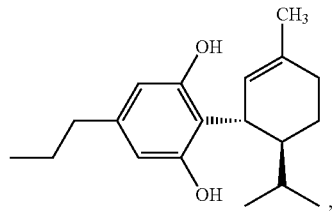 [SMILES: CCCc1cc(O)c([C@@H]2C=C(C)CC[C@H]2C(C)C)c(O)c1]

or a pharmaceutically acceptable salt or solvate thereof, the process comprising hydrogenating cannabidivarin in the presence of a homogeneous catalyst to form

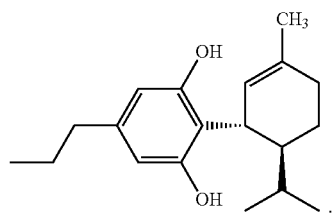 [SMILES: CCCc1cc(O)c([C@@H]2C=C(C)CC[C@H]2C(C)C)c(O)c1]

Embodiment 85. The process of Embodiment 84, wherein the homogeneous catalyst is a rhodium catalyst, a palladium catalyst, an iridium catalyst, a ruthenium catalyst, or a platinum catalyst.

Embodiment 86. The process of any one of Embodiments 84-85, wherein the homogeneous catalyst is a rhodium catalyst.

Embodiment 87. The process of any one of Embodiments 84-85, wherein the homogeneous catalyst is Wilkinson's catalyst.

Embodiment 88. A process for preparing

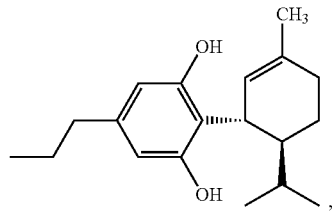 [SMILES: CCCc1cc(O)c([C@@H]2C=C(C)CC[C@H]2C(C)C)c(O)c1]

or a pharmaceutically acceptable salt or solvate thereof, the process comprising hydrogenating cannabidivarin in the presence of a heterogeneous catalyst to form

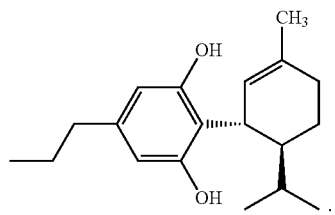 [SMILES: CCCc1cc(O)c([C@@H]2C=C(C)CC[C@H]2C(C)C)c(O)c1]

Embodiment 89. The process of Embodiment 88, wherein the heterogeneous catalyst is Lindlar catalyst.

Embodiment 90. A process for preparing

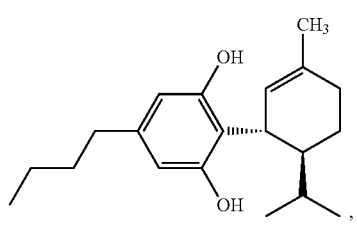 [SMILES: CCCCc1cc(O)c([C@@H]2C=C(C)CC[C@H]2C(C)C)c(O)c1]

or a pharmaceutically acceptable salt or solvate thereof, the process comprising hydrogenating norcannabidiol in the presence of a homogeneous catalyst to form

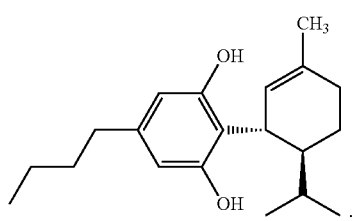 [SMILES: CCCCc1cc(O)c([C@@H]2C=C(C)CC[C@H]2C(C)C)c(O)c1]

Embodiment 91. The process of Embodiment 90, wherein the homogeneous catalyst is a rhodium catalyst, a palladium catalyst, an iridium catalyst, a ruthenium catalyst, or a platinum catalyst.

Embodiment 92. The process of any one of Embodiments 90-91, wherein the homogeneous catalyst is a rhodium catalyst.

Embodiment 93. The process of any one of Embodiments 90-92, wherein the homogeneous catalyst is Wilkinson's catalyst.

Embodiment 94. A process for preparing

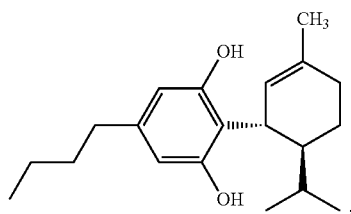

or a pharmaceutically acceptable salt or solvate thereof, the process comprising hydrogenating norcannabidiol in the presence of a heterogeneous catalyst to form

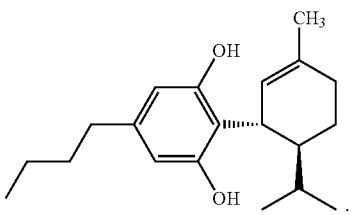 [SMILES: CCCCc1cc(O)c([C@@H]2C=C(C)CC[C@H]2C(C)C)c(O)c1]

Embodiment 95. The process of Embodiment 94, wherein the heterogeneous catalyst is Lindlar catalyst.

Embodiment 96. A process for preparing

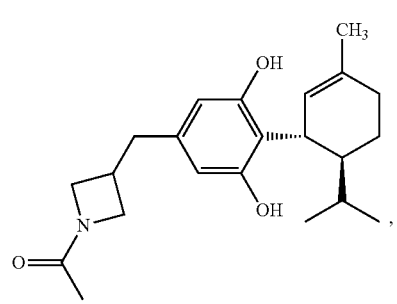 [SMILES: CC(=O)N1CC(Cc2cc(O)c([C@@H]3C=C(C)CC[C@H]3C(C)C)c(O)c2)C1]

or a pharmaceutically acceptable salt or solvate thereof, the process comprising hydrogenating 1-(3-(((1'R,2'R)-2,6-dihydroxy-5'-methyl-2'-(prop-1-en-2-yl)-1',2',3',4'-tetrahydro-[1,1'-biphenyl]-4-yl)methyl)azetidin-1-yl)ethan-1-one in the presence of a homogeneous catalyst to form

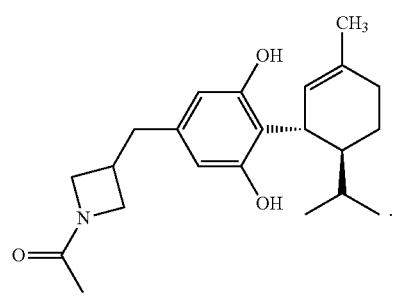 [SMILES: CC(=O)N1CC(Cc2cc(O)c([C@@H]3C=C(C)CC[C@H]3C(C)C)c(O)c2)C1]

Embodiment 97. The process of Embodiment 96, wherein the homogeneous catalyst is a rhodium catalyst, a palladium catalyst, an iridium catalyst, a ruthenium catalyst, or a platinum catalyst.

Embodiment 98. The process of any one of Embodiments 96-97, wherein the homogeneous catalyst is a rhodium catalyst.

Embodiment 99. The process of any one of Embodiments 96-98, wherein the homogeneous catalyst is Wilkinson's catalyst.

Embodiment 100. A process for preparing

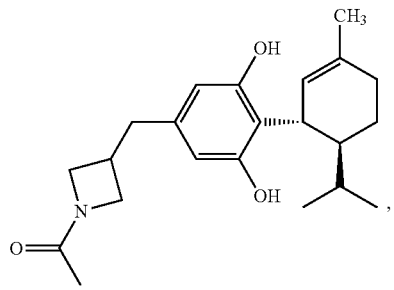 [SMILES: CC(=O)N1CC(Cc2cc(O)c([C@@H]3C=C(C)CC[C@H]3C(C)C)c(O)c2)C1]

or a pharmaceutically acceptable salt or solvate thereof, the process comprising hydrogenating 1-(3-(((1'R,2'R)-2,6-dihydroxy-5'-methyl-2'-(prop-1-en-2-yl)-1',2',3',4'-tetrahydro-[1,1'-biphenyl]-4-yl)methyl)azetidin-1-yl)ethan-1-one in the presence of a heterogeneous catalyst to form

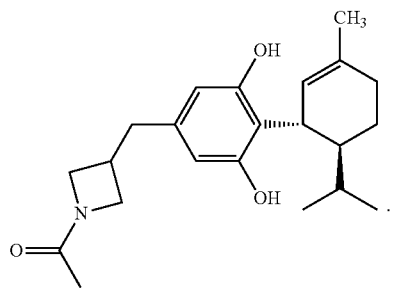 [SMILES: CC(=O)N1CC(Cc2cc(O)c([C@@H]3C=C(C)CC[C@H]3C(C)C)c(O)c2)C1]

Embodiment 101. The process of Embodiment 100, wherein the heterogeneous catalyst is Lindlar catalyst.

Embodiment 102. A process for preparing

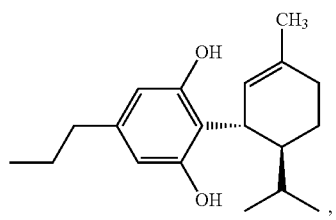 [SMILES: CCCc1cc(O)c([C@@H]2C=C(C)CC[C@H]2C(C)C)c(O)c1]

or a pharmaceutically acceptable salt or solvate thereof, the process comprising reacting alpha-phellandrene with 5-propylbenzene-1,3-diol:

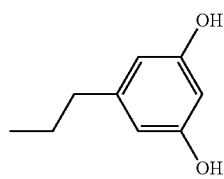

in the presence of an acid, to form

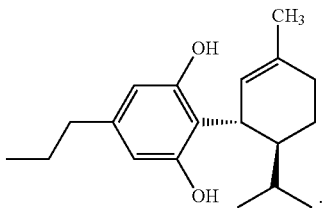 [SMILES: CCCc1cc(O)c([C@@H]2C=C(C)CC[C@H]2C(C)C)c(O)c1]

Embodiment 103. The process of Embodiment 102, comprising reacting alpha-phellandrene with 5-propylbenzene-1,3-diol at a temperature from about 5° C. to about 400° C.

Embodiment 104. The process of any one of Embodiments 102-103, comprising reacting alpha-phellandrene with 5-propylbenzene-1,3-diol for about 1 to about 24 hours.

Embodiment 105. A process for preparing

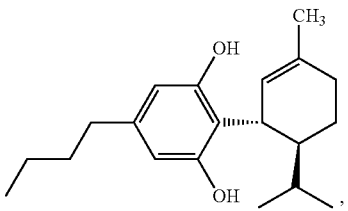 [SMILES: CCCCc1cc(O)c([C@@H]2C=C(C)CC[C@H]2C(C)C)c(O)c1]

or a pharmaceutically acceptable salt or solvate thereof, the process comprising reacting alpha-phellandrene with 5-butylbenzene-1,3-diol

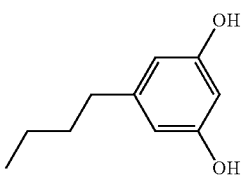

in the presence of an acid, to form

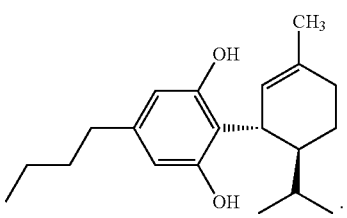 [SMILES: CCCCc1cc(O)c([C@@H]2C=C(C)CC[C@H]2C(C)C)c(O)c1]

Embodiment 106. The process of Embodiment 105, comprising reacting alpha-phellandrene with 5-butylbenzene-1,3-diol at a temperature from about 5° C. to about 400° C.

Embodiment 107. The process of any one of Embodiments 105-106, comprising reacting alpha-phellandrene with 5-butylbenzene-1,3-diol for about 1 to about 24 hours.

Embodiment 108. A process for preparing

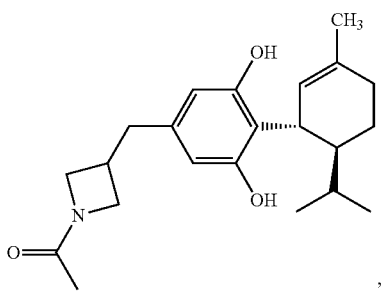 [SMILES: CC(=O)N1CC(Cc2cc(O)c([C@@H]3C=C(C)CC[C@H]3C(C)C)c(O)c2)C1]

, or a pharmaceutically acceptable salt or solvate thereof, the process comprising reacting alpha-phellandrene with 1-(3-(3,5-dihydroxybenzyl)azetidin-1-yl)ethanone

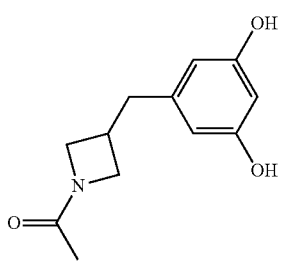 [SMILES: CC(=O)N1CC(Cc2cc(O)cc(O)c2)C1]

to form

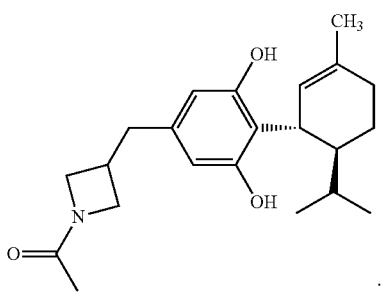 [SMILES: CC(=O)N1CC(Cc2cc(O)c([C@@H]3C=C(C)CC[C@H]3C(C)C)c(O)c2)C1]

.

Embodiment 109. The process of Embodiment 108, comprising reacting alpha-phellandrene with 1-(3-(3,5-dihydroxybenzyl)azetidin-1-yl)ethanone at a temperature from about 5° C. to about 400° C.

Embodiment 110. The process of any one of Embodiments 108-109, comprising reacting alpha-phellandrene with 1-(3-(3,5-dihydroxybenzyl)azetidin-1-yl)ethanone for about 1 to about 24 hours.

Embodiment 111. The process of any one of Embodiments 102-110, wherein the acid is a protic or a Lewis acid.

Embodiment 112. The process of Embodiment 111, wherein the acid is a protic acid.

Embodiment 113. The process of any one of Embodiments 111-112, wherein the acid is selected from the group consisting of: para-toluenesulfonic acid, trifluoroacetic acid, methanesulfonic acid, trifluoromethanesulfonic acid, and hydrochloric acid.

Embodiment 114. The process of Embodiment 111, wherein the acid is a Lewis acid.

Embodiment 115. The process of any one of Embodiments 111 and 114, wherein the acid is selected from the group consisting of: boron trichloride, boron trifluoride, and aluminum trichloride.

Embodiment 116. A process for preparing 8,9-dihydrocannabidiol, or a pharmaceutically acceptable salt or solvate thereof, the process comprising hydrogenating cannabidiol in the presence of a homogeneous catalyst to form 8,9-dihydrocannabidiol.

Embodiment 117. The process of Embodiment 116, wherein the homogeneous catalyst is a rhodium catalyst, a palladium catalyst, an iridium catalyst, a ruthenium catalyst, or a platinum catalyst.

Embodiment 118. The process of any one of Embodiments 116-117, wherein the homogeneous catalyst is a rhodium catalyst.

Embodiment 119. The process of any one of Embodiments 116-118, wherein the homogeneous catalyst is Wilkinson's catalyst.

Embodiment 120. A process for preparing 8,9-dihydrocannabidiol, or a pharmaceutically acceptable salt or solvate thereof, the process comprising hydrogenating cannabidiol in the presence of Lindlar catalyst to form 8,9-dihydrocannabidiol.

Embodiment 121. A compound of Formula (1)

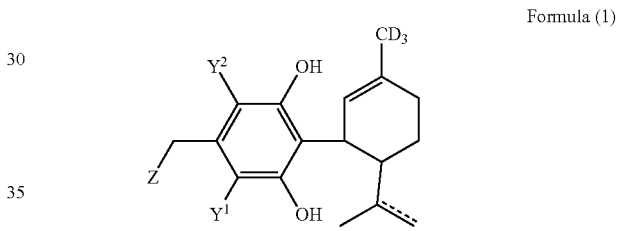

Formula (1)

or a pharmaceutically acceptable salt or solvate thereof,
wherein $Y^1$ and $Y^2$ are each independently hydrogen or deuterium,
------- is a single or a double bond,
and
Z is —CH$_2$CH$_3$, —CH$_2$CH$_2$CH$_3$, —CH$_2$CH$_2$CH$_2$CH$_3$ or

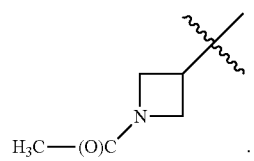

.

Embodiment 122. The compound of Embodiment 121, wherein the compound is a compound of Formula I

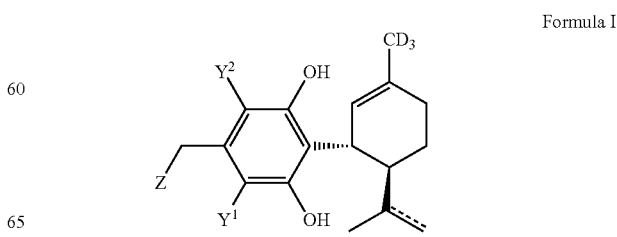

Formula I or a pharmaceutically acceptable salt or solvate thereof,
wherein $Y^1$ and $Y^2$ are each independently hydrogen or deuterium,
═════ is a single or a double bond,
and
Z is —CH$_2$CH$_3$, —CH$_2$CH$_2$CH$_3$, —CH$_2$CH$_2$CH$_2$CH$_3$ or

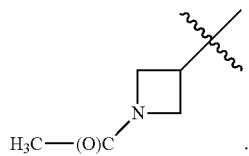

Embodiment 123. The compound of Embodiment 122, wherein the compound is selected from the group consisting of

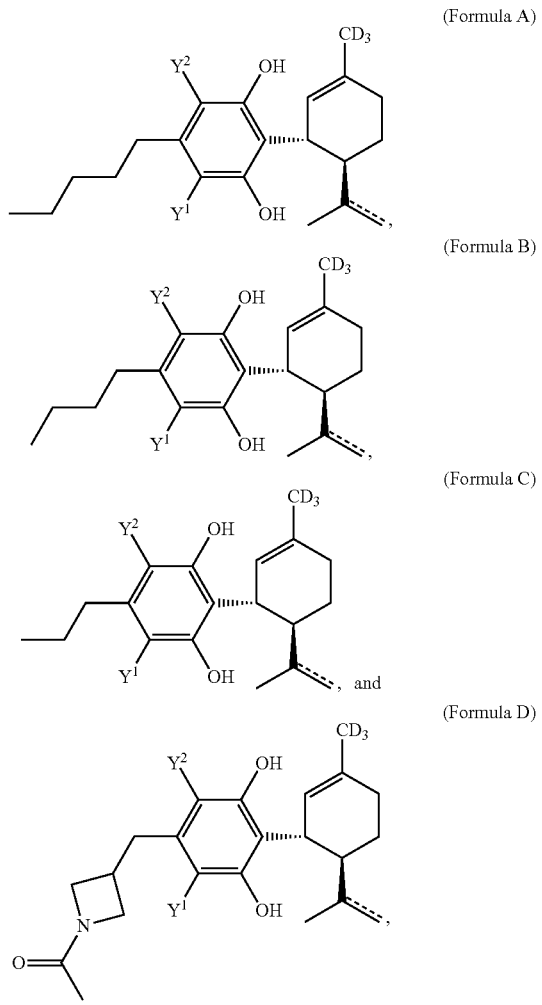

or a pharmaceutically acceptable salt or solvate thereof.

Embodiment 124. The compound of Embodiment 123, wherein the compound is a compound of Formula A, or a pharmaceutically acceptable salt or solvate thereof.

Embodiment 125. The compound of Embodiment 123, wherein the compound is a compound of Formula B, or a pharmaceutically acceptable salt or solvate thereof.

Embodiment 126. The compound of Embodiment 123, wherein the compound is a compound of Formula C, or a pharmaceutically acceptable salt or solvate thereof.

Embodiment 127. The compound of Embodiment 123, wherein the compound is a compound of Formula D, or a pharmaceutically acceptable salt or solvate thereof.

Embodiment 128. The compound of any one of Embodiments 121 to 127, wherein each of $Y^1$ and $Y^2$ is hydrogen.

Embodiment 129. The compound of any one of Embodiments 121 to 127, wherein each of $Y^1$ and $Y^2$ is deuterium.

Embodiment 130. The compound of any one of Embodiments 121 to 127, wherein ═════ is a single bond.

Embodiment 131. The compound of any one of Embodiments 121 to 127, wherein ═════ is a double bond.

Embodiment 132. A pharmaceutical composition comprising a compound of any one of Embodiments 121 to 131, or a pharmaceutically acceptable salt or solvate thereof, and one or more pharmaceutically acceptable excipients.

Embodiment 133. A method of treating a condition, disease or disorder as disclosed herein in a subject in need of such treatment, comprising administering to a subject a therapeutically effective amount of a compound of any one of Embodiments 121 to 131, or a pharmaceutical composition of Embodiment 132.

Embodiment 134. A compound of Formula (2)

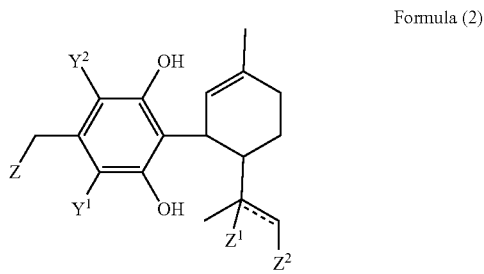

or a pharmaceutically acceptable salt or solvate thereof,
wherein $Y^1$ and $Y^2$ are each independently hydrogen or tritium,
═════ is a single or a double bond,
provided that if ═════ is a double bond, then $Z^1$ and $Z^2$ are absent,
and provided that if ═════ is a single bond, then $Z^1$ and $Z^2$ are are each independently hydrogen or tritium,
provided that the compound comprises tritium,
and
Z is —CH$_2$CH$_3$, —CH$_2$CH$_2$CH$_3$, —CH$_2$CH$_2$CH$_2$CH$_3$ or

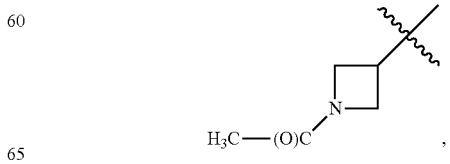

Embodiment 135. The compound of Embodiment 134, wherein the compound is a compound of Formula II

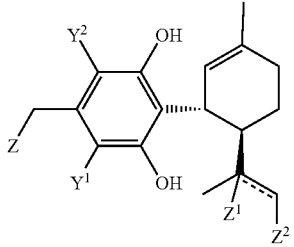

Formula II or a pharmaceutically acceptable salt or solvate thereof, wherein $Y^1$ and $Y^2$ are each independently hydrogen or tritium, ═══ is a single or a double bond, provided that if ═══ is a double bond, then $Z^1$ and $Z^2$ are absent, and provided that if ═══ is a single bond, then $Z^1$ and $Z^2$ are are each independently hydrogen or tritium, provided that the compound comprises tritium, and Z is —CH$_2$CH$_3$, —CH$_2$CH$_2$CH$_3$, —CH$_2$CH$_2$CH$_2$CH$_3$ or

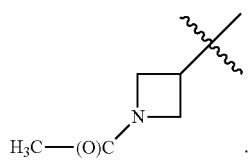

Embodiment 136. The compound of Embodiment 135, wherein the compound of Formula II is selected from the group consisting of (Formula E)

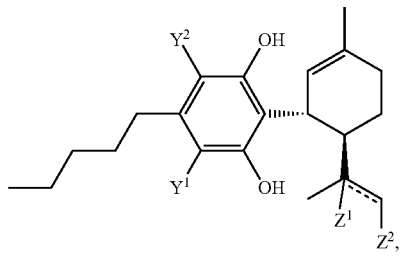

(Formula F)

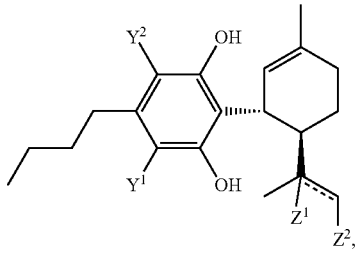

(Formula G)

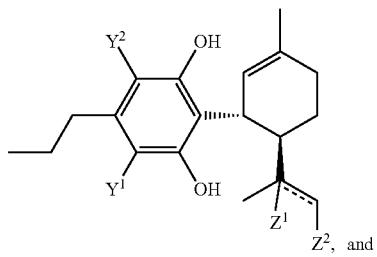

(Formula H)

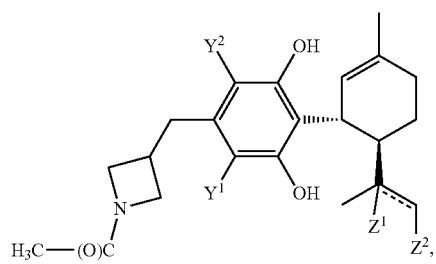

or a pharmaceutically acceptable salt or solvate thereof.

Embodiment 137. The compound of Embodiment 136, wherein the compound is a compound of Formula E, or a pharmaceutically acceptable salt or solvate thereof.

Embodiment 138. The compound of Embodiment 136, wherein the compound is a compound of Formula F, or a pharmaceutically acceptable salt or solvate thereof.

Embodiment 139. The compound of Embodiment 136, wherein the compound is a compound of Formula G, or a pharmaceutically acceptable salt or solvate thereof.

Embodiment 140. The compound of Embodiment 136, wherein the compound is a compound of Formula H, or a pharmaceutically acceptable salt or solvate thereof.

Embodiment 141. The compound of any one of Embodiments 134 to 140, wherein each of $Y^1$ and $Y^2$ is hydrogen.

Embodiment 142. The compound of any one of Embodiments 134 to 140, wherein each of $Y^1$ and $Y^2$ is tritium.

Embodiment 143. The compound of any one of Embodiments 134 to 140, wherein ═══ is a single bond.

Embodiment 144. The compound of any one of Embodiments 134 to 140, wherein ═══ is a double bond.

Embodiment 145. The compound of any one of Embodiments 134 to 140, wherein ═══ is a single bond and each of $Z^1$ and $Z^2$ is hydrogen.

Embodiment 146. The compound of any one of Embodiments 134 to 140, wherein ═══ is a single bond, each of $Z^1$ and $Z^2$ is hydrogen, and each of $Y^1$ and $Y^2$ is tritium.

Embodiment 147. The compound of any one of Embodiments 134 to 140, wherein ═══ is a single bond and each of $Z^1$ and $Z^2$ is tritium.

Embodiment 148. The compound of any one of Embodiments 134 to 140, wherein ═══ is a single bond, each of $Z^1$ and $Z^2$ is tritium, and each of $Y^1$ and $Y^2$ is hydrogen.

Embodiment 149. The compound of any one of Embodiments 134 to 140, wherein ═══ is a single bond, each of $Z^1$ and $Z^2$ is tritium, and each of $Y^1$ and $Y^2$ is tritium.

Embodiment 150. The compound of any one of Embodiments 134 to 140, wherein ═══ is a double bond and each of $Y^1$ and $Y^2$ is tritium.

Embodiment 151. A method for quantifying one or more analytes in a sample, comprising: introducing the compound of any one of Embodiments 1-9, 121-131, or 134-150 in the sample; and subjecting the sample to mass spectrometry.

Embodiment 152. The method of Embodiment 151, wherein the compound is a compound of any one of Embodiments 121-131 or 134-150 and one of the one or more analytes is a compound of any one of Embodiments 1-9.

Embodiment 153. A compound selected from the group consisting of

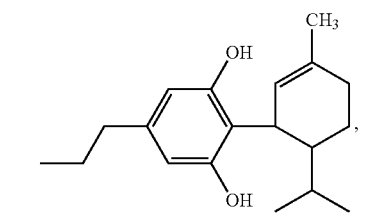

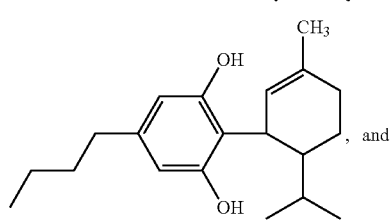
, and

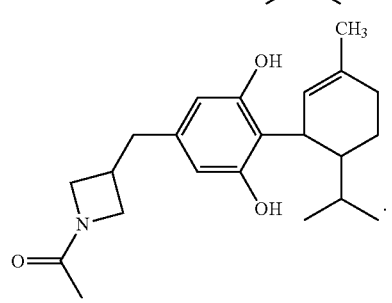

Embodiment 154. The compound of Embodiment 153, wherein the compound is

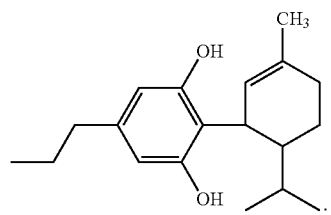 [SMILES: CCCc1cc(O)c(C2C=C(C)CCC2C(C)C)c(O)c1]

Embodiment 155. The compound of Embodiment 153 or 154, wherein the compound is

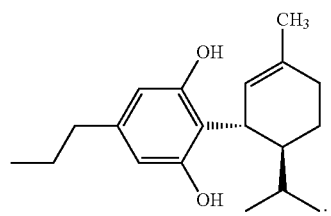 [SMILES: CCCc1cc(O)c([C@@H]2C=C(C)CC[C@H]2C(C)C)c(O)c1]

Embodiment 156. The compound of Embodiment 153, wherein the compound is

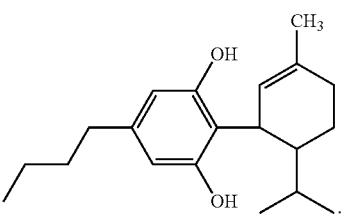 [SMILES: CCCCc1cc(O)c(C2C=C(C)CCC2C(C)C)c(O)c1]

Embodiment 157. The compound of Embodiment 153 or 155, wherein the compound is

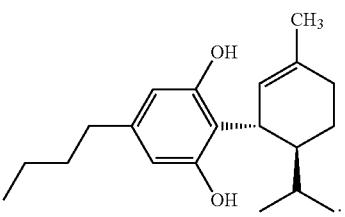 [SMILES: CCCCc1cc(O)c([C@@H]2C=C(C)CC[C@H]2C(C)C)c(O)c1]

Embodiment 158. The compound of Embodiment 153, wherein the compound is

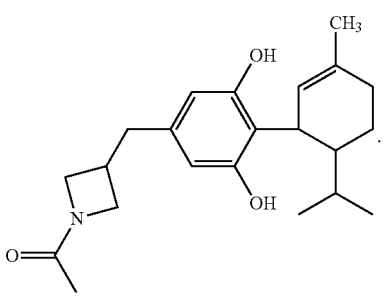 [SMILES: CC(=O)N1CC(Cc2cc(O)c(C3C=C(C)CCC3C(C)C)c(O)c2)C1]

Embodiment 159. The compound of Embodiment 153 or 158, wherein the compound is

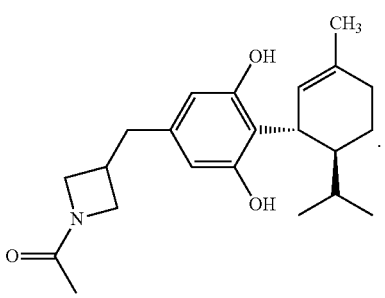 [SMILES: CC(=O)N1CC(Cc2cc(O)c([C@@H]3C=C(C)CC[C@H]3C(C)C)c(O)c2)C1]

Embodiment 160. A pharmaceutical composition comprising a compound of any one of Embodiments 153-159, and a pharmaceutically acceptable excipient.

Embodiment 161. A method of treating autistic spectrum disorder (ASD) or an ASD-associated disorder in a subject in need of treatment thereof, the method comprising administering to the subject a therapeutically effective amount of a compound of any one of Embodiments 153-159, or a pharmaceutical composition of embodiment 160.

Embodiment 162. The method of Embodiment 161, wherein the disorder is autistic spectrum disorder (ASD).

Embodiment 163. The method of Embodiment 161, wherein the disorder is an ASD-associated disorder.

Embodiment 164. The method of any one of Embodiments 161 and 163, wherein the ASD-associated disorder is selected from the group consisting of Tuberous Sclerosis Complex, Fragile X syndrome, Cornelia de Lange syndrome, Down syndrome, Angelman syndrome, Coffin-Lowry syndrome, Cohen Laurence-Moon-Biedel syndrome, Marinesco-Sjogren syndrome, Moebius syndrome, Phelan-McDermid syndrome, CDKL5, Dup15q, Potocki-Lupski syndrome, Smith Lemli Optiz syndrome, Timothy syndrome, Prader-Willi syndrome, Rett syndrome, and Williams syndrome.

Embodiment 165. The method of any one of Embodiments 161 and 163-164, wherein the ASD-associated disorder is selected from the group consisting of Fragile X syndrome (FXS), Rett syndrome (RS), and Angelman syndrome (AS).

Embodiment 166. The method of any one of Embodiments 161-164, wherein the treating comprises improving one or more of (i) qualitative impairment in social interaction; (ii) qualitative impairment in communication; and (iii) restricted repetitive and stereotyped patterns of behavior, interest, and activities.

Embodiment 167. The method of Embodiment 166, wherein improving (i) qualitative impairment in social interaction includes improving one or more of: (a) impairment in the use of multiple nonverbal behaviors; (b) failure to develop peer relationships appropriate to developmental level; (c) a lack of spontaneous seeking to share enjoyment, interests, or achievements with other people; and (d) lack of social or emotional reciprocity.

Embodiment 168. The method of Embodiment 166, wherein improving (ii) qualitative impairment in communication includes improving one or more of: (a) delay in, or lack of, the development of spoken language; (b) in individuals with adequate speech, impairment in the ability to initiate or sustain a conversation with others; (c) stereotyped and repetitive use of language or idiosyncratic language; and (d) lack of varied, spontaneous make-believe play or social imitative play appropriate to developmental level.

Embodiment 169. The method of Embodiment 166, wherein improving (iii) restricted repetitive and stereotyped patterns of behavior, interest, and activities includes improving one or more of: (a) encompassing preoccupation with one or more stereotyped and restricted patterns of interest that is abnormal either in intensity or focus; (b) apparently inflexible adherence to specific, non-functional routines or rituals; (c) stereotyped and repetitive motor mannerisms; and (d) persistent preoccupation with parts of objects.

Embodiment 170. The method of any one of Embodiments 161-164, wherein the treating comprises improving one or more of: (a) persistent deficits in social communication and social interaction across contexts, not accounted for by general developmental delays, and (b) restricted, repetitive patterns of behavior, interests, or activities.

Embodiment 171. The method of Embodiment 170, wherein improving (a) persistent deficits in social communication and social interaction across contexts, not accounted for by general developmental delays includes improving one or more of: (i) deficits in social-emotional reciprocity; (ii) deficits in nonverbal communicative behaviors used for social interaction; and (iii) deficits in developing and maintaining relationships.

Embodiment 172. The method of Embodiment 170, wherein improving (b) restricted, repetitive patterns of behavior, interests, or activities includes improving one or more of: (i) stereotyped or repetitive speech, motor movements, or use of objects; or excessive adherence to routines, (ii) ritualized patterns of verbal or nonverbal behavior, or excessive resistance to change; (iii) highly restricted, fixated interests that are abnormal in intensity or focus; and (iv) hyper-or hypo-reactivity to sensory input or unusual interest in sensory aspects of environment.

Embodiment 173. A method of treating schizophrenia in a subject in need of treatment thereof, the method comprising administering to the subject a therapeutically effective amount of a compound of any one of Embodiments 153-159, or a pharmaceutical composition of Embodiment 160.

Embodiment 174. The method of Embodiment 173, wherein the treating comprises treating negative symptoms.

Embodiment 175. The method of Embodiment 173, wherein the treating comprises treating social withdrawal.

Embodiment 176. A method of treating cognitive dysfunction in a subject in need of treatment thereof, the method comprising administering to the subject a therapeutically effective amount of a compound of any one of Embodiments 153-159, or a pharmaceutical composition of Embodiment 160.

Embodiment 177. The method of Embodiment 176, wherein the cognitive dysfunction is selected from the group consisting of. Alzheimer's Disease, Parkinson's disease, Huntington's disease, Tourette syndrome, general dementia, anxiety, post-traumatic stress disorder, depression, obsessive compulsive disorder, and Creutzfeldt-Jakob disease.

Embodiment 178. A method of treating memory impairment in a subject in need of treatment thereof, the method comprising administering to the subject a therapeutically effective amount of a compound of any one of Embodiments 153-159, or a pharmaceutical composition of Embodiment 160.

Embodiment 179. The method of Embodiment 178, wherein the memory impairment is short-term memory impairment.

Embodiment 180. The method of Embodiment 178, wherein the memory impairment is long-term memory impairment.

Embodiment 181. A method of treating seizures in a subject in need of treatment thereof, the method comprising administering to the subject a therapeutically effective amount of a compound of any one of Embodiments 153-159, or a pharmaceutical composition of Embodiment 160.

Embodiment 182. A method of treating cancer in a subject in need of treatment thereof, the method comprising administering to the subject a therapeutically effective amount of a compound of any one of Embodiments 153-159, or a pharmaceutical composition of Embodiment 160.

Embodiment 183. The method of Embodiment 182, wherein the cancer is selected from the group consisting of: myelodysplastic syndromes (MDS); non-small cell lung cancer; acute lymphoblastic leukemia (ALL); Langerhan's cell histiocytosis (LCH); multiple myeloma; promyelocytic leukemia; acute myeloid leukemia (AML); chronic myeloid leukemia (CML); gastric cancer; and lung cancer.

Embodiment 184. The method of Embodiment 183, wherein the cancer is ALL and the subject is resistant to treatment with glucocorticoids.

Embodiment 185. A method of treating an inflammatory disorder in a subject in need of treatment thereof, the method comprising administering to the subject a therapeutically effective amount of a compound of any one of Embodiments 153-159, or a pharmaceutical composition of Embodiment 160.

Embodiment 186. The method of Embodiment 185, wherein the inflammatory disorder is selected from the group consisting of: rheumatoid arthritis, osteoarthritis, septic shock, chronic obstructive pulmonary disease (COPD), inflammatory bowel disease (IBD), IBD-associated arthritis, erythema nodosum, gout, lupus, hypertension, and periodontal disease.

Embodiment 187. A method of treating a cardiovascular disorder in a subject in need of treatment thereof, the method comprising administering to the subject a therapeutically effective amount of a compound of any one of Embodiments 153-159, or a pharmaceutical composition of Embodiment 160.

Embodiment 188. A method of treating diabetes in a subject in need of treatment thereof, the method comprising administering to the subject a therapeutically effective amount of a compound of any one of Embodiments 153-159, or a pharmaceutical composition of Embodiment 160.

Embodiment 189. A method of treating an eye disease in a subject in need of treatment thereof, the method comprising administering to the subject a therapeutically effective amount of a compound of any one of Embodiments 153-159, or a pharmaceutical composition of Embodiment 160.

Embodiment 190. The method of Embodiment 185, wherein the eye disease is glaucoma or macular degeneration.

Embodiment 191. A method of treating addiction in a subject in need of treatment thereof, the method comprising administering to the subject a therapeutically effective amount of a compound of any one of Embodiments 153-159, or a pharmaceutical composition of Embodiment 160.

Embodiment 192. A method of treating a sleep disorder in a subject in need of treatment thereof, the method comprising administering to the subject a therapeutically effective amount of a compound of any one of Embodiments 153-159, or a pharmaceutical composition of Embodiment 160.

Embodiment 193. The method of Embodiment 192, wherein the sleep disorder is selected from the group consisting of: sleep apnea and insomnia.

Embodiment 194. A method of treating an eating disorder in a subject in need of treatment thereof, the method comprising administering to the subject a therapeutically effective amount of a compound of any one of Embodiments 153-159, or a pharmaceutical composition of Embodiment 160.

Embodiment 195. The method of Embodiment 194, wherein the eating disorder is selected from the group consisting of: anorexia nervosa and bulimia.

Embodiment 196. A method of treating chronic fatigue syndrome in a subject in need of treatment thereof, the method comprising administering to the subject a therapeutically effective amount of a compound of any one of Embodiments 153-159, or a pharmaceutical composition of Embodiment 160.

Embodiment 197. A method of treating autistic spectrum disorder (ASD) or an ASD-associated disorder in a subject in need of treatment thereof, the method comprising administering to the subject a therapeutically effective amount of 8,9-dihydrocannabidiol, or a pharmaceutical composition comprising 8,9-dihydrocannabidiol and a pharmaceutically acceptable excipient.

Embodiment 198. The method of Embodiment 197, wherein the disorder is autistic spectrum disorder (ASD).

Embodiment 199. The method of Embodiment 197, wherein the disorder is an ASD-associated disorder.

Embodiment 200. The method of any one of Embodiments 197 and 199, wherein the ASD-associated disorder is selected from the group consisting of Tuberous Sclerosis Complex, Fragile X syndrome, Cornelia de Lange syndrome, Down syndrome, Angelman syndrome, Coffin-Lowry syndrome, Cohen Laurence-Moon-Biedel syndrome, Marinesco-Sjogren syndrome, Moebius syndrome, Phelan-McDermid syndrome, CDKL5, Dup15q, Potocki-Lupski syndrome, Smith Lemli Optiz syndrome, Timothy syndrome, Prader-Willi syndrome, Rett syndrome, and Williams syndrome.

Embodiment 201. The method of any one of Embodiments 197 and 199-200, wherein the ASD-associated disorder is selected from the group consisting of Fragile X syndrome (FXS), Rett syndrome (RS), and Angelman syndrome (AS).

Embodiment 202. The method of any one of Embodiments 197-201, wherein the treating comprises improving one or more of (i) qualitative impairment in social interaction; (ii) qualitative impairment in communication; and (iii) restricted repetitive and stereotyped patterns of behavior, interest, and activities.

Embodiment 203. The method of Embodiment 202, wherein improving (i) qualitative impairment in social interaction includes improving one or more of: (a) impairment in the use of multiple nonverbal behaviors; (b) failure to develop peer relationships appropriate to developmental level; (c) a lack of spontaneous seeking to share enjoyment, interests, or achievements with other people; and (d) lack of social or emotional reciprocity.

Embodiment 204. The method of Embodiment 202, wherein improving (ii) qualitative impairment in communication includes improving one or more of: (a) delay in, or lack of, the development of spoken language; (b) in individuals with adequate speech, impairment in the ability to initiate or sustain a conversation with others; (c) stereotyped and repetitive use of language or idiosyncratic language; and (d) lack of varied, spontaneous make-believe play or social imitative play appropriate to developmental level.

Embodiment 205. The method of Embodiment 202, wherein improving (iii) restricted repetitive and stereotyped patterns of behavior, interest, and activities includes improving one or more of: (a) encompassing preoccupation with one or more stereotyped and restricted patterns of interest that is abnormal either in intensity or focus; (b) apparently inflexible adherence to specific, non-functional routines or rituals; (c) stereotyped and repetitive motor mannerisms; and (d) persistent preoccupation with parts of objects.

Embodiment 206. The method of any one of Embodiments 197-201, wherein the treating comprises improving one or more of: (a) persistent deficits in social communication and social interaction across contexts, not accounted for by general developmental delays, and (b) restricted, repetitive patterns of behavior, interests, or activities.

Embodiment 207. The method of Embodiment 206, wherein improving (a) persistent deficits in social communication and social interaction across contexts, not accounted for by general developmental delays includes improving one or more of: (i) deficits in social-emotional reciprocity; (ii) deficits in nonverbal communicative behaviors used for social interaction; and (iii) deficits in developing and maintaining relationships.

Embodiment 208. The method of Embodiment 206, wherein improving (b) restricted, repetitive patterns of behavior, interests, or activities includes improving one or more of: (i) stereotyped or repetitive speech, motor movements, or use of objects; or excessive adherence to routines, (ii) ritualized patterns of verbal or nonverbal behavior, or excessive resistance to change; (iii) highly restricted, fixated interests that are abnormal in intensity or focus; and (iv) hyper-or hypo-reactivity to sensory input or unusual interest in sensory aspects of environment.

Embodiment 209. A method of treating schizophrenia in a subject in need of treatment thereof, the method comprising administering to the subject a therapeutically effective amount of 8,9-dihydrocannabidiol, or a pharmaceutical composition comprising 8,9-dihydrocannabidiol and a pharmaceutically acceptable excipient.

Embodiment 210. The method of Embodiment 209, wherein the treating comprises treating negative symptoms.

Embodiment 211. The method of Embodiment 209, wherein the treating comprises treating social withdrawal.

Embodiment 212. A method of treating cognitive dysfunction in a subject in need of treatment thereof, the method comprising administering to the subject a therapeutically effective amount of 8,9-dihydrocannabidiol, or a pharmaceutical composition comprising 8,9-dihydrocannabidiol and a pharmaceutically acceptable excipient.

Embodiment 213. The method of Embodiment 212, wherein the cognitive dysfunction is selected from the group consisting of. Alzheimer's Disease, Parkinson's disease, Huntington's disease, Tourette syndrome, general dementia, anxiety, post-traumatic stress disorder, depression, obsessive compulsive disorder, and Creutzfeldt-Jakob disease.

Embodiment 214. A method of treating memory impairment in a subject in need of treatment thereof, the method comprising administering to the subject a therapeutically effective amount of 8,9-dihydrocannabidiol, or a pharmaceutical composition comprising 8,9-dihydrocannabidiol and a pharmaceutically acceptable excipient.

Embodiment 215. The method of Embodiment 214, wherein the memory impairment is short-term memory impairment.

Embodiment 216. The method of Embodiment 214, wherein the memory impairment is long-term memory impairment.

Embodiment 217. A method of treating cancer in a subject in need of treatment thereof, the method comprising administering to the subject a therapeutically effective amount of 8,9-dihydrocannabidiol, or a pharmaceutical composition comprising 8,9-dihydrocannabidiol and a pharmaceutically acceptable excipient.

Embodiment 218. The method of Embodiment 217, wherein the cancer is selected from the group consisting of: myelodysplastic syndromes (MDS); non-small cell lung cancer; acute lymphoblastic leukemia (ALL); Langerhan's cell histiocytosis (LCH); multiple myeloma; promyelocytic leukemia; acute myeloid leukemia (AML); chronic myeloid leukemia (CML); gastric cancer; and lung cancer.

Embodiment 219. The method of Embodiment 218, wherein the cancer is ALL and the subject is resistant to treatment with glucocorticoids.

Embodiment 220. A method of treating a cardiovascular disorder in a subject in need of treatment thereof, the method comprising administering to the subject a therapeutically effective amount of 8,9-dihydrocannabidiol, or a pharmaceutical composition comprising 8,9-dihydrocannabidiol and a pharmaceutically acceptable excipient.

Embodiment 221. A method of treating diabetes in a subject in need of treatment thereof, the method comprising administering to the subject a therapeutically effective amount of 8,9-dihydrocannabidiol, or a pharmaceutical composition comprising 8,9-dihydrocannabidiol and a pharmaceutically acceptable excipient.

Embodiment 222. A method of treating an eye disease in a subject in need of treatment thereof, the method comprising administering to the subject a therapeutically effective amount of 8,9-dihydrocannabidiol, or a pharmaceutical composition comprising 8,9-dihydrocannabidiol and a pharmaceutically acceptable excipient.

Embodiment 223. The method of Embodiment 222, wherein the eye disease is glaucoma or macular degeneration.

Embodiment 224. A method of treating addiction in a subject in need of treatment thereof, the method comprising administering to the subject a therapeutically effective amount of 8,9-dihydrocannabidiol, or a pharmaceutical composition comprising 8,9-dihydrocannabidiol and a pharmaceutically acceptable excipient.

Embodiment 225. A method of treating a sleep disorder in a subject in need of treatment thereof, the method comprising administering to the subject a therapeutically effective amount of 8,9-dihydrocannabidiol, or a pharmaceutical composition comprising 8,9-dihydrocannabidiol and a pharmaceutically acceptable excipient.

Embodiment 226. The method of Embodiment 225, wherein the sleep disorder is selected from the group consisting of: sleep apnea and insomnia.

Embodiment 227. A method of treating an eating disorder in a subject in need of treatment thereof, the method comprising administering to the subject a therapeutically effective amount of 8,9-dihydrocannabidiol, or a pharmaceutical composition comprising 8,9-dihydrocannabidiol and a pharmaceutically acceptable excipient.

Embodiment 228. The method of Embodiment 227, wherein the eating disorder is selected from the group consisting of: anorexia nervosa and bulimia.

Embodiment 229. A method of treating chronic fatigue syndrome in a subject in need of treatment thereof, the method comprising administering to the subject a therapeutically effective amount of 8,9-dihydrocannabidiol, or a pharmaceutical composition comprising 8,9-dihydrocannabidiol and a pharmaceutically acceptable excipient.

Embodiment 230. The method of any one of Embodiments 197-229, wherein the method further comprises administering a second therapeutic agent to the subject.

Embodiment 231. The method of Embodiment 230, wherein the second therapeutic agent is selected from the group consisting of: an anti-epileptic drug (AED), an antipsychotic drug, melatonin, a selective serotonin reuptake inhibitor (SSRI), and methylphenidate.

Embodiment 232. The method of any one of Embodiments 197-231, wherein the compound is substantially pure.

Embodiment 233. The method of any one of Embodiments 197-232, wherein the compound is administered orally, by inhalation, by suppository, or topically.

Embodiment 234. A process for preparing

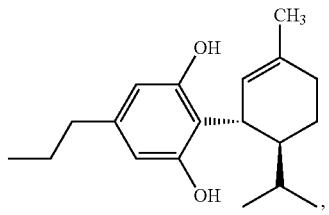 [SMILES: CCCc1cc(O)c([C@@H]2C=C(C)CC[C@H]2C(C)C)c(O)c1]

the process comprising hydrogenating cannabidivarin in the presence of a homogeneous catalyst to form

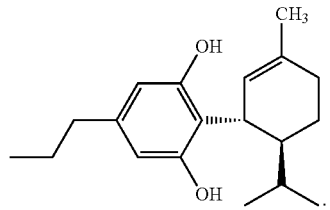 [SMILES: CCCc1cc(O)c([C@@H]2C=C(C)CC[C@H]2C(C)C)c(O)c1]

Embodiment 235. The process of Embodiment 82, wherein the homogeneous catalyst is a rhodium catalyst, a palladium catalyst, an iridium catalyst, a ruthenium catalyst, or a platinum catalyst.

Embodiment 236. The process of any one of Embodiments 234-235, wherein the homogeneous catalyst is a rhodium catalyst.

Embodiment 237. The process of any one of Embodiments 234-235, wherein the homogeneous catalyst is Wilkinson's catalyst.

Embodiment 238. A process for preparing

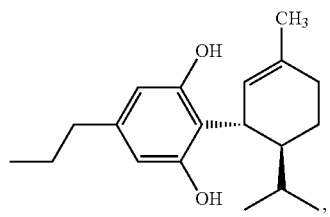 [SMILES: CCCc1cc(O)c([C@@H]2C=C(C)CC[C@H]2C(C)C)c(O)c1]

the process comprising hydrogenating cannabidivarin in the presence of a heterogeneous catalyst to form

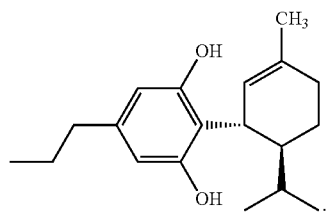 [SMILES: CCCc1cc(O)c([C@@H]2C=C(C)CC[C@H]2C(C)C)c(O)c1]

Embodiment 239. The process of Embodiment 238, wherein the heterogeneous catalyst is Lindlar catalyst.

Embodiment 240. A process for preparing

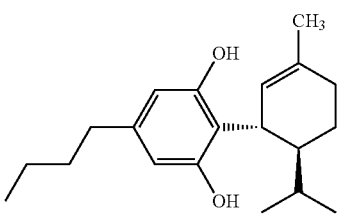

the process comprising hydrogenating norcannabidiol in the presence of a homogeneous catalyst to form

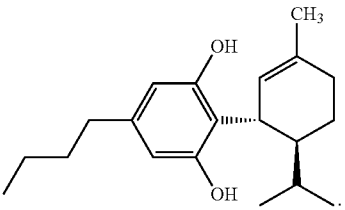 [SMILES: CCCCc1cc(O)c([C@@H]2C=C(C)CC[C@H]2C(C)C)c(O)c1]

Embodiment 241. The process of Embodiment 240, wherein the homogeneous catalyst is a rhodium catalyst, a palladium catalyst, an iridium catalyst, a ruthenium catalyst, or a platinum catalyst.

Embodiment 242. The process of any one of Embodiments 240-241, wherein the homogeneous catalyst is a rhodium catalyst.

Embodiment 243. The process of any one of Embodiments 240-242, wherein the homogeneous catalyst is Wilkinson's catalyst.

Embodiment 244. A process for preparing

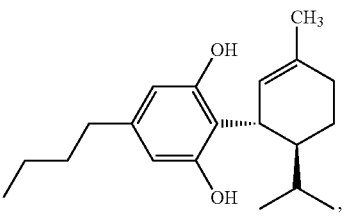 [SMILES: CCCCc1cc(O)c([C@@H]2C=C(C)CC[C@H]2C(C)C)c(O)c1]

the process comprising hydrogenating norcannabidiol in the presence of a heterogeneous catalyst to form

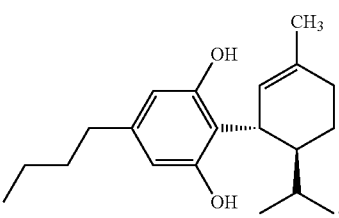

Embodiment 245. The process of Embodiment 244, wherein the heterogeneous catalyst is Lindlar catalyst.

Embodiment 246. A process for preparing

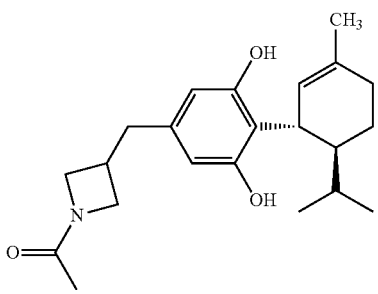

the process comprising hydrogenating 1-(3-(((1'R,2'R)-2,6-dihydroxy-5'-methyl-2'-(prop-1-en-2-yl)-1',2',3',4'-tetrahydro-[1,1'-biphenyl]-4-yl)methyl)azetidin-1-yl)ethan-1-one in the presence of a homogeneous catalyst to form

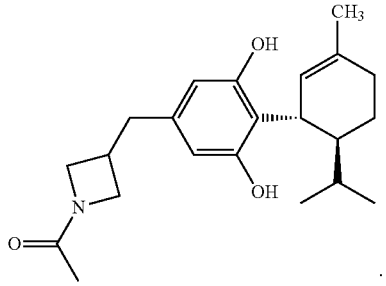 [SMILES: CC(=O)N1CC(Cc2cc(O)c([C@@H]3C=C(C)CC[C@H]3C(C)C)c(O)c2)C1]

Embodiment 247. The process of Embodiment 246, wherein the homogeneous catalyst is a rhodium catalyst, a palladium catalyst, an iridium catalyst, a ruthenium catalyst, or a platinum catalyst.

Embodiment 248. The process of any one of Embodiments 246-247, wherein the homogeneous catalyst is a rhodium catalyst.

Embodiment 249. The process of any one of Embodiments 246-248, wherein the homogeneous catalyst is Wilkinson's catalyst.

Embodiment 250. A process for preparing

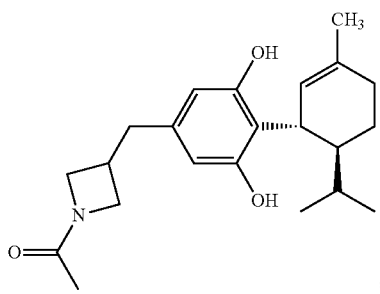

the process comprising hydrogenating 1-(3-(((1'R,2'R)-2,6-dihydroxy-5'-methyl-2'-(prop-1-en-2-yl)-1',2',3',4'-tetrahydro-[1,1'-biphenyl]-4-yl)methyl)azetidin-1-yl)ethan-1-one in the presence of a heterogeneous catalyst to form

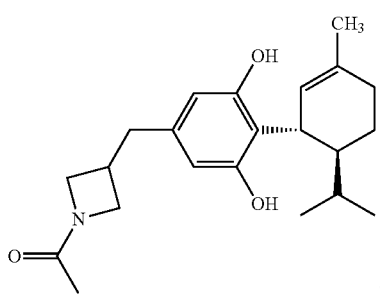

Embodiment 251. The process of Embodiment 250, wherein the heterogeneous catalyst is Lindlar catalyst.

Embodiment 252. A process for preparing

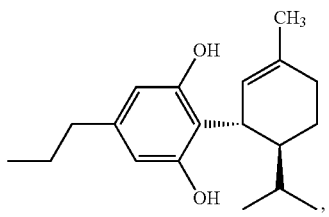

the process comprising reacting alpha-phellandrene with 5-propylbenzene-1,3-diol:

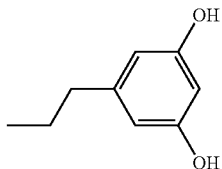

in the presence of an acid, to form

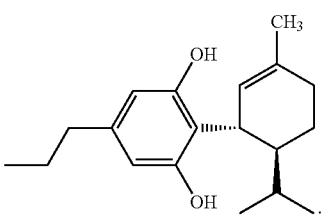 [SMILES: CCCc1cc(O)c([C@@H]2C=C(C)CC[C@H]2C(C)C)c(O)c1]

Embodiment 253. The process of Embodiment 252, the process comprising reacting alpha-phellandrene with 5-propylbenzene-1,3-diol at a temperature from about 5° C. to about 400° C.

Embodiment 254. The process of any one of Embodiments 252-253, comprising reacting alpha-phellandrene with 5-propylbenzene-1,3-diol for about 1 to about 24 hours.

Embodiment 255. A process for preparing

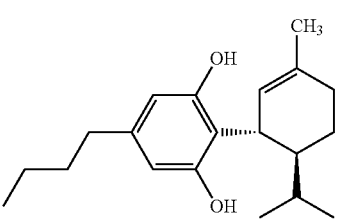

the process comprising reacting alpha-phellandrene with 5-butylbenzene-1,3-diol

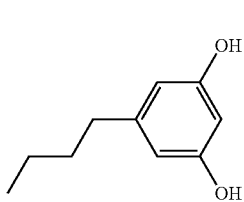

in the presence of an acid, to form

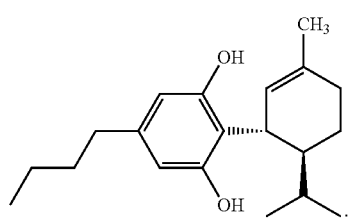 [SMILES: CCCCc1cc(O)c([C@@H]2C=C(C)CC[C@H]2C(C)C)c(O)c1]

Embodiment 256. The process of Embodiment 255, comprising reacting alpha-phellandrene with 5-butylbenzene-1,3-diol at a temperature from about 5° C. to about 400° C.

Embodiment 257. The process of any one of Embodiments 255-256, comprising reacting alpha-phellandrene with 5-butylbenzene-1,3-diol for about 1 to about 24 hours.

Embodiment 258. A process for preparing

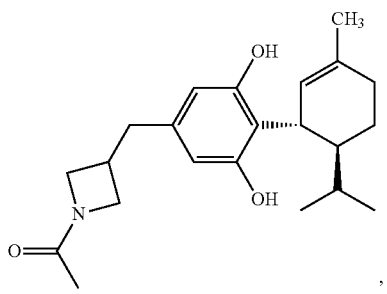

the process comprising reacting alpha-phellandrene with 1-(3-(3,5-dihydroxybenzyl)azetidin-1-yl)ethanone

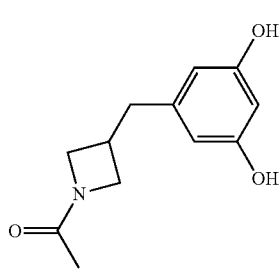 [SMILES: CC(=O)N1CC(Cc2cc(O)cc(O)c2)C1]

to form

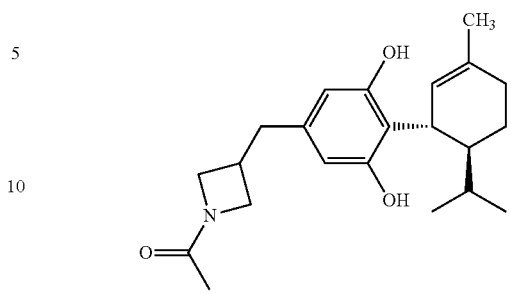

Embodiment 259. The process of Embodiment 258, comprising reacting alpha-phellandrene with 1-(3-(3,5-dihydroxybenzyl)azetidin-1-yl)ethanone at a temperature from about 5° C. to about 400° C.

Embodiment 260. The process of any one of Embodiments 258-259, comprising reacting alpha-phellandrene with 1-(3-(3,5-dihydroxybenzyl)azetidin-1-yl)ethanone for about 1 to about 24 hours.

Embodiment 261. The process of any one of Embodiments 252-260, wherein the acid is a protic or a Lewis acid.

Embodiment 262. The process of Embodiment 261, wherein the acid is a protic acid.

Embodiment 263. The process of any one of Embodiments 261-262, wherein the acid is selected from the group consisting of: para-toluenesulfonic acid, trifluoroacetic acid, methanesulfonic acid, trifluoromethanesulfonic acid, and hydrochloric acid.

Embodiment 264. The process of Embodiment 261, wherein the acid is a Lewis acid.

Embodiment 265. The process of any one of Embodiments 261 and 264, wherein the acid is selected from the group consisting of: boron trichloride, boron trifluoride, and aluminum trichloride.

Embodiment 266. A process for preparing 8,9-dihydrocannabidiol, the process comprising hydrogenating cannabidiol in the presence of a homogeneous catalyst to form 8,9-dihydrocannabidiol.

Embodiment 267. The process of Embodiment 266, wherein the homogeneous catalyst is a rhodium catalyst, a palladium catalyst, an iridium catalyst, a ruthenium catalyst, or a platinum catalyst.

Embodiment 268. The process of any one of Embodiments 266-267, wherein the homogeneous catalyst is a rhodium catalyst.

Embodiment 269. The process of any one of Embodiments 266-267, wherein the homogeneous catalyst is Wilkinson's catalyst.

Embodiment 270. A process for preparing 8,9-dihydrocannabidiol, the process comprising hydrogenating cannabidiol in the presence of Lindlar catalyst to form 8,9-dihydrocannabidiol.

Embodiment 271. A compound of Formula (1)

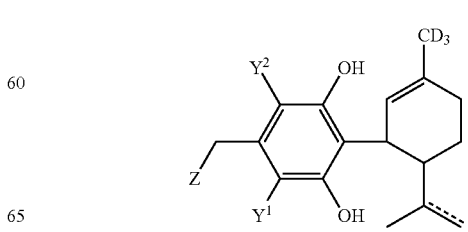

Formula (1)
wherein $Y^1$ and $Y^2$ are each independently hydrogen or deuterium,
------- is a single or a double bond,
and
Z is —CH₂CH₃, —CH₂CH₂CH₃, —CH₂CH₂CH₂CH₃ or

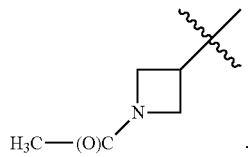

Embodiment 272. The compound of Embodiment 271, wherein the compound is a compound of Formula I Formula I

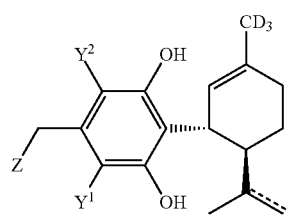

wherein $Y^1$ and $Y^2$ are each independently hydrogen or deuterium,
------- is a single or a double bond,
and
Z is —CH₂CH₃, —CH₂CH₂CH₃, —CH₂CH₂CH₂CH₃ or

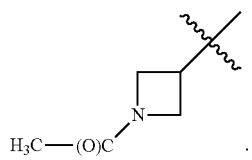

Embodiment 273. The compound of Embodiment 272, wherein the compound is selected from the group consisting of (Formula A)

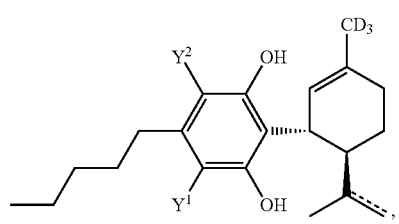

(Formula B)

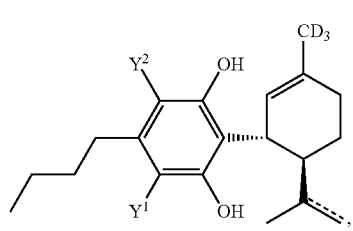

(Formula C)

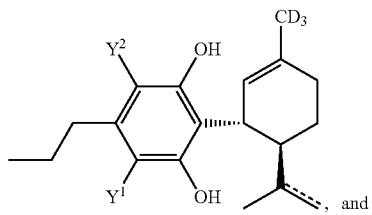

, and (Formula D)

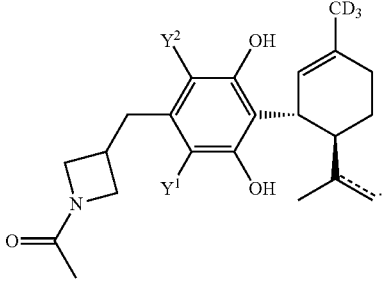

Embodiment 274. The compound of Embodiment 273, wherein the compound is a compound of Formula A.
Embodiment 275. The compound of Embodiment 273, wherein the compound is a compound of Formula B.
Embodiment 276. The compound of Embodiment 273, wherein the compound is a compound of Formula C.
Embodiment 277. The compound of Embodiment 273, wherein the compound is a compound of Formula D.
Embodiment 278. The compound of any one of Embodiments 271 to 277, wherein each of $Y^1$ and $Y^2$ is hydrogen.
Embodiment 279. The compound of any one of Embodiments 271 to 277, wherein each of $Y^1$ and $Y^2$ is deuterium.
Embodiment 280. The compound of any one of Embodiments 271 to 277, wherein ------- is a single bond.
Embodiment 281. The compound of any one of Embodiments 271 to 277, wherein ------- is a double bond.
Embodiment 282. A pharmaceutical composition comprising a compound of any one of Embodiments 271 to 281, and one or more pharmaceutically acceptable excipients.
Embodiment 283. A method of treating a condition, disease or disorder as disclosed herein in a subject in need of such treatment, comprising administering to a subject a therapeutically effective amount of a compound of any one of Embodiments 271 to 281.
Embodiment 284. A compound of Formula (2)

Formula (2)

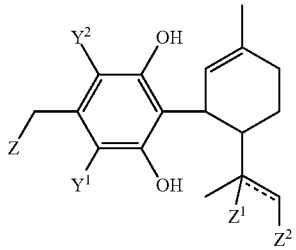

wherein $Y^1$ and $Y^2$ are each independently hydrogen or tritium,
------- is a single or a double bond,
provided that if ------- is a double bond, then $Z^1$ and $Z^2$ are absent, and provided that if ═══ is a single bond, then $Z^1$ and $Z^2$ are are each independently hydrogen or tritium,
provided that the compound comprises tritium,
and
Z is —CH$_2$CH$_3$, —CH$_2$CH$_2$CH$_3$, —CH$_2$CH$_2$CH$_2$CH$_3$ or

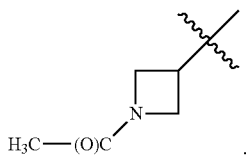

Embodiment 285. The compound of Embodiment 284, wherein the compound is a compound of Formula II

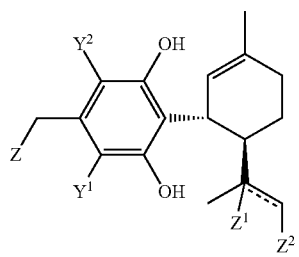

(Formula II)

wherein $Y^1$ and $Y^2$ are each independently hydrogen or tritium,
═══ is a single or a double bond,
provided that if ═══ is a double bond, then $Z^1$ and $Z^2$ are absent,
and provided that if ═══ is a single bond, then $Z^1$ and $Z^2$ are are each independently hydrogen or tritium,
provided that the compound comprises tritium,
and
Z is —CH$_2$CH$_3$, —CH$_2$CH$_2$CH$_3$, —CH$_2$CH$_2$CH$_2$CH$_3$ or

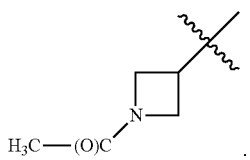

Embodiment 286. The compound of Embodiment 285, wherein the compound of Formula II is selected from the group consisting of

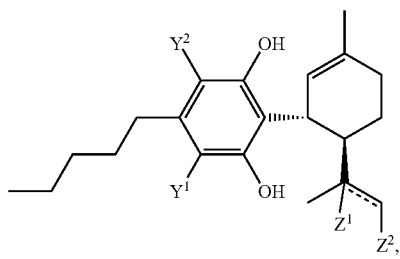

(Formula E)

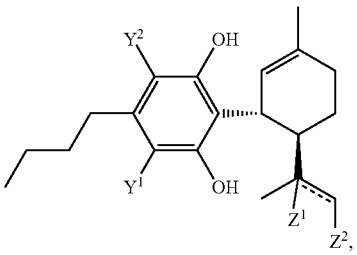

(Formula F)

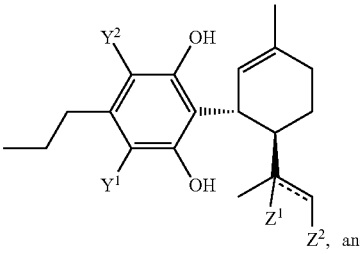

(Formula G)

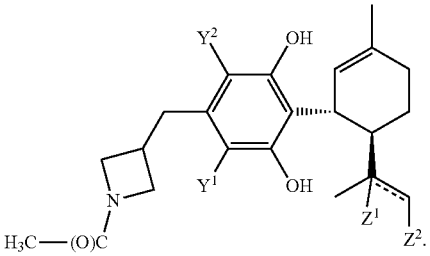

(Formula H)

Embodiment 287. The compound of Embodiment 286, wherein the compound is a compound of Formula E.
Embodiment 288. The compound of Embodiment 286, wherein the compound is a compound of Formula F.
Embodiment 289. The compound of Embodiment 286, wherein the compound is a compound of Formula G.
Embodiment 290. The compound of Embodiment 286, wherein the compound is a compound of Formula H.
Embodiment 291. The compound of any one of Embodiments 284 to 290, wherein each of $Y^1$ and $Y^2$ is hydrogen.
Embodiment 292. The compound of any one of Embodiments 284 to 290, wherein each of $Y^1$ and $Y^2$ is tritium.
Embodiment 293. The compound of any one of Embodiments 284 to 290, wherein ═══ is a single bond.
Embodiment 294. The compound of any one of Embodiments 284 to 290, wherein ═══ is a double bond.
Embodiment 295. The compound of any one of Embodiments 284 to 290, wherein ═══ is a single bond and each of $Z^1$ and $Z^2$ is hydrogen.
Embodiment 296. The compound of any one of Embodiments 284 to 290, wherein ═══ is a single bond, each of $Z^1$ and $Z^2$ is hydrogen, and each of $Y^1$ and $Y^2$ is tritium.
Embodiment 297. The compound of any one of Embodiments 284 to 290, wherein ═══ is a single bond and each of $Z^1$ and $Z^2$ is tritium.
Embodiment 298. The compound of any one of Embodiments 284 to 290, wherein ═══ is a single bond, each of $Z^1$ and $Z^2$ is tritium, and each of $Y^1$ and $Y^2$ is hydrogen.
Embodiment 299. The compound of any one of Embodiments 284 to 290, wherein ═══ is a single bond, each of $Z^1$ and $Z^2$ is tritium, and each of $Y^1$ and $Y^2$ is tritium.
Embodiment 300. The compound of any one of Embodiments 284 to 290, wherein ═══ is a double bond and each of $Y^1$ and $Y^2$ is tritium.

Embodiment 301. A method for quantifying one or more analytes in a sample, comprising: introducing the compound of any one of Embodiments 153-159, 271-281, or 284-300 in the sample; and subjecting the sample to mass spectrometry.

Embodiment 302. The method of Embodiment 301, wherein the compound is a compound of any one of Embodiments 271-281 or 284-300 and one of the one or more analytes is a compound of any one of Embodiments 153-159.

What is claimed is:

1. A compound of formula

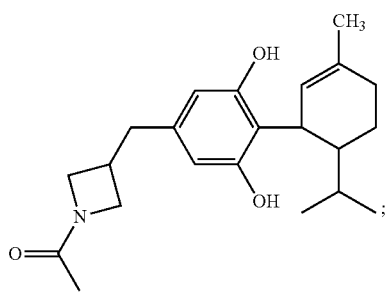 [SMILES: CC(=O)N1CC(Cc2cc(O)c(C3C=C(C)CCC3C(C)C)c(O)c2)C1]

or a pharmaceutically acceptable salt or solvate thereof.

2. A pharmaceutical composition comprising a compound of claim 1, or a pharmaceutically acceptable salt or solvate thereof, and a pharmaceutically acceptable excipient.

3. A compound of Formula (1)

Formula (1)

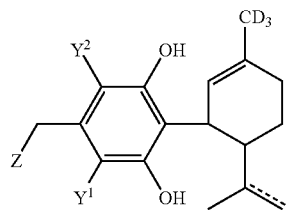

or a pharmaceutically acceptable salt or solvate thereof, wherein $Y^1$ and $Y^2$ are each independently hydrogen or deuterium, ------- is a single bond, and Z is

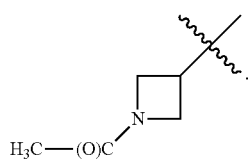

4. The compound of claim 3, wherein the compound is (Formula D)

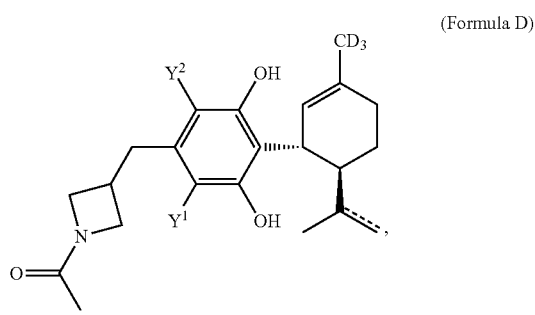

or a pharmaceutically acceptable salt or solvate thereof, wherein one or both of $Y^1$ and $Y^2$ is deuterium.

5. The compound of claim 3, wherein each of $Y^1$ and $Y^2$ is hydrogen.

6. A pharmaceutical composition comprising a compound of claim 3, or a pharmaceutically acceptable salt or solvate thereof, and one or more pharmaceutically acceptable excipients.

7. A compound of Formula (2)

Formula (2)

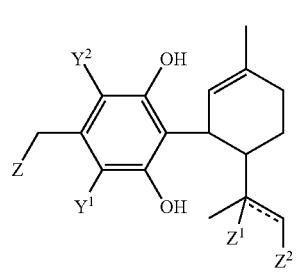

or a pharmaceutically acceptable salt or solvate thereof, wherein $Y^1$ and $Y^2$ are each independently hydrogen or tritium, ------- is a single bond, and $Z^1$ and $Z^2$ are are each independently hydrogen or tritium, provided that the compound comprises tritium, and Z is

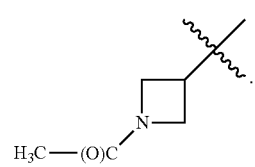

8. The compound of claim 7, wherein the compound of Formula II is
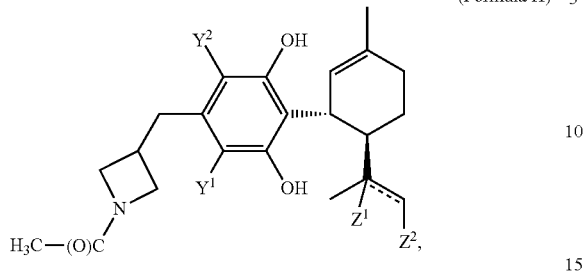
(Formula H)
or a pharmaceutically acceptable salt or solvate thereof, wherein ------- is a single bond and wherein at least one of $Z^1$ and $Z^2$ is tritium.
9. The compound of claim 7, wherein each of $Y^1$ and $Y^2$ is hydrogen.
* * * * *